US009106625B2

(12) United States Patent
Kaniz et al.

(10) Patent No.: US 9,106,625 B2
(45) Date of Patent: Aug. 11, 2015

(54) TWO PARALLEL ENGINES FOR HIGH SPEED TRANSMIT IPSEC PROCESSING

(75) Inventors: Marufa Kaniz, Santa Clara, CA (US); Jeffrey Dwork, San Jose, CA (US); Robert Alan Williams, Cupertino, CA (US); Mohammad Y. Maniar, Saratoga, CA (US); Somnath Viswanath, San Jose, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 1120 days.

(21) Appl. No.: 12/625,086

(22) Filed: Nov. 24, 2009

(65) Prior Publication Data

US 2010/0071055 A1 Mar. 18, 2010

Related U.S. Application Data

(62) Division of application No. 10/791,557, filed on Mar. 2, 2004, now Pat. No. 7,685,434.

(51) Int. Cl.
*H04L 29/06* (2006.01)

(52) U.S. Cl.
CPC .......... *H04L 63/0485* (2013.01); *H04L 63/164* (2013.01)

(58) Field of Classification Search
CPC .............................................. H04L 2209/125
USPC ......................................................... 713/151
See application file for complete search history.

(56) References Cited

U.S. PATENT DOCUMENTS

| 5,590,339 A | 12/1996 | Chang |
| 2001/0014936 A1 | 8/2001 | Jinzaki |
| 2002/0188839 A1 | 12/2002 | Noehring et al. |
| 2002/0191604 A1 | 12/2002 | Mitchell et al. |
| 2003/0014627 A1* | 1/2003 | Krishna et al. ................ 713/153 |
| 2003/0097467 A1 | 5/2003 | Sano |
| 2003/0115447 A1 | 6/2003 | Pham et al. |
| 2003/0135616 A1 | 7/2003 | Carrico et al. |
| 2003/0169877 A1 | 9/2003 | Liu et al. |
| 2003/0212907 A1 | 11/2003 | Genty et al. |
| 2004/0039936 A1 | 2/2004 | Lai |
| 2004/0062267 A1* | 4/2004 | Minami et al. ................ 370/463 |
| 2004/0093524 A1 | 5/2004 | Sakai |

(Continued)

FOREIGN PATENT DOCUMENTS

| EP | 1435716 A2 | 7/2004 |
| WO | 0105086 A2 | 1/2001 |

OTHER PUBLICATIONS

International Search Report issued to PCT/US2005/005902 dated Feb. 26, 2005.

(Continued)

*Primary Examiner* — Jason K Gee
(74) *Attorney, Agent, or Firm* — Eschweiler & Associates, LLC

(57) ABSTRACT

The invention relates to a network interface system for interfacing a host system with a network. The network interface system includes a bus interface system, a media access control system, and a security system. The network interface offloads IPsec processing from the host processor. According to the invention, the security system includes two processors for encrypting and authenticating the outgoing data. Outgoing data packets are sent alternately to one or the other processor, whereby transmission processing can be accelerated relative to receive processing.

7 Claims, 25 Drawing Sheets

(56) References Cited

U.S. PATENT DOCUMENTS

| | | | |
|---|---|---|---|
| 2004/0128553 A1* | 7/2004 | Buer et al. | 713/201 |
| 2004/0243745 A1 | 12/2004 | Bolt et al. | |
| 2005/0169468 A1 | 8/2005 | Fahrny et al. | |

OTHER PUBLICATIONS

Restriction Requirement dated Oct. 2, 2007 Issued to U.S. Appl. No. 10/791,557.

Office Action dated Nov. 2, 2007 Issued to U.S. Appl. No. 10/791,557.

Office Action dated Jan. 25, 2008 Issued to U.S. Appl. No. 10/791,557.

Final Office Action dated Apr. 1, 2008 Issued to U.S. Appl. No. 10/791,557.

Final Office Action dated Sep. 26, 2008 Issued to U.S. Appl. No. 10/791,557.

Office Action dated Feb. 5, 2009 Issued to U.S. Appl. No. 10/791,557.

Final Office Action dated Jun. 30, 2009 Issued to U.S. Appl. No. 10/791,557.

Notice of Allowance dated Nov. 17, 2009 Issued to U.S. Appl. No. 10/791,557.

* cited by examiner

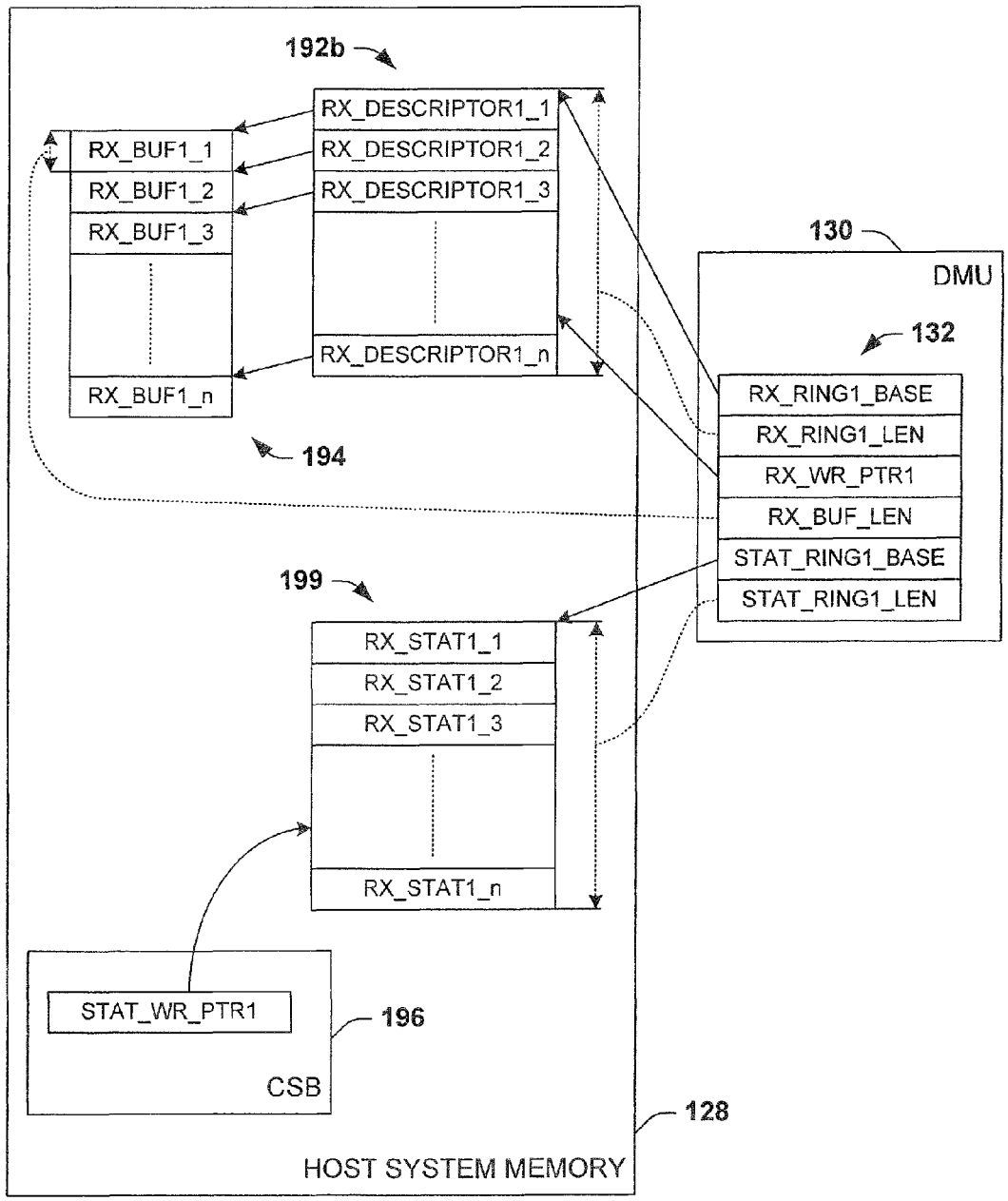

250 ⬊

| FIELD NAME | Created by Host | Modified by ESP | Encrypted | Covered by ESP Authentication | Added by Controller |
|---|---|---|---|---|---|
| Preamble | | | | | x |
| Start of Frame Delimiter | | | | | x |
| MAC Header | x | | | | |
| IP Header | x | | | | |
| ESP Header | x | | | x | |
| Payload Data | x | x | x | x | |
| Padding | x | x | x | x | |
| Pad Length | x | x | x | x | |
| Next Header | x | x | x | x | |
| Authentication Data | x | x | | | |
| Frame Check Sequence | | | | | x |

| FIELD NAME | Created by Host | Modified by AH Module | Covered by AH Authentication | Added by Controller |
|---|---|---|---|---|
| Preamble | | | | x |
| Start of Frame Delimiter | | | | x |
| MAC Header | x | | | |
| IP Header | x | | x | |
| AH Header | x | x | x | |
| Other Headers | x | | x | |
| Payload Data | x | | x | |
| Frame Check Sequence | | | | X |

| PHCKSM FOR IPv4 | |
|---|---|
| 32-BIT IP SOURCE ADDRESS | |
| 32-BIT IP DESTINATION ADDRESS | |
| ZERO | PROTOCOL |
| TCP TOTAL LENGTH | |

| PHCKSM FOR IPv6 | |
|---|---|
| 128-BIT IP SOURCE ADDRESS | |
| 128-BIT IP DESTINATION ADDRESS | |
| 16-BIT TCP TOTAL LENGTH | |
| ZERO | PROTOCOL |

Fig. 8D

TWO PARALLEL ENGINES FOR HIGH SPEED TRANSMIT IPSEC PROCESSING

RELATED APPLICATION

This application is a divisional patent application of application Ser. No. 10/791,557 filed Mar. 2, 2004, which is entitled "TWO PARALLEL ENGINES FOR HIGH SPEED TRANSMIT IPSEC PROCESSING", which is hereby incorporated by reference in its entirety.

FIELD OF INVENTION

The invention is generally related to the field of computer devices and more particularly to methods and systems for interfacing a host device or system with a network.

BACKGROUND OF THE INVENTION

Host-computing systems, such as personal computers, are often operated as nodes on a communications network, where each node is capable of receiving data from the network and transmitting data to the network. Data is transferred over a network in groups or segments, wherein the organization and segmentation of data are dictated by a network operating system protocol, and many different protocols exist. In fact, data segments that correspond to different protocols can co-exist on the same communications network. In order for a node to receive and transmit information packets, the node is equipped with a peripheral network interface device, which is responsible for transferring information between the communications network and the host system. For transmission, a processor unit in the host system constructs data or information packets in accordance with a network operating system protocol and passes them to the network peripheral. In reception, the processor unit retrieves and decodes packets received by the network peripheral. The processor unit performs many of its transmission and reception functions in response to instructions from an interrupt service routine associated with the network peripheral. When a received packet requires processing, an interrupt may be issued to the host system by the network peripheral. The interrupt has traditionally been issued after either all of the bytes in a packet or some fixed number of bytes in the packet have been received by the network peripheral.

Networks are typically operated as a series or stack of layers or levels, where each layer offers services to the layer immediately above. Many different layered network architectures are possible, where the number of layers, the function and content of each layer may be different for different networks. The international standards organization (ISO) has developed an open systems interconnection (OSI) model defining a seven layer protocol stack including an application layer (e.g., layer 7), a presentation layer, a session layer, a transport layer, a network layer, a data link layer, and a physical layer (e.g., layer 1), wherein control is passed from one layer to the next, starting at the application layer in one station, proceeding to the bottom layer, over the channel to the next station and back up the hierarchy. The user of a host system generally interacts with a software program running at the uppermost (e.g., application) layer and the signals are sent across the network at the lowest (e.g., physical) layer.

One popular network architecture is sometimes referred to as a TCP/IP stack, in which the application layer is one of FTP (file transfer protocol), HTTP (hyper text transfer protocol), or SSH (secure shell). In these networks, the transport layer protocol is typically implemented as transmission control protocol (TCP) or user datagram protocol (UDP), and the network layer employs protocols such as the internet protocol (IP), address resolution protocol (ARP), reverse address resolution protocol (RARP), or internet control message protocol (ICMP). The data link layer is generally divided into two sublayers, including a media access control (MAC) sublayer that controls how a computer on the network gains access to the data and permission to transmit it, as well as a logical link control (LLC) sublayer that controls frame synchronization, flow control and error checking. The physical layer conveys the data as a bit stream of electrical impulses, light signals, and/or radio signals through the network at the physical (e.g., electrical and mechanical) level. The physical layer implements Ethernet, RS232, asynchronous transfer mode (ATM), or other protocols with physical layer components, where Ethernet is a popular local area network (LAN) defined by IEEE 802.3.

One or more layers in a network protocol stack often provide tools for error detection, including checksumming, wherein the transmitted messages include a numerical checksum value typically computed according to the number of set bits in the message. The receiving network node verifies the checksum value by computing a checksum using the same algorithm as the sender, and comparing the result with the checksum data in the received message. If the values are different, the receiver can assume that an error has occurred during transmission across the network. In one example, the TCP and IP layers (e.g., layers 4 and 3, respectively) typically employ checksums for error detection in a network application.

Data may also be divided or segmented at one or more of the layers in a network protocol stack. For example, the TCP protocol provides for division of data received from the application layer into segments, where a header is attached to each segment. Segment headers contain sender and recipient ports, segment ordering information, and a checksum. Segmentation is employed, for example, where a lower layer restricts data messages to a size smaller than a message from an upper layer. In one example, a TCP frame may be as large as 64 kbytes, whereas an Ethernet network may only allow frames of a much smaller size at the physical layer. In this case, the TCP layer may segment a large TCP frame into smaller segmented frames to accommodate the size restrictions of the Ethernet.

One or more of the network protocol layers may employ security mechanisms such as encryption and authentication to prevent unauthorized systems or users from reading the data, and/or to ensure that the data is from an expected source. For instance, IP security (IPsec) standards have been adopted for the IP layer (e.g., layer 3 of the OSI model) to facilitate secure exchange of data, which has been widely used to implement virtual private networks (VPNs). IPsec supports two operating modes, including transport mode and tunnel mode. In transport mode, the sender encrypts the data payload portion of the IP message and the IP header is not encrypted, whereas in tunnel mode, both the header and the payload are encrypted. In the receiver system, the message is decrypted at the IP layer, wherein the sender and receiver systems share a public key through a security association (SA). Key sharing is typically accomplished via an interne security association and key management protocol (ISAKMP) that allows the receiver to obtain a public key and authenticate the sender using digital certificates.

In conventional networks, the tasks of the upper and intermediate layers are performed in the host system software. When an application software program in a host computer needs to transfer data to another device on the network, the application passes the data as a packet to TCP layer software of the host operating system (OS). The TCP layer software creates a TCP frame including the data packet and a TCP header, and also performs any required TCP segmentation and checksum generation. Host IP layer software then creates an IP header and trailer, as well as an Ethernet (MAC) header, and performs any selected IPsec security processing. The resulting IP frame is then provided to a network interface for transmission to the network. At the receiver host, the received frame is then decrypted and/or authenticated by IP software in the receiver host CPU, and the IP checksums are verified. The receiver TCP layer software then verifies the TCP checksum, and reassembles segmented TCP frames into a message for the upper layer software application destination. Such conventional systems, however, require the host software to implement many if not all of the layer 3 and layer 4 (e.g., IP and TCP/UDP) functions, including segmentation, checksumming, and security processing. These functions are typically computation intensive, requiring a significant amount of host processing overhead. Thus, there is a need for improved network systems and methods for reducing the processing load on networked host systems.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor to delineate the scope of the invention. Rather, the primary purpose of this summary is to present some concepts of the invention in a simplified form as a prelude to the more detailed description that is presented later. The invention relates to systems and methods for interfacing host systems with networks.

One aspect of the invention relates to a network interface system for interfacing a host system with a network. The network interface system includes a bus interface system, a media access control system, and a security system. The security system is operative to selectively encrypt and authenticate outgoing data. According to the invention, the security system includes two processors for encrypting and authenticating the outgoing data. Outgoing data packets are sent alternately to one or the other processor.

The invention eliminates a potential bottleneck that occurs when offloading security processing from a host processor. In conventional security processing, authentication follows encryption. This means that authentication and encryption cannot be carried out simultaneously on the transmit side, although authentication and decryption can be carried out simultaneously on the receive side. Having multiple parallel processors on the transmit side prevents transmission from being slower than reception.

Another aspect of the invention related to a single integrated circuit comprising a security system adapted to perform IPsec processing. The security system includes at least two transmit IPsec processors.

To the accomplishment of the foregoing and related ends, the following description and annexed drawings set forth in detail certain illustrative aspects and implementations of the invention. These are indicative of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 5G is a schematic diagram illustrating an exemplary receive descriptor in the network interface system of FIG. 2;

FIG. 5H is a schematic diagram illustrating an exemplary receive descriptor ring and receive status ring in host system memory, as well as pointer registers in the descriptor management unit of the network interface system of FIG. 2;

FIGS. 8A and 8B are tables illustrating frame fields modified by outgoing ESP and AH processing, respectively, in the network interface system of FIG. 2;

FIGS. 8C and 8D are schematic diagrams illustrating pseudo header checksum calculations for IPv4 and IPv6, respectively in the network interface system of FIG. 3;

DETAILED DESCRIPTION OF THE INVENTION

Figure 1A:
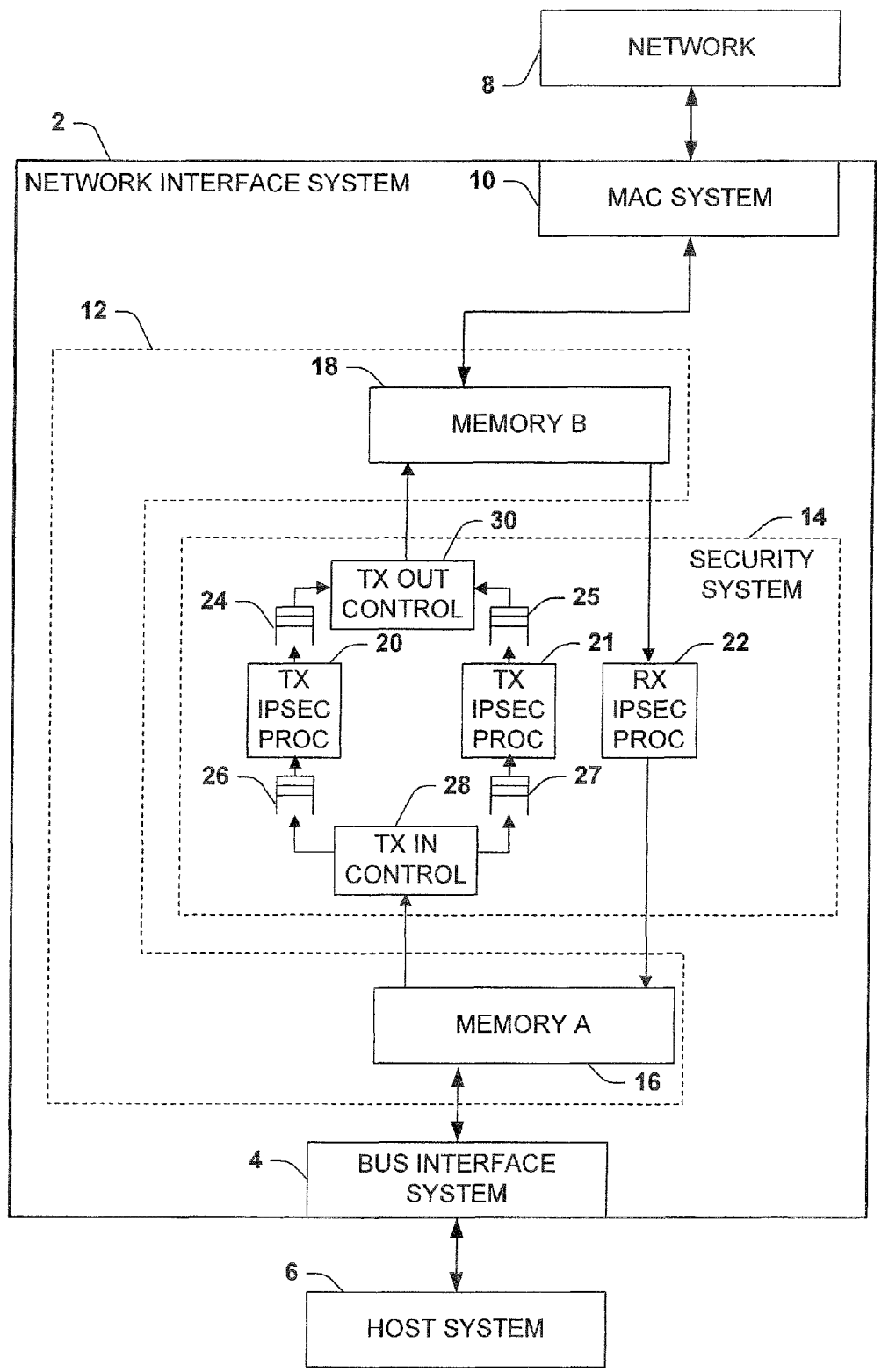
FIG. 1A is a schematic diagram illustrating an exemplary network interface system in accordance with one or more aspects of the present invention.

One or more implementations of the present invention will now be described with reference to the drawings, wherein like reference numerals are used to refer to like elements throughout.

FIG. 1A illustrates an exemplary network interface system 2 for interfacing a host system 6 with a network 8, wherein the network interface system 2 is operable to provide outgoing data from the host system 6 to the network 8 and to provide incoming data from the network 8 to the host system 6. The network interface system 2 comprises a bus interface system 4 which can be operatively coupled with the host system 6, such as via a bus in the host system, where the bus interface system 4 is adapted to transfer data between the network interface system 2 and the host system 6. A media access control (MAC) system 10 in the network interface 2 may be operatively coupled with the network 8, such as via a media independent interface (e.g., MII, GMII, etc.) compliant transceiver (not shown), wherein the MAC system 10 is operable to transfer data between the network interface system 2 and the network 8. The bus interface system 4 and the MAC system 10 may be constructed using any electrical circuitry or components configured or configurable to transfer data to and from the network interface system 2. In particular, the systems 4 and 10 may comprise any combination of hardware such as logic devices, analog circuits, electrical connectors, etc., which may be programmable or configurable by software and/or firmware in the interface system 2.

The network interface 2 further comprises a memory system 12 coupled with the bus interface system 4 and the MAC system 10, and a security system 14 coupled with the memory system 12. The memory system 12 stores incoming and outgoing data being transferred between the network 8 and the host system 6. The memory system 12 comprises first and second memories MEMORY A 16 and MEMORY B 18. The first memory 16 is coupled with the bus interface system 4 and the security system 14 for storage of outgoing data prior to security processing and for storage of incoming data after security processing. The second memory 18 is coupled with the MAC system 10 and the security system 14 for storage of incoming data prior to security processing and for storage of outgoing data after security processing. The memory system 12 and the first and second memories 16 and 18 thereof may be any form of memory circuitry, volatile or non-volatile, including but not limited to random access memory (RAM) circuitry configured as first-in, first-out (FIFO) memories with appropriate control circuitry. Although illustrated as first and second memories 16 and 18, respectively, the memory system 12 may be separate memories or a unitary memory system partitioned into first and second memory areas 16 and 18, respectively. Furthermore, one or both of the memories 16 and 18 may comprise separate memory circuitry for handling incoming and outgoing data, or alternatively may be single memory circuits partitioned (e.g., statically or dynamically) for storage of incoming and outgoing data and control information.

The security system 14 is configured or configurable to selectively perform security processing for incoming and/or outgoing data in the network interface system 2. The security system 14, may be constructed using any suitable electronic devices, such as analog and logic circuitry, configured or configurable to perform security processing for incoming and/or outgoing data in the interface system 2. In one implementation, the security system 14 is an IPsec system adapted to selectively provide authentication, encryption, and decryption functions for incoming and outgoing data, as illustrated and described further below. However, other forms of security systems and other types of security processing are contemplated within the scope of the invention.

The systems 4, 10, 12, and 14 in the network interface system 2 may optionally be configurable or programmable via software and/or firmware. For example, one, some, or all of the systems 4, 10, 12, and 14 of the network interface 2 may be configured by software in the host system 6 and/or via firmware such as a coded EEPROM in the system 2 or an external EEPROM or other memory device external to the system 2 via an EEPROM interface.

The various systems 4, 10, 12, and 14 may be selectively operable according to control or other type information obtained from the host system 6, wherein such information may be associated with one or more data portions being processed and/or transferred between the host system 6 and the network 8. For example, the network interface system 2 may obtain control information from the host system 6 related to an outgoing data frame to be transmitted to the network 8. Further, the systems 4, 10, 12, and 14 may provide control, status, or other types of information to the host system 6.

The security system 14 comprises a receive IPsec processor 22, a transmit IPsec input data flow controller 28, two transmit IPsec processors 20 and 21 with corresponding input buffers 26 and 27 and output buffers 24 and 25, and a transmit IPsec output data flow controller 30. The input data flow controller 28 reads data from the memory 16 and sends data packets alternately to the input buffers 26 and 27. The transmit IPsec processors 20 and 21, operating essentially in parallel, read data from their corresponding input buffers 26 and 27, perform security processing on the data, and write the processed data to their corresponding output buffers 24 and 25. The output flow controller 30 reads the processed data alternately from the output buffers 24 and 25 and writes the processed data to the memory 18 with the packets in the same order as the order in which they were read from the memory 16.

Two transmit LPsec processors are matched with one receive IPsec processor in the exemplary network interface system 2 because when data is encrypted, by convention authentication is performed on the encrypted data. On receive, this enables decryption and authentication to be carried out in parallel. On transmission, however, encrypted data must be available before authentication can begin. Conventional authentication and encryption algorithms, such as the examples given below, are recursive. Due to their recursive nature, there is an overhead associated with each of authentication and encryption for each data packet, overheads in addition to the per byte processing time. The overheads for encryption and authentication are additive on the transmit side, even when authentication and encryption operations are pipelined. These overheads significantly increase processing time, particularly for small data packets. The present invention reduces the IPsec processing time on the transmit side through the use of two or more transmit IPsec processors operating in parallel, and thus creates a better match to processing speed on the receive side.

Figure 1B:
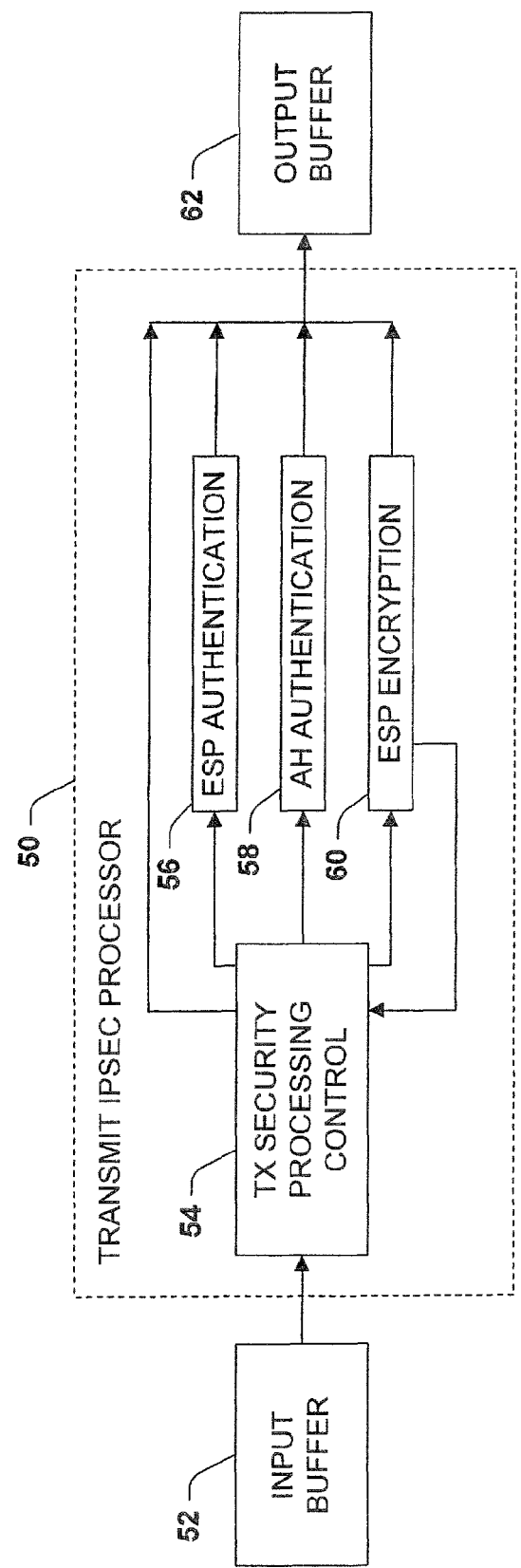
FIG. 1B is a schematic diagram illustrating an exemplary transmit security processor.

FIG. 1B is a schematic illustration of an exemplary transmit IPsec processor 50. The exemplary IPsec processor 50 comprises a transmit security processing control module 54, an ESP authentication engine 56, an AH authentication engine 58, and an ESP encryption engine 60. The transmit security processing control module 54 selectively directs date packets from an input buffer 52 through none, one, or more of the ESP authentication engine 56, the AH authentication engine 58, and the ESP encryption engine 60. Where encryption and authentication are required, the output of the ESP encryption engine is routed to one or more of the authentication engines. The exemplary IPsec processor 50 can carry out both ESP and AH authentication on a packet and when performing both carries out the operations in parallel. Once processing is complete, the processed data is placed in an output buffer 62.

An engine comprises dedicated hardware for each of its functions. In addition, an engine comprises multiple stages in series, each of which processes data at the same rate. A sequence of data supplied to an engine passes through a series of stages from the beginning of the engine to its end, and thus in some sense can be thought of as a pipeline. The stages in series are potentially all in operation at the same time operating on separate blocks of data. Pipelines provide much faster data processing as compared to use of a central processor.

The input buffers 26 and 27 and the output buffers 24 and 25 of FIG. 1A can be of any suitable size and configuration. For example, the buffers can be from about 32 bytes to about 1024 bytes, with 256 bytes being a preferred size. They can be two separate memories, or a single partitioned memory. Preferably, the buffers are of sufficient size whereby when the network interface system 12 is transmitting a series of short data packets for which the overhead in IPsec processing is significant, the transmit IPsec processors 20 and 21 both remain in continuous operation.

Figure 1C:
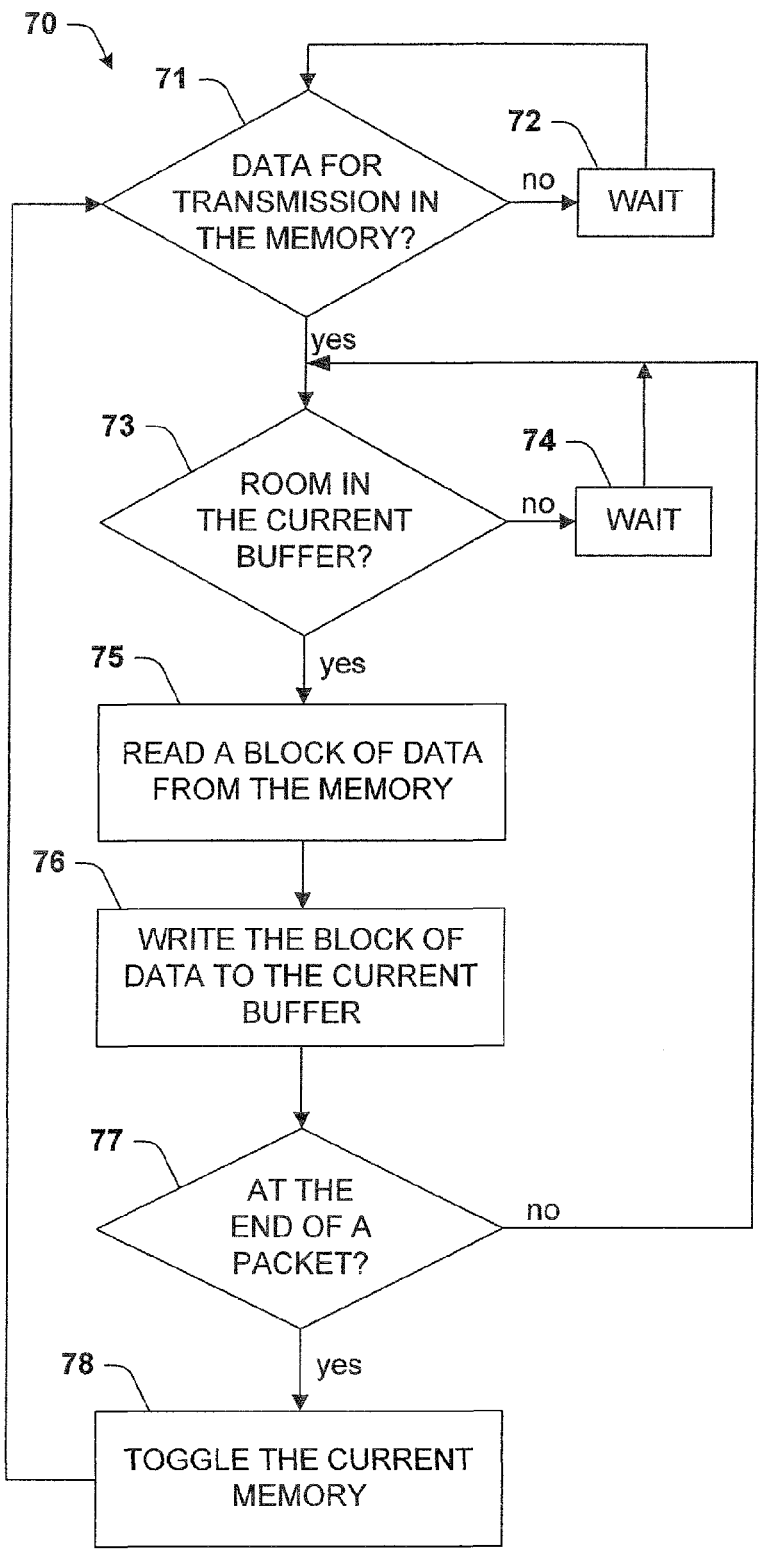
FIG. 1C is a flow diagram illustrating the operation of an exemplary transmit IPsec input data flow controller according to another aspect of the present invention.

The input data flow controller 28 reads data packets for transmission from the memory 16 and directs the packets alternately between the input buffers 26 and 27 of the two IPsec processors 20 and 21. FIG. 1C is a flow chart illustrating an exemplary operating procedure 70 for the input data flow controller 28. The flow controller 28 toggles between the input buffers 26 and 27, whereby at any given time only one is the "current" buffer. Beginning in block 71, the flow controller 28 checks for data to be transmitted in the memory 16. If no data is present, the controller 28 waits in block 72 then checks again. Alternatively, another processor or circuit can signal the controller 28 when data is waiting for transmission.

When transmitting large data packets, it is possible for an input buffer to become full. Therefore, the controller 28 checks in block 73 for room in the current buffer before reading a block of data from the memory 16 in block 75 and writing the data to the current buffer in block 76. If the input buffer is full, the controller 28 waits in block 74 before checking again for room in block 73. After writing the data to the current buffer in block 76, the controller 28 checks in block 77 whether the end of the packet has been reached. If the end of the packet has been reached, the current buffer is toggled in block 78 and the controller 28 proceeds to block 71 where it looks for the next data packet. If not, the controller returns to block 73 and prepares to read another block of data from the memory 16. The exemplary operating procedure 70 causes an entire packet to be sent to the current buffer before toggling to the other buffer.

Figure 1D:
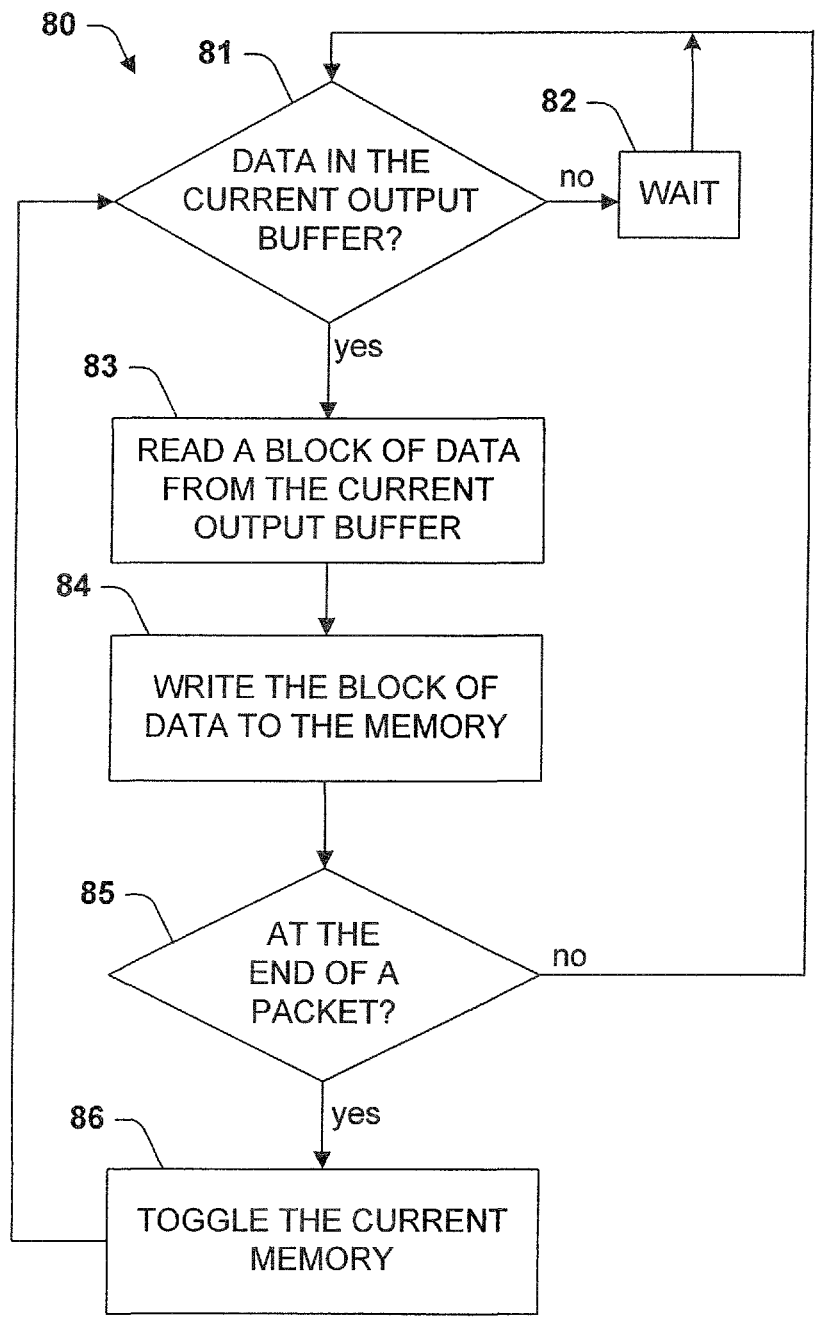
FIG. 1D is a flow diagram illustrating the operation of an exemplary transmit IPsec output data flow controller according to a further aspect of the present invention.

The output data flow controller 30 reads processed data from the output buffers 24 and 25 and writes the processed data to the memory 18. FIG. 1D is a flow chart illustrating an exemplary operating procedure 80 for the output data flow controller 30. The flow controller 30 toggles between the output buffers 24 and 25, whereby at any given time only one is the "current" buffer.

The output flow controller 30 may operate faster than the transmit IPsec processors 24 and 25, therefore, the output flow controller 30 begins by checking in block 81 for data in the current output buffer. If there is data, the controller 30 reads a block of data from the current out buffer in block 83 and writes the data to the memory 18 in the block 84. The controller 30 then checks in block 85 whether the end of the packet has been reached. If it has, the controller 30 toggles the current output buffer in block 86 and prepares to read more data in block 81. If not, the controller 30 continues reading data from the current output buffer in block 81. The operating procedure 80 cause an entire packet to be read from one output buffer and written to the memory 18 before reading the next packet from the other output buffer.

The invention thus facilitates expeditious transfer and processing of incoming and outgoing data between the network 8 and the host system 6 through offloading of security processing. Moreover, the provision of two transmit IPsec processors accelerates the IPsec processing. A structural/functional and operational overview of an exemplary network controller in accordance with the present invention will be provided below in conjunction with FIGS. 2-4, in order to facilitate a thorough understanding of the present invention. In accordance with one exemplary aspect of the invention, the above features advantageously facilitate operation of the network interface with security processing at gigabit wire speed.

Figure 2:
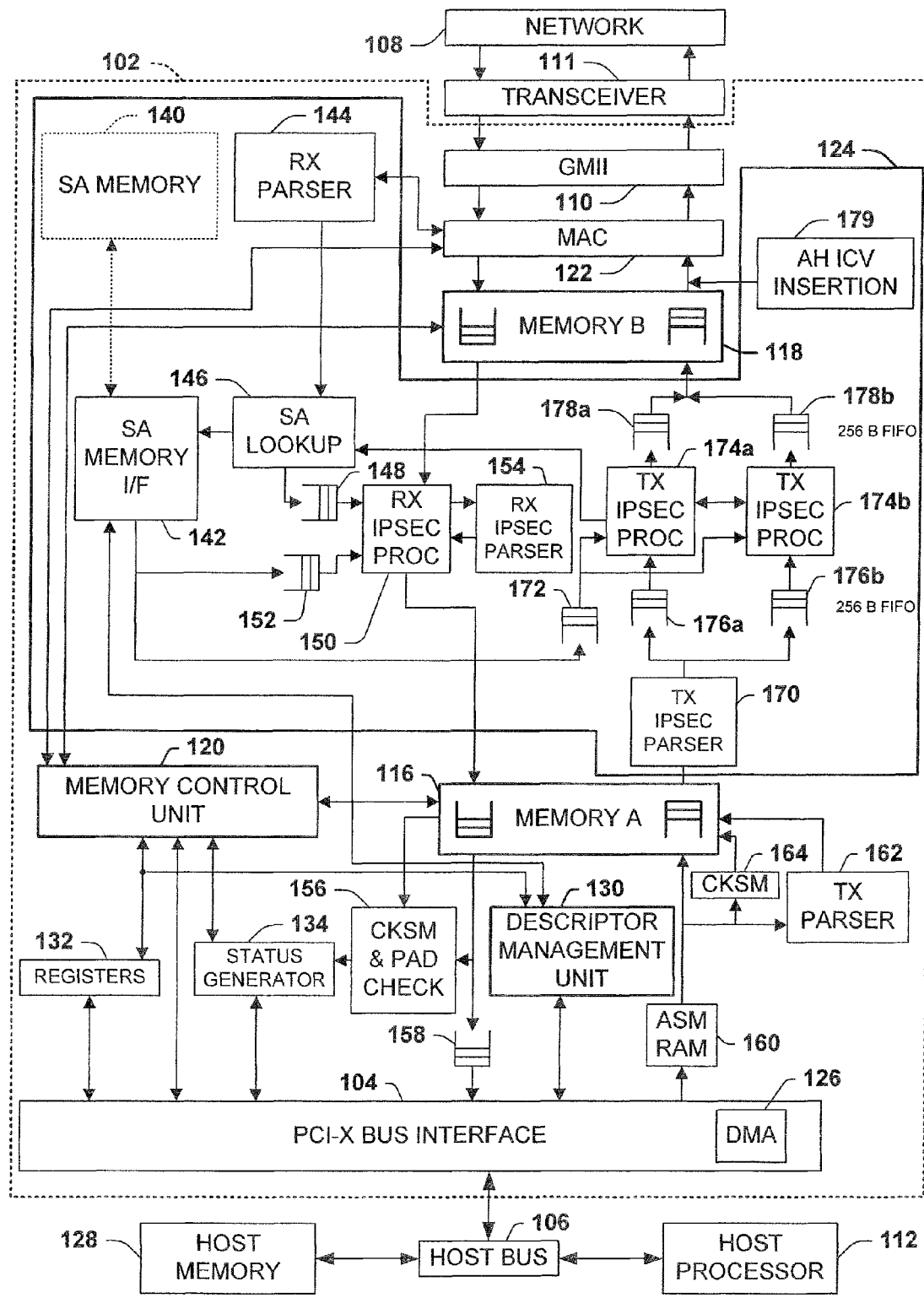
FIG. 2 is a schematic diagram illustrating another exemplary network interface system in which various aspects of the invention may be carried out.
Figure 3:
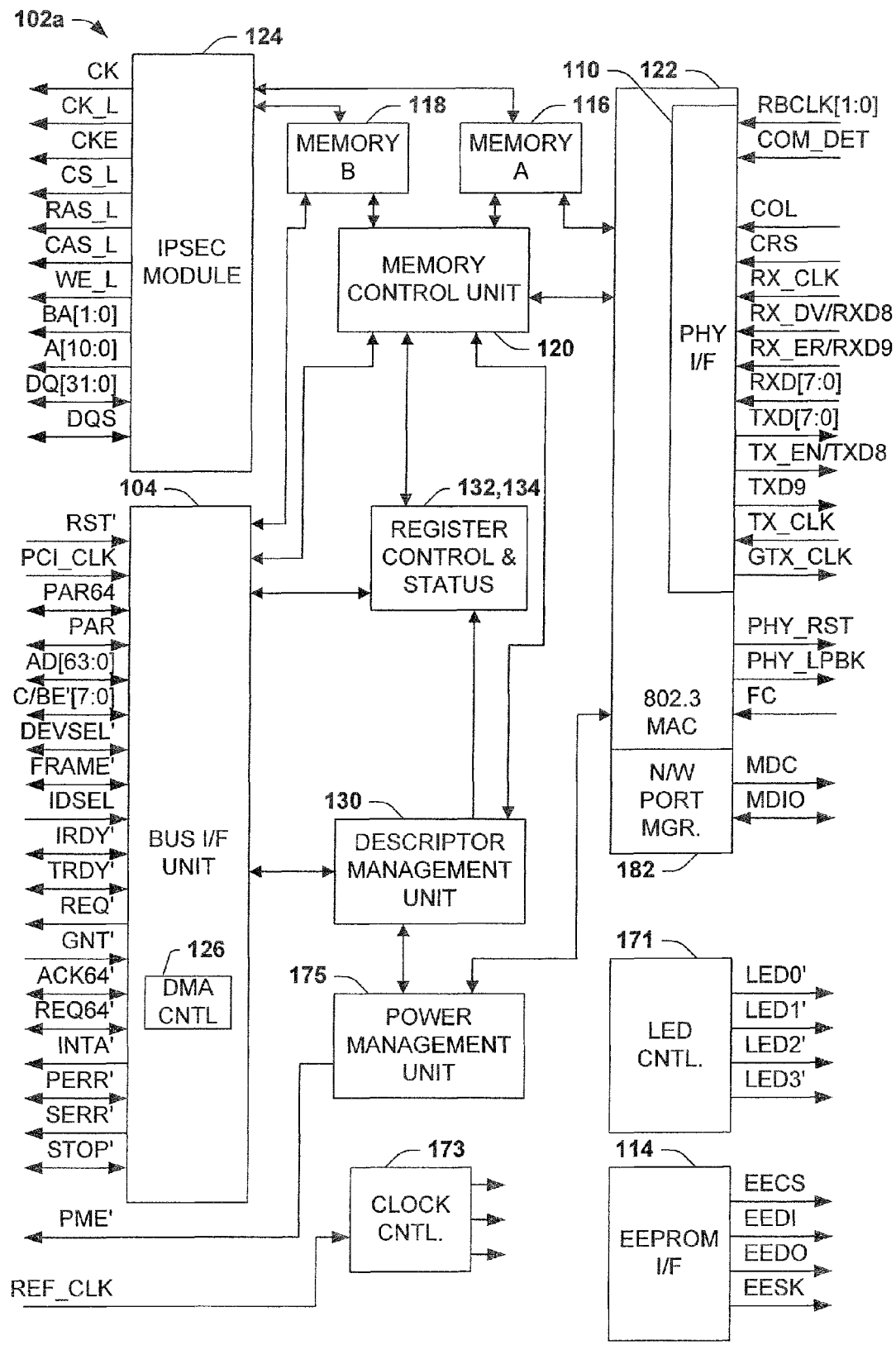
FIG. 3 is a schematic diagram illustrating an exemplary single-chip network controller implementation of the network interface system of FIG. 2.
Figure 4:
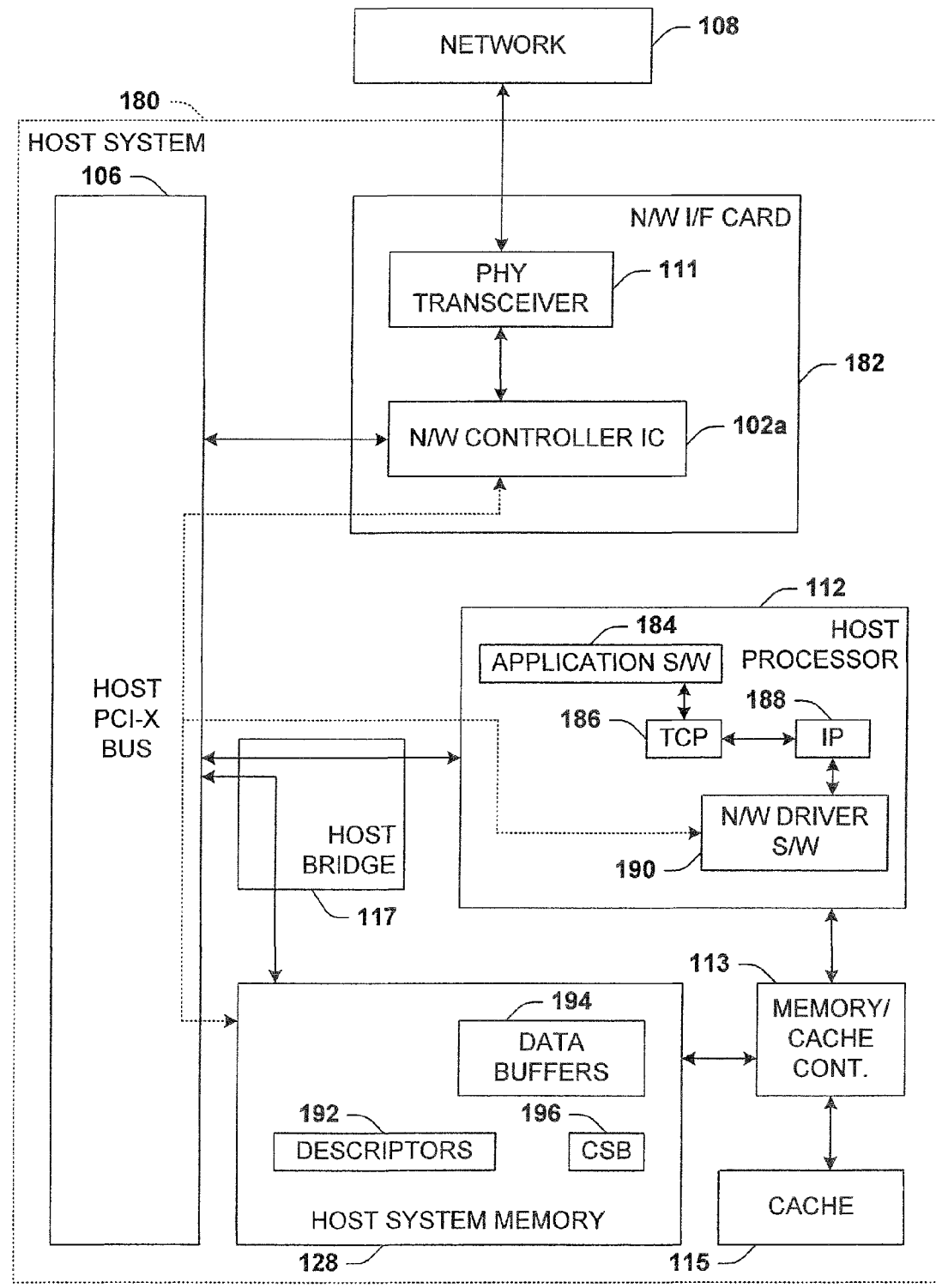
FIG. 4 is a schematic diagram illustrating a host system interfacing with a network using the exemplary network controller of FIG. 3.

FIG. 2 illustrates a network interface peripheral or network controller 102 in accordance with one or more aspects of the present invention, and FIGS. 3 and 4 illustrate an exemplary single-chip implementation 102a of the network controller 102. The exemplary single-chip network controller 102a includes all the functionality and components described herein with respect to the network interface system 102. The various blocks, systems, modules, engines, etc. described herein may be implemented using any appropriate analog and/or digital circuitry, wherein one or more of the blocks, etc. described herein may be combined with other circuitry in accordance with the invention.

The network controller 102 includes a 64-bit PCI-X bus interface 104 for connection with a host PCI or PCI-X bus 106 that operates at a clock speed up to 133 MHz in PCI-X mode or up to 66 MHz in standard PCI mode. The network controller 102 may be operated as a bus master or a slave. Much of the initialization can be done automatically by the network controller 102 when it reads an optional EEPROM (not shown), for example, via an EEPROM interface 114 (FIG. 3). The network controller 102 can be connected to an IEEE 802.3 or proprietary network 108 through an IEEE 802.3- compliant Media Independent interface (MII) or Gigabit Media Independent Interface (GMII) 110, for interfacing the controller 102 with the network 108 via an external transceiver device 111. For 1000 Mb/s operation the controller 102 supports either the byte-wide IEEE 802.3 Gigabit Media Independent Interface (GMII) for 1000BASE-T PHY devices 111 or the IEEE 802.3 Ten-Bit Interface (TBI) for 1000BASE-X devices 111. The network controller 102 supports both half-duplex and full-duplex operation at 10 and 100 Mb/s rates and full-duplex operation at 1000 Mb/s.

A host device, such as a host processor 112 on the host PCI-X bus 106 in a host system 180, may interface with the network controller 102 via the bus 106 and a host bridge 117. The host processor 112 includes one or more processors that can operate in a coordinated fashion. Referring also to FIG. 4, the network single-chip network controller 102a may be provided on a network interface card or circuit board 182, together with a PHY transceiver 111 for interfacing the host processor 112 with the network 108 via the host bridge 117, the host bus 106, and the transceiver 111. The PCI-X bus interface 104 includes PCI configuration registers used to identify the network controller 102a to other devices on the PCI bus and to configure the device. Once initialization is complete, the host processor 112 has direct access to the 110 registers of the network controller 102 for performance tuning, selecting options, collecting statistics, and starting transmissions through the host bridge 117 and the bus 106. The host processor 112 is operatively coupled with the host system memory 128 and a cache memory 115 via a memory/cache controller 113. One or more application software programs 184 executing in the host processor 112 may be provided with network service via layer 4 (e.g., transport layer) software, such as transmission control protocol (TCP) layer software 186, layer 3 (e.g., network layer) software 188, such as internet protocol (IP) software 188, and a software network driver 190, also running on the host processor 112. As discussed below, the network driver software 190 interacts with the host memory 128 and the network controller 102 to facilitate data transfer between the application software 184 and the network 108.

As illustrated in FIG. 2, the exemplary network controller 102 comprises first and second internal random access memories MEMORY A 116 and MEMORY B 118, organized as first-in first-out (FIFO) memories for storage of frames. A memory control unit 120 is provided for control and operation of the memories 116 and 118. The network controller 102 also comprises a media access control (MAC) engine 122 satisfying requirements for operation as an Ethernet/IEEE 802.3-compliant node and providing the interface between the memory 118 and the GMII 110. The MAC engine 122 may be operated in full or half-duplex modes. An Internet Protocol Security (IPsec) engine 124 coupled with the memories 116 and 118 provides authentication and/or encryption functions.

The PCI-X bus interface 104 includes a Direct Memory Access (DMA) controller 126 that automatically transfers network frame data between the network controller 102 and buffers in host system memory 128 via the host bus 106. The operation of the DMA controller 126 is directed by a descriptor management unit 130 according to data structures called descriptors 192, which include pointers to one or more data buffers 194 in system memory 128, as well as control information. The descriptors 192 are stored in the host system memory 128 in queues called descriptor rings. Four transmit descriptor rings are provided for transmitting frames and four receive descriptor rings for receiving frames, corresponding to four priorities of network traffic in the illustrated controller 102. Additionally, four receive status rings are provided, one for each priority level, that facilitate synchronization between the network controller 102 and the host system. Transmit descriptors 192 control the transfer of frame data from the system memory 128 to the controller 102, and receive descriptors 192 control the transfer of frame data in the other direction. In the exemplary controller 102, each transmit descriptor 192 corresponds to one network frame, whereas each receive descriptor 192 corresponds to one or more host memory buffers in which frames received from the network 108 can be stored.

The software interface allocates contiguous memory blocks for descriptors 192, receiver status, and data buffers 194. These memory blocks are shared between the software (e.g., the network driver 190) and the network controller 102 during normal network operations. The descriptor space includes pointers to network frame data in the buffers 194, the receiver status space includes information passed from the controller 102 to the software in the host 112, and the data buffer areas 194 for storing frame data that is to be transmitted (e.g., outgoing data) and for frame data that has been received (e.g., incoming data).

Synchronization between the controller 102 and the host processor 112 is maintained by pointers stored in hardware registers 132 in the controller 102, pointers stored in a controller status block (CSB) 196 in the host system memory 128, and interrupts. The CSB 196 is a block of host system memory 128 that includes pointers into the descriptor and status rings and a copy of the contents of the controller's interrupt register. The CSB 196 is written by the network controller 102 and read by the host processor 112. Each time the software driver 190 in the host 112 writes a descriptor or set of descriptors 192 into a descriptor ring, it also writes to a descriptor write pointer register in the controller 102. Writing to this register causes the controller 102 to start the transmission process if a transmission is not already in progress. Once the controller has finished processing a transmit descriptor 192, it writes this information to the CSB 196. After receiving network frames and storing them in receive buffers 194 of the host system memory 128, the controller 102 writes to the receive status ring and to a write pointer, which the driver software 190 uses to determine which receive buffers 194 have been filled. Errors in received frames are reported to the host memory 128 via a status generator 134.

The IPsec module or engine 124 provides standard authentication, encryption, and decryption functions for transmitted and received frames. For authentication, the IPsec module 124 implements the HMAC-MD5-96 algorithm defined in RFC 2403 (a specification set by the Internet Engineering Task Force) and the HMAC-SHA-1-96 algorithm defined in RFC 2404. For encryption, the module implements the ESP DES-CBC (RFC 2406), the 3DES-CBC, and the AES-CBC encryption algorithms. For transmitted frames, the controller 102 applies IPsec authentication and/or encryption as specified by Security Associations (SAs) stored in a private local SA memory 140, which are accessed by IPsec system 124 via an SA memory interface 142. SAs are negotiated and set by the host processor 112. SAs include IPsec keys, which are required by the various authentication, encryption, and decryption algorithms, IPsec key exchange processes are performed by the host processor 112. The host 112 negotiates SAs with remote stations and writes SA data to the SA memory 140. The host 112 also maintains an IPsec Security Policy Database (SPD) in the host system memory 128.

A receive (RX) parser 144 associated with the MAC engine 122 examines the headers of received frames to determine what processing needs to be done. If it finds an IPsec header, it uses information contained in the header, including a Security Parameters Index (SPI), an IPsec protocol type, and an IP destination address to search the SA memory 140 using SA lookup logic 146 and retrieves the applicable security association. The result is written to an SA pointer FIFO memory 148, which is coupled to the lookup logic 146 through the SA memory interface 142. The key corresponding to the SA is fetched and stored in RX key FIFO 152. A receive (RX) IPsec processor 150 performs the processing requires by the applicable SA using the key. The controller 102 reports what security processing it has done, so that the host 112 can check the SPD to verify that the frame conforms with policy. The processed frame is stored in the memory 116.

A receive IPsec parser 154, associated with IPsec processor 150, performs parsing that cannot be carried out before packet decryption. Some of this information is used by a receive (Rx) checksum and pad check system 156, which computes checksums specified by headers that may have been encrypted and also checks pad bits that may have been encrypted to verify that they follow a pre-specified sequence for pad bits. These operations are carried out while the received frame is passed to the PCI-X bus 104 via FIFO 158. The checksum and pad check results are reported to the status generator 134.

In the transmit path, an assembly RAM 160 is provided to accept frame data from the system memory 128, and to pass the data to the memory 116. The contents of a transmit frame can be spread among multiple data buffers 194 in the host memory 128, wherein retrieving a frame may involve multiple requests to the system memory 128 by the descriptor management unit 130. These requests are not always satisfied in the same order in which they are issued. The assembly RAM 160 ensures that received chunks of data are provided to appropriate locations in the memory 116. For transmitted frames, the host 112 checks the SPD (IPsec Security Policy Database) to determine what security processing is needed, and passes this information to the controller 102 in the frame's descriptor 192 in the form of a pointer to the appropriate SA in the SA memory 140. The frame data in the host system memory 128 provides space in the IPsec headers and trailers for authentication data, which the controller 102 generates. Likewise, space for padding (to make the payload an integral number of blocks) is provided when the frame is stored in the host system memory buffers 194, but the pad bits are written by the controller 102.

As the data is sent out from the assembly RAM 160, it passes also into a first transmit (TX) parser 162, which reads the MAC header, the IP header (if present), the TCP or UDP header, and determines what kind of a frame it is, and looks at control bits in the associated descriptor. In addition, the data from the assembly RAM 160 is provided to a transmit checksum system 164 for computing IP header and/or TCP checksums, which values will then be inserted at the appropriate locations in the memory 116. The descriptor management unit 130 sends a request to the SA memory interface 142 to fetch an SA key, which is then provided to a key FIFO 172 that feeds a pair of TX IPsec processors 174a and 174b. Frames are selectively provided to one of a pair of TX IPsec processors 174a and 174b for encryption and authentication via TX IPsec FIFOs 176a and 176b, respectively, wherein a transmit IPsec parser 170 selectively provides frame data from the memory 116 to a selected one of the processors 174. The two transmit IPsec processors 174 are provided in parallel because authentication processing cannot begin until after encryption processing is underway. By using the two processors 174, the speed is comparable to the receive side where these two processes can be carried out simultaneously.

Authentication does not cover mutable fields, such as occur in IP headers. The transmit IPsec parser 170 accordingly looks for mutable fields in the frame data, and identifies these fields to the processors 174a and 174b. The output of the processors 174a and 174b is provided to the second memory 118 via FIFOs 178a and 178b, respectively. An Integrity Check Value (ICV), which results from authentication processing, is inserted into the appropriate IPsec header by an insertion unit 179 as the frame data is passed from the memory 118 to the MAC engine 122 for transmission to the network 108.

In the single-chip implementation of FIG. 3, the controller 102a comprises a network port manager 182, which may automatically negotiate with an external physical (PHY) transceiver via management data clock (MDC) and management data I/O (MDIO) signals. The network port manager 175 may also set up the MAC engine 122 to be consistent with the negotiated configuration. Circuit board interfacing for LED indicators is provided by an LED controller 171, which generates LED driver signals LED0'-LED3' for indicating various network status information, such as active link connections, receive or transmit activity on the network, network bit rate, and network collisions. Clock control logic 173 receives a free-running 125 MHz input clock signal as a timing reference and provides various clock signals for the internal logic of the controller 102a.

A power management unit 188, coupled with the descriptor management unit 130 and the MAC engine 122, can be used to conserve power when the device is inactive. When an event requiring a change in power level is detected, such as a change in a link through the MAC engine 122, the power management unit 188 provides a signal PME' indicating that a power management event has occurred. The external serial EEPROM interface 114 implements a standard EEPROM interface, for example, the 93Cxx EEPROM interface protocol. The leads of external serial EEPROM interface 114 include an EEPROM chip select (EECS) pin, EEPROM data in and data out (EEDI and EEDO, respectively) pins, and an EEPROM serial clock (EESK) pin.

In the bus interface unit 104, address and data are multiplexed on bus interface pins AD[63:0]. A reset input RST' may be asserted to cause the network controller 102a to perform an internal system reset. A cycle frame I/O signal FRAME' is driven by the network controller when it is the bus master to indicate the beginning and duration of a transaction, and a PCI clock input PCI_CLK is used to drive the system bus interface over a frequency range of 15 to 133 MHz on the PCI bus (e.g., host bus 106). The network controller 102a also supports Dual Address Cycles (DAC) for systems with 64-bit addressing, wherein low order address bits appear on the AD[31:0] bus during a first clock cycle, and high order bits appear on AD[63:32] during the second clock cycle. A REQ64' signal is asserted by a device acting as bus master when it wants to initiate a 64-bit data transfer, and the target of the transfer asserts a 64-bit transfer acknowledge signal ACK64' to indicate that it is willing to transfer data using 64 bits. A parity signal PAR64 is an even 8 byte parity signal that protects AD[63:32] The bus master drives PAR64 for address and write data phases and the target drives PAR64 for read data phases.

The network controller 102a asserts a bus request signal REQ' to indicate that it wishes to become a bus master, and a bus grant input signal GNT' indicates that the access to the bus has been granted to the network controller. An initialization device select input signal IDSEL is used as a chip select for the network controller during configuration read and write transactions. Bus command and byte enable signals C/BE[7:

0] are used to transfer bus commands and to indicate which physical bytes of data lines AD[63:0] carry meaningful data. A parity I/O signal PAR indicates and verifies even parity across AD[31:0] and C/BE[3:0].

The network controller drives a drive select I/O signal DEVSEL' when it detects a transaction that selects the network controller 102a as a target. The network controller 102a checks DEVSEL' to see if a target has claimed a transaction that the network controller initiated. TRDY' is used to indicate the ability of the target of the transaction to complete the current data phase, and IRDY' indicates the ability of the initiator of the transaction to complete the current data phase. Interrupt request output signal INTA' indicates that one or more enabled interrupt flag bits are set. The network controller 102a asserts a parity error I/O signal PERR' when it detects a data parity error, and asserts a system error output signal SERR' when it detects an address parity error. In addition, the controller 102a asserts a stop I/O signal STOP' to inform the bus master to stop the current transaction.

In the MAC engine 122, a physical interface reset signal PHY_RST is used to reset the external PHY 111 (MII, GMII, TBI), a PHY loop-back output PHY_LPBK is used to force an external PHY device 111 into loop-back mode for systems testing, and a flow control input signal FC controls when the MAC transmits a flow control frame. The network controller 102a provides an external PHY interface 110 that is compatible with either the Media Independent Interface (MII), Gigabit Media Independent Interface (GMII), or Ten Bit Interface (TBI) per IEEE Std 802.3. Receive data input signals RXD [7:0] and output signals TXD[7:0] are used for receive and transmit data exchange, respectively. When the network controller 102a is operating in GMII or MII mode, TX_EN/TXD [8] is used as a transmit enable. In TBI mode, this signal is bit 8 of the transmit data bus. RX_DV/RXD[8] is an input used to indicate that valid receive data is being presented on the RX pins. In TBI mode, this signal is bit 8 of the receive data bus.

When the network controller 102a is operating in GMII or MII mode, RX_ER/RXD[9] is an input that indicates that the external transceiver device has detected a coding error in the receive frame currently being transferred on the RXD pins. In TBI mode, this signal is bit 9 of the receive data bus. MII transmit clock input TX_CLK is a continuous clock input that provides the timing reference for the transfer of the TX_EN and TXD[3:0] signals out of the network controller 102a in MII mode. GTX_CLK is a continuous 125 MHz clock output that provides the timing reference for the TX_EN and TXD signals from the network controller when the device is operating in GMII or TBI mode. RX_CLK is a clock input that provides the timing reference for the transfer of signals into the network controller when the device is operating in MII or GMII mode. COL is an input that indicates that a collision has been detected on the network medium, and a carrier sense input signal CRS indicates that a non-idle medium, due either to transmit or receive activity, has been detected (CRS is ignored when the device is operating in full-duplex mode). In TBI mode, 10-bit code groups represent 8-bit data packets. Some 10-bit code groups are used to represent commands. The occurrence of even and odd code groups and special sequences called commas are all used to acquire and maintain synchronization with the PHY 110. RBCLK[0] is a 62.5 MHz clock input that is used to latch odd-numbered code groups from the PHY device, and RBCLK[1] is used to latch even-numbered code groups. RBCLK[1] is always 180 degrees out of phase with respect to RBCLK[0]. COM_DET is asserted by an external PHY 111 to indicate the code group on the RXD[9:0] inputs includes a valid comma.

The IPsec module 124 includes an external RAM interface to memories 116 and 118. When CKE is driven high, an internal RAM clock is used to provide synchronization, otherwise the differential clock inputs CK and CKL are used. The RAM's have a command decoder, which is enabled when a chip select output CS_L is driven low. The pattern on the WE_L, RAS_L, and CAS_L pins defines the command that is being issued to the RAM. Bank address output signals BA[1: 0] are used to select the memory to which a command is applied, and an address supplied by RAM address output pins A[10:0] selects the RAM word that is to be accessed. A RAM data strobe I/O signal DQS provides the timing that indicates when data can be read or written, and data on RAM data I/O pins DQ[31:0] are written to or read from either memory 116 or 118.

Functional

Returning again to FIG. 2, an operational discussion of receive and transmit operation of the network controller 102 is provided below. Starting with receipt of a data frame from the network media 108 (e.g., an optical fiber), the frame is delivered to the GMII 110 (the Gigabit Media-Independent Interface), for example, as a series of bytes or words in parallel. The GMII 110 passes the frame to the MAC 122 according to an interface protocol, and the MAC 122 provides some frame management functions. For example, the MAC 122 identifies gaps between frames, handles half duplex problems, collisions and retries, and performs other standard Ethernet functions such as address matching and some checksum calculations. The MAC 122 also filters out frames, checks their destination address and accepts or rejects the frame depending on a set of established rules.

The MAC 122 can accept and parse several header formats, including for example, IPv4 and IPv6 headers. The MAC 122 extracts certain information from the frame headers. Based on the extracted information, the MAC 122 determines which of several priority queues (not shown) to put the frame in. The MAC places some information, such as the frame length and priority information, in control words at the front of the frame and other information, such as whether checksums passed, in status words at the back of the frame. The frame passes through the MAC 122 and is stored in the memory 118 (e.g., a 32 KB RAM). In this example, the entire frame is stored in memory 118. The frame is subsequently downloaded to the system memory 128 to a location determined by the descriptor management unit 130 according to the descriptors 192 in the host memory 128 (FIG. 4), wherein each receive descriptor 192 comprises a pointer to a data buffer 194 in the system memory 128. Transmit descriptors include a pointer or a list of pointers, as will be discussed in greater detail supra. The descriptor management unit 130 uses the DMA 126 to read the receive descriptor 192 and retrieve the pointer to the buffer 194. After the frame has been written to the system memory 128, the status generator 134 creates a status word and writes the status word to another area in the system memory 128, which in the present example, is a status ring. The status generator 134 then interrupts the processor 112. The system software (e.g., the network driver 190 in FIG. 4) can then check the status information, which is already in the system memory 128. The status information includes, for example, the length of the frame, what processing was done, and whether or not the various checksums passed.

In transmit operation, the host processor 112 initially dictates a frame transmission along the network 108, and the TCP layer 186 of the operating system (OS) in the host processor 112 is initiated and establishes a connection to the destination. The TCP layer 186 then creates a TCP frame that may be quite large, including the data packet and a TCP header. The IP layer 188 creates an IP header, and an Ethernet (MAC) header is also created, wherein the data packet, and the TCP, IP, and MAC headers may be stored in various locations in the host memory 128. The network driver 190 in the host processor 112 may then assemble the data packet and the headers into a transmit frame, and the frame is stored in one or more data buffers 194 in the host memory 128. For example, a typical transmit frame might reside in four buffers 194: the first one containing the Ethernet or MAC header, the second one having the IP header, the third one the TCP header, and the fourth buffer containing the data. The network driver 190 generates a transmit descriptor 192 that includes a list of pointers to all these data buffers 194.

The frame data is read from the buffers 194 into the controller 102. To perform this read, the descriptor management unit 130 reads the transmit descriptor 192 and issues a series of read requests on the host bus 106 using the DMA controller 126. However, the requested data portions may not arrive in order they were requested, wherein the PCI-X interface 104 indicates to the DMU 130 the request with which the data is associated. Using such information, the assembly RAM logic 160 organizes and properly orders the data to reconstruct the frame, and may also perform some packing operations to fit the various pieces of data together and remove gaps. After assembly in the assembly RAM 160, the frame is passed to the memory 116 (e.g., a 32 KB RAM in the illustrated example). As the data passes from the assembly RAM 160, the data also passes to the TX parser 162. The TX parser 162 reads the headers, for example, the MAC headers, the IP headers (if there is one), the TCP or UDP header, and determines what kind of a frame it is, and also looks at the control bits that were in the associated transmit descriptor 192. The data frame is also passed to the transmit checksum system 164 for computation of TCP and/or IP layer checksums.

The transmit descriptor 192 may comprise control information, including bits that instruct the transmit checksum system 164 whether to compute an IP header checksum and/or TCP checksum. If those control bits are set, and the parser 162 identifies or recognizes the headers, then the parser 162 tells the transmit checksum system 164 to perform the checksum calculations, and the results are put at the appropriate location in the frame in the memory 116. After the entire frame is loaded in the memory 116, the MAC 122 can begin transmitting the frame, or outgoing security processing (e.g., encryption and/or authentication) can be performed in the IPsec system 124 before transmission to the network 108.

By offloading the transmit checksumming function onto the network controller 102 of the present invention, the host processor 112 is advantageously freed from that task. In order for the host processor 112 to perform the checksum, significant resources must be expended. Although the computation of the checksum is relatively simple, the checksum, which covers the entire frame, must be inserted at the beginning of the frame. In conventional architectures, the host computer makes one pass through the frame to calculate the checksum, and then inserts the checksum at the beginning of the frame. The data is then read another time as it is loaded into the controller. The network controller 102 further reduces the load on the host processor 112 by assembling the frame using direct access to the system memory 128 via the descriptors 192 and the DMA controller 126. Thus, the network controller 102 frees the host processor 112 from several time consuming memory access operations.

In addition to the receive and transmit functions identified above, the network controller 102 may also be programmed to perform various segmentation functions during a transmit operation. For example, the TCP protocol allows a TCP frame to be as large as 64,000 bytes. The Ethernet protocol does not allow data transfers that large, but instead limits a network frame to about 1500 bytes plus some headers. Even in the instance of a jumbo frame option that allows 16,000 byte network frames, the protocol does not support a 64 KB frame size. In general, a transmit frame initially resides in one or more of the data buffers 194 in system memory 128, having a MAC header, an IP header, and a TCP header, along with up to 64 KB of data. Using the descriptor management unit 130, the frame headers are read, and an appropriate amount of data (as permitted by the Ethernet or network protocol) is taken and transmitted. The descriptor management unit 130 tracks the current location in the larger TCP frame and sends the data block by block, each block having its own set of headers.

For example, when a data transmit is to occur, the host processor 112 writes a descriptor 192 and informs the controller 102. The descriptor management unit 130 receives a full list of pointers, which identify the data buffers 194, and determines whether TCP segmentation is warranted. The descriptor management unit 130 then reads the header buffers and determines how much data can be read. The headers and an appropriate amount of data are read into the assembly RAM 160 and the frame is assembled and transmitted. The controller 102 then re-reads the headers and the next block or portion of the untransmitted data, modifies the headers appropriately and fonts the next frame in the sequence. This process is then repeated until the entire frame has been sent, with each transmitted portion undergoing any selected security processing in the IPsec system 124.

The network controller 102 of the present invention also advantageously incorporates IPSec processing therein. In contrast with conventional systems that offload IPSec processing, the present invention employs on-board IPSec processing, which may be implemented as a single-chip device 102*a* (FIG. 3). In conventional systems, either the host processor carries out IPSec processing or a co-processor, separate from the network controller, is employed. Use of the host processor is very slow, and in either case, the frame passes at least three times through the memory bus. For example, when a co-processor is used, the frame passes through the bus once as it is read from memory and sent to the co-processor, again as it passes back to the system memory, and a third time as it is sent to the network controller. This processing consumes significant bandwidth on the PCI bus and negatively impacts system performance. A similar performance loss is realized in the receive direction.

IPSec processing has two primary goals: first is to encrypt, or scramble, the data so that an unauthorized person or system cannot read the data. The second goal is authentication, which ensures that the packet is uncorrupted and that the packet is from the expected person or system. A brief discussion of the on-board IPSec processing follows below. The network controller 102 of the present invention takes advantage of security associations (SAs) using the SA memory interface 142, the SA lookup 146, and the SA memory 140. As briefly highlighted above, a security association is a collection of bits that describe a particular security protocol, for example, whether the IPSec portion 124 is to perform an encryption or authentication, or both, and further describes what algorithms to employ. There are several standard encryption and authentication algorithms, so the SA interface 142 and SA lookup 146 indicates which one is to be used for a particular frame. The SA memory 140 in the present example is a private memory, which stores the encryption keys. The SAs are obtained according to an IPSec protocol whereby sufficient information is exchanged with a user or system on the network to decide which algorithms to use and allow both parties to generate the same keys. After the information exchange is completed, the software calls the driver 190, which writes the results into the SA memory 140.

Once the key exchange is complete, the appropriate bits reside in the SA memory 140 that indicate which key is to be used and which authentication algorithm, as well as the actual keys. In transmit mode, part of the descriptor 192 associated with a given outgoing frame includes a pointer into the SA memory 140. When the descriptor management unit 130 reads the descriptor 192, it sends a request to the SA memory interface 142 to fetch the key, which then sends the key to the key FIFO 172, that feeds the TX IPSec processing modules 174a and 174b, respectively. When both encryption and authentication are to be employed in transmit, the process is slightly different because the tasks are not performed in parallel. The authentication is a hash of the encrypted data, and consequently, the authentication waits until at least a portion of the encryption has been performed. Because encryption may be iterative over a series of data blocks, there may be a delay between the beginning of the encryption process and the availability of the first encrypted data. To avoid having this delay affect device performance, the exemplary network interface 102 employs two TX IPSec process engines 174a and 174b, wherein one handles the odd numbered frames and the other handles the even numbered frames in the illustrated example.

Prior to performing the IPSec processing, the TX IPsec parser 170 parses the frame headers and looks for mutable fields therein, which are fields within the headers that are not authenticated because they vary as the frame travels over the network 108. For example, the destination address in the IP header varies as the frame goes across the Internet from router to router. The transmit IPsec parser 170 identifies the mutable fields and passes the information to the TX IPSec processors 174, which selectively skip over the mutable field portions of the frames. The processed frames are sent to FIFOs 178a and 178b and subsequently accumulated in the memory 118. The result of the authentication processing is an integrity check value (ICV), which is inserted by insertion block 179 into the appropriate IPsec header as the frame is transmitted from the memory 118 to the network media 108.

In receive mode, a received frame comes into the MAC 122 and the RX parser 144. The RX parser 144 parses the incoming frame up to the IPsec headers and extracts information therefrom. The fields that are important to the RX parser 144 are, for example, the destination IP address in the IP header, the SPI (Security Protocol Index), and a protocol bit that indicates whether an IPSec header is an authentication header (AH) or an encapsulation security protocol (ESP) header. Some of the extracted information passes to the SA lookup block 146. The SA lookup block 146 identifies the appropriate SA and conveys the information to the SA memory interface 142 that retrieves the SA and places it into the key FIFO 152.

The SA lookup block 146 employs an on-chip SPI Table and the off-chip SA memory 140. The SPI Table is organized into 4096 bins, each comprising 4 entries. The entries include the 32-bit SPI, a hash of the destination address (DA), a bit to indicate the protocol, and a bit to indicate whether the entry is used. Corresponding entries in the SA memory contain the full DAs and the SA (two SAs when there is both authentication and encryption). The bin for each entry is determined by a hash of the SPI. To look up an SA, a hash of the SPI from the received frame is used to determine which bin to search. Within the bin, the SA lookup block 146 searches the entries for a match to the full SPI, the destination address hash, and the protocol bit. After searching, the SA lookup block writes an entry to the SA pointer FIFO 148, which either identifies a matching entry or indicates no match was found. A check of the DA address from the SA memory is made just before security processing. If there is no match, security processing is not performed on the frame in question. Based on the entries in the SA pointer FIFO 148, the keys are fetched from the external SA memory 140 and placed in the key FIFO 152. The RX IPSec processor 150 takes the keys that come in from the FIFO 152, reads the corresponding frame data out of the memory 118, and begins processing the frame, as required. For receive processing, decryption and authentication proceed in parallel (on receive, decryption and authentication are not sequential processes), and thus in this example only one RX IPSec processor is used.

The RX IPsec parser 154 parses the headers that follow the ESP header. Any header that follows the ESP header will be encrypted and cannot be parsed until decryption has taken place. This parsing must be completed before TCP/UDP checksums can be computed and before pad bits can be checked. The decrypted data is stored in the memory 116. To perform the TCP/UDP checksums and pad checks without having to store the frame data another time, these functions are carried out by checksum and pad check system 156 while the data is being transferred from the memory 116 to the host memory 128. In addition to the on-board IPSec processing and TCP segmentation highlighted above, the network controller 102 also provides performance improvements in the execution of interrupts. Read latencies are large when a host processor is required to read a register from a network device. These latencies negatively impact system performance. In particular, as the host processor clock speed continues to increase, the disparity between the clock speed and the time it takes to get a response from a network controller over a PCI or other host bus becomes larger. Accordingly, when a host processor needs to read from a network device, the processor must wait a greater number of clock cycles, thereby resulting in opportunity loss.

The network interface 102 avoids many read latencies by replacing read operations with write operations. Write operations are not as problematic because they can take place without involving the processor 112. Thus when write information is sent to a FIFO, as long as the writes are in small bursts, the network controller 102 can take the necessary time to execute the writes without negatively loading the processor. To avoid read operations during a transmit operation, the driver creates a descriptor 192 in the system memory 128 and then writes a pointer to that descriptor to the register 132 of the network controller 102. The DMU 130 of the controller 102 sees the contents in the register 132 and reads the necessary data directly from the system memory 128 without further intervention of the processor 112. For receive operations, the driver software 190 identifies empty buffers 194 in the system memory 128, and writes a corresponding entry to the register 132. The descriptor management unit 130 writes to pointers in the transmit descriptor rings to indicate which transmit descriptors 192 have been processed and to pointers in the status rings to indicate which receive buffers 194 have been used.

Unlike conventional architectures that require a host processor to read an interrupt register in the network controller, the present invention generates and employs a control status block (CSB) 196 located in a predetermined region of the system memory 128 (e.g., a location determined upon initialization). The network controller 102 writes to the CSB 196 any register values the system needs. More particularly, after a frame has been completely processed, prior to generating an interrupt, the network controller 102 writes a copy of the interrupt register to the CSB 196. Then the controller 102 asserts the interrupt; thus when the host processor 112 sees the interrupt in the register 132, the received data is already available in the receive data buffer 194.

Various operational and structural details of the exemplary network interface controller 102 are hereinafter provided in conjunction with the figures. In particular, details of the descriptor management features, transmit data frame segmentation and checksumming, as well as security processing are illustrated and described below in greater detail to facilitate an understanding of the present invention in the context of the exemplary controller 102.

Descriptor Management

Figure 5A:
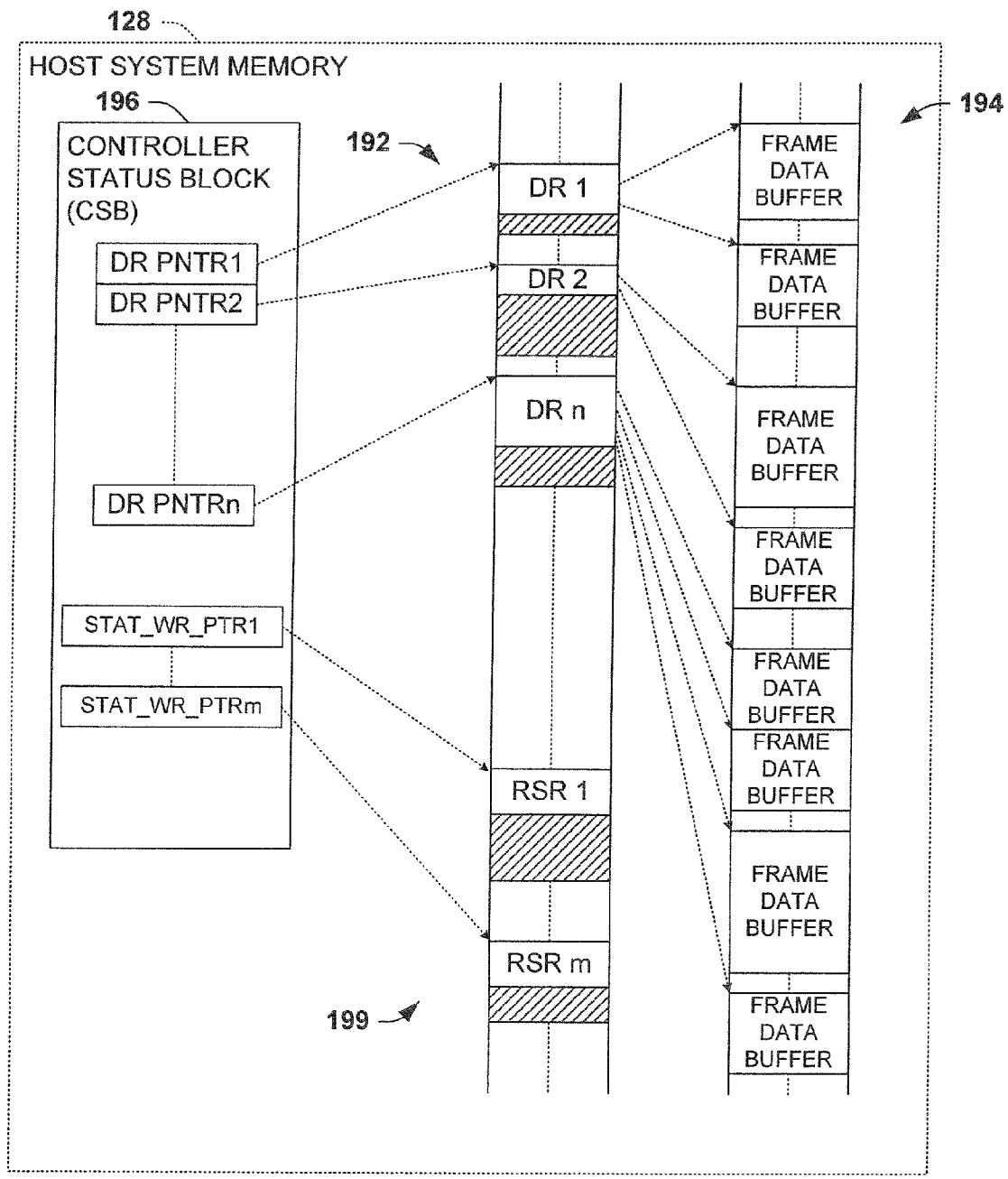
FIG. 5A is a schematic diagram illustrating a control status block in a host system memory with pointers to descriptor rings and receive status rings in the host system of FIG. 2.
Figure 5B:
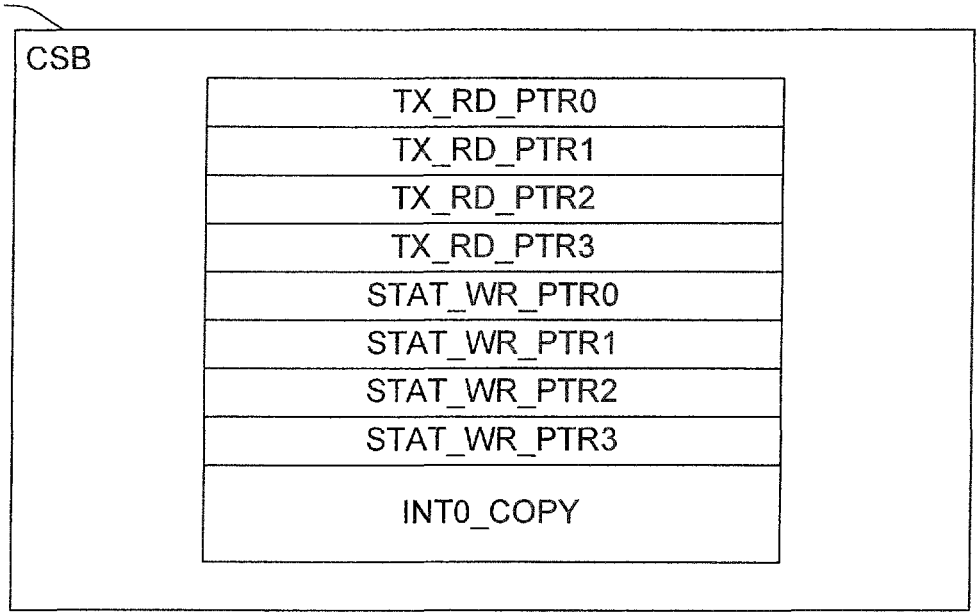
FIG. 5B is a schematic diagram illustrating a controller status block in the host memory of the host system of FIG. 2.
Figure 5C:
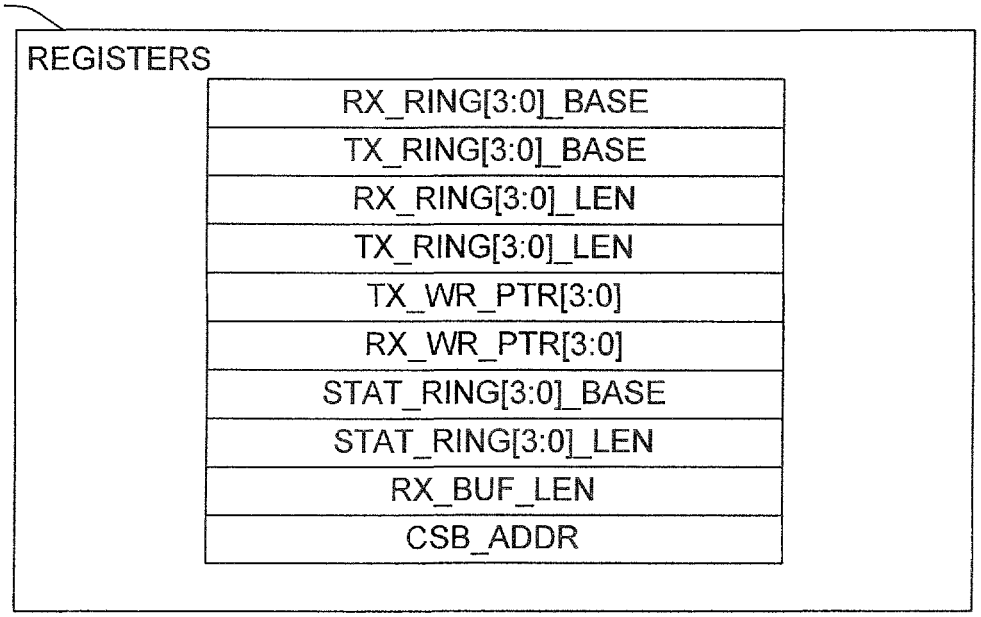
FIG. 5C is a schematic diagram illustrating descriptor management unit registers in the network interface system of FIG. 2.
Figure 5D:
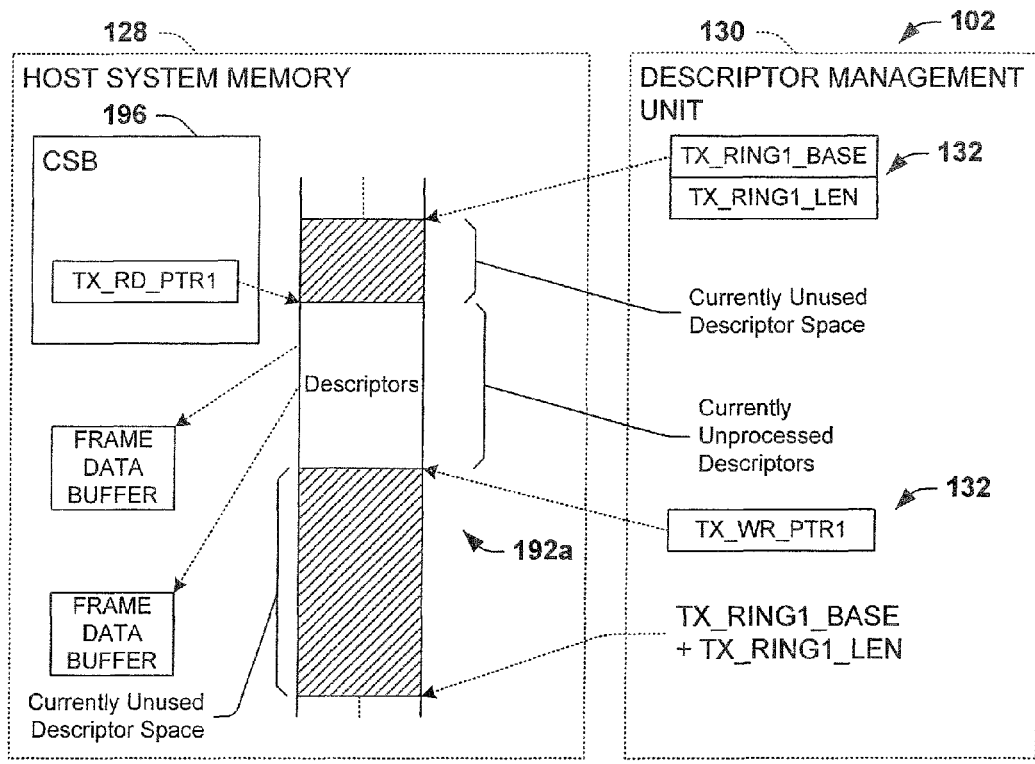
FIG. 5D is a schematic diagram illustrating an exemplary transmit descriptor ring in host system memory and pointer registers in a descriptor management unit of the network interface system of FIG. 2.
Figure 5E:
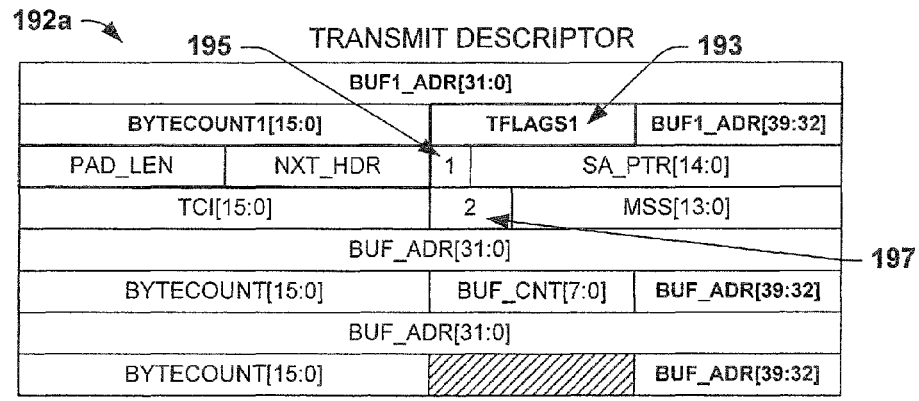
FIG. 5E is a schematic diagram illustrating an exemplary transmit descriptor in the network interface system of FIG. 2.
Figure 5F:
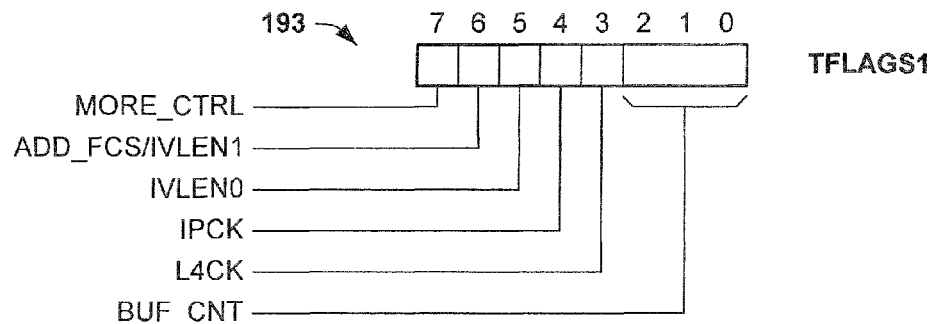
FIG. 5F is a schematic diagram illustrating a transmit flags byte in the transmit descriptor of FIG. 5E.
Figure 5I:
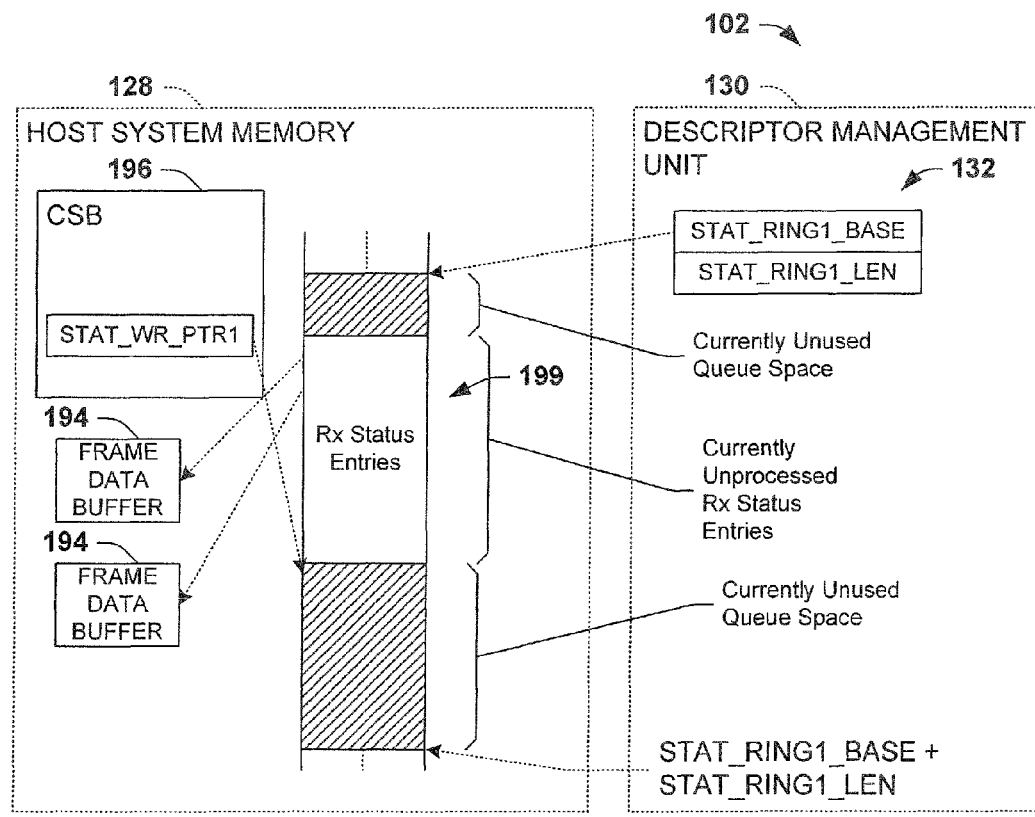
FIG. 5I is a schematic diagram illustrating an exemplary receive status ring in host system memory and pointer registers in the descriptor management unit in the network interface system of FIG. 2.
Figure 5J:
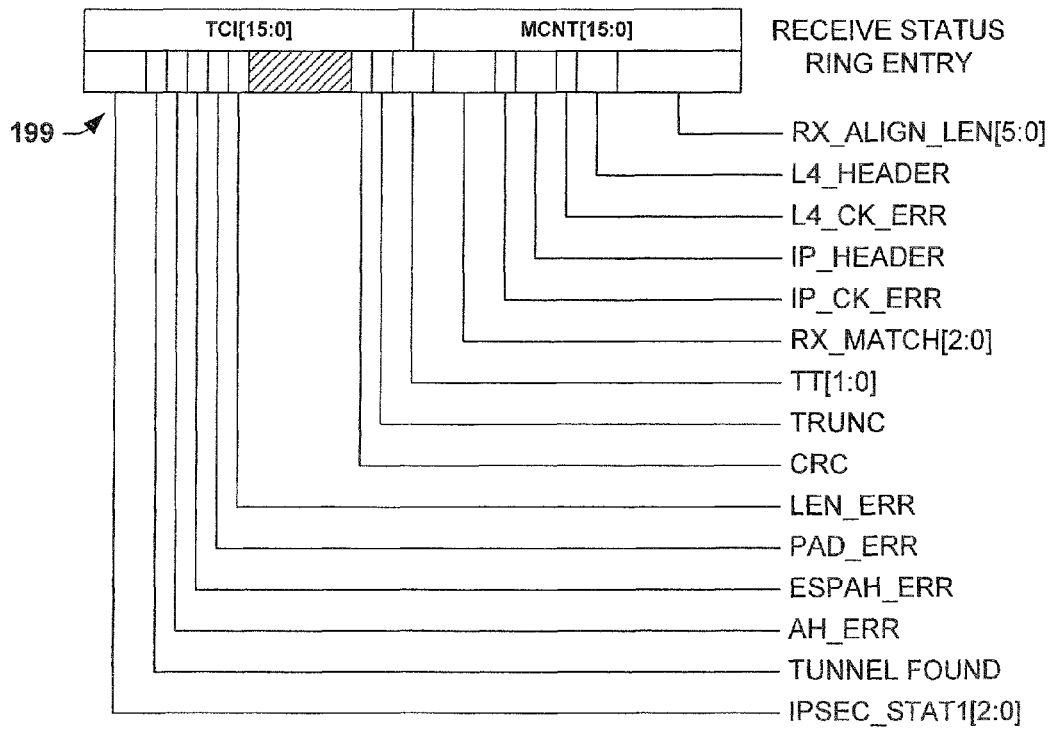
FIG. 5J is a schematic diagram illustrating an exemplary receive status ring entry in the host system memory.

Referring now to FIGS. 2, 4, and 5A-5J, further details of the descriptors 192 and the operation of the exemplary controller 102 are illustrated and described below. FIG. 5A illustrates the host memory 128, including the controller status block (CSB) 196, frame data buffers 194, an integer number 'n' descriptor rings DR1 . . . DRn for transmit and receive descriptors 192, and an integer number 'm' receive status rings 199 RSR1 . . . RSRm. The transmit and receive descriptors 192 are stored in queues referred to herein as descriptor rings DR, and the CSB 196 includes descriptor ring pointers DR_PNTR1 . . . DR_PNTRn to the descriptor rings DR. In the exemplary controller 102, four transmit descriptor rings are provided for transmitted frames and four receive descriptor rings are provided for received frames, corresponding to four priorities of network traffic. Each descriptor ring DR in this implementation is treated as a continuous ring structure, wherein the first memory location in the ring is considered to come just after the last memory location thereof. FIG. 5B illustrates pointers and other contents of the exemplary CSB 196 and FIG. 5C illustrates various pointer and length registers 132 in the controller 102. FIG. 5D illustrates further details of an exemplary transmit descriptor ring, FIG. 5H and FIG. 5I show details relating to exemplary receive descriptor and receive status rings, respectively. FIGS. 5E and 5F illustrate an exemplary transmit descriptor, FIG. 5G illustrates an exemplary receive descriptor, and FIG. 5J illustrates an exemplary receive status ring entry.

As shown in FIG. 5A, the descriptors 192 individually include pointers to one or more data buffers 194 in the system memory 128, as well as control information, as illustrated in FIGS. 5E-5G. Synchronization between the controller 102 and the software driver 190 is provided by pointers stored in the controller registers 132, pointers stored in the CSB 196 in the system memory 128, and interrupts. In operation, the descriptor management unit 130 in the controller 102 reads the descriptors 192 via the DMA controller 126 of the bus interface 104 in order to determine the memory location of the outgoing frames to be transmitted (e.g., in the data buffers 194) and where to store incoming frames received from the network 108. The CSB 196 is written by the network controller 102 and read by the driver 190 in the host processor 112, and the descriptor management registers 132 are written by the driver 190 and read by the descriptor management unit 130 in the controller 102. The exemplary descriptor system generally facilitates information exchange regarding transmit and receive operations between the software driver 190 and the controller 102.

Referring now to FIG. 5B, the exemplary CSB 196 includes pointers into the descriptor and status rings, as well as a copy of the contents of the controller's interrupt register. Transmit pointers TX_RD_PTR0 through TX_RD_PTR3 are descriptor read pointers corresponding to transmit priorities 3 through 0, respectively, which point just beyond the last 64-bit quad word (QWORD) that the controller 102 has read from the corresponding priority transmit descriptor ring. Receive status pointers STAT_WR_PTR0 through STAT_WR_PTR3 are descriptor write pointers corresponding to transmit priorities 3 through 0, respectively, which point just beyond the last QWORD that the controller 102 has written to the corresponding priority receive status ring. The CSB 196 also comprises an interrupt zero register copy INTO_COPY, which is a copy of the contents of an interrupt 0 register in the controller 102.

FIG. 5C illustrates registers 132 related to the descriptor management unit 130 in the controller 102. Transmit descriptor base pointers TX_RING[3:0]_BASE include the memory addresses of the start of the transmit descriptor rings of corresponding priority, and the lengths of the transmit descriptor rings are provided in TX_RING[3:0]_LEN registers. Transmit descriptor write pointers are stored in registers TX_WR_PTR[3:0], where the driver software 190 updates these registers to point just beyond the last QWORD that the driver has written to the corresponding transmit descriptor ring. Receive descriptor base pointers RX_RING[3:0]_BASE include the memory address (e.g., in host memory 128) of the start of the receive descriptor rings of corresponding priority, and the lengths of these receive descriptor rings are provided in RX_RING[3:0]_LEN registers. Receive descriptor write pointers RX_WR_PTR[3:0] are updated by the driver 190 to point just beyond the last QWORD that the driver has written to the corresponding receive descriptor ring. Receive status ring base pointer registers STAT_RING[3:0]_BASE indicate the memory address of the receive status rings, and STAT_RING[3:0]_BASE indicate the lengths of the corresponding receive status rings 199 in memory 128. RX_BUF_LEN indicates the number of QWORDS of the receive data buffers 194, where all the receive data buffers 194 are of the same length, and CSB_ADDR indicates the address of the CSB 196 in the host memory 128.

To further illustrate descriptor management operation in data transmission, FIG. 5D illustrates the host memory 128 and the descriptor management unit 130, including an exemplary transmit descriptor ring in the host memory 128 and the corresponding descriptor registers 132 in the descriptor management unit 130 of the controller 102. In addition, FIGS. 5E and 5F illustrate an exemplary transmit descriptor 192a and control flags thereof, respectively. In the transmit descriptor 102 of FIG. 5E, BUF1_ADR[39:0] includes an address in the host memory 128 of the first data buffer 194 associated with the descriptor 192a. The descriptor 192a also includes transmit flags (TFLAGS1, FIGS. 5E and 5F) 193, which include a MORE_CTRL bit to indicate inclusion of a second 64-bit control word with information relating to virtual local area network (VLAN) operation and TCP segmentation operation. An ADD_FCS/IVLEN1 bit and an IVLEN0 bit are used for controlling FCS generation in the absence of IPsec processing, or to indicate the length of an encapsulation security protocol (ESP) initialization vector (IV) when IPsec security and layer 4 processing are selected. An IPCK bit is used to indicate whether the controller 102 generates a layer 3 (IP layer) checksum for transmitted frames, and an L4CK flag bit indicates whether the controller 102 generates a layer 4 (e.g., TCP, UDP, etc.) checksum. Three buffer count bits BUF_CNT indicate the number of data buffers 194 associated with the descriptor 192a, if less than 8. If more than 8 data buffers 194 are associated with the descriptor 192a, the buffer count is provided in the BUF_CNT[7:0] field of the descriptor 192a.

A BYTECOUNT1[15:0] field in the descriptor 192a indicates the length of the first data buffer 194 in bytes. A PAD_LEN field includes a pad length value from an ESP trailer associated with the frame and a NXT_HDR field provides next header information (protocol data for IPv4) from the ESP trailer if the MORE_CTRL bit is set. Following the NXT_HDR field, an ESP_AUTH bit 195 indicates whether the frame includes an authentication data field in the ESP trailer, and a security association (SA) pointer field SA_PTR [14:0] points to an entry in the external SA memory 140 (FIG. 2) that corresponds to the frame. A two bit VLAN tag control command field TCC[1:0] 197 includes a command which causes the controller 102 to add, modify, or delete a VLAN tag or to transmit the frame unaltered, and a maximum segment size field MSS[13:0] specifies the maximum segment size that the TCP segmentation hardware of the controller 102 will generate for the frame associated with the descriptor 192a. If the contents of the TCC field are 10 or 11, the controller 102 will transmit the contents of a tag control information field TCI[15:0] as bytes 15 and 16 of the outgoing frame. Where the frame data occupies more than one data buffer 194, one or more additional buffer address fields BUF_ADR[39:0] are used to indicate the addresses thereof, and associated BYTECOUNT[15:0] fields are used to indicate the number of bytes in the extra frame buffers 194.

When the network software driver 190 writes a descriptor 192 to a descriptor ring, it also writes to a descriptor write pointer register 132 in the descriptor management unit registers 132 to inform the controller 102 that new descriptors 192 are available. The value that the driver writes to a given descriptor management register 132 is a pointer to a 64-bit word (QWORD) in the host memory 128 just past the descriptor 192 that it has just written, wherein the pointer is an offset from the beginning of the descriptor ring measured in QWORDs. The controller 102 does not read from this offset or from anything beyond this offset. When a transmit descriptor write pointer register (e.g., DMU register 132, such as TX_WR_PTR1 in FIG. 5D) has been written, the controller 102 starts a transmission process if a transmission is not already in progress. When the transmission process begins, it continues until no unprocessed transmit descriptors 192 remain in the transmit descriptor rings. When the controller 102 finishes a given transmit descriptor 192, the controller 102 writes a descriptor read pointer (e.g., pointer TX_RD_PTR1 in FIG. 5D) to the CSB 196.

At this point, the descriptor read pointer TX_RD_PTR1 points to the beginning of the descriptor 192 that the controller 102 will read next. The value of the descriptor 192 is the offset in QWORDs of the QWORD just beyond the end of the last descriptor that has been read. This pointer TX_RD_PTR1 thus indicates to the driver 190 which part of descriptor space it can reuse. The driver 190 does not write to the location in the descriptor space that the read pointer points to or to anything between that location and 1 QWORD before the location that the descriptor write pointer TX_WR_PTR1 points to. When the descriptor read pointer TX_RD_PTR1 is equal to the corresponding descriptor write pointer TX_WR_PTR1, the descriptor ring is empty. To distinguish between the ring empty and ring full conditions, the driver 190 insures that there is always at least one unused QWORD in the ring. In this manner, the transmit descriptor ring is full when the write pointer TX_WR_PTR1 is one less than the read pointer TX_RD_PTR1 modulo the ring size.

Referring also to FIG. 5G, an exemplary receive descriptor 192b is illustrated, comprising a pointer BUF_ADR[39:0] to a block of receive buffers 194 in the host system memory 128, and a count field BUF_MULT[7:0] indicating the number of buffers 194 in the block, wherein all the receive buffers 194 are the same length and only one buffer is used for each received frame in the illustrated example. If the received frame is too big to fit in the buffer 104, the frame is truncated, and a TRUNC bit is set in the corresponding receive status ring entry 199. FIG. 5H illustrates an exemplary receive descriptor ring comprising an integer number n receive descriptors 192b for storing addresses pointing to n receive data buffers 194 in the host memory 128. The registers 132 in the descriptor management unit 130 of the controller 102 include ring base and length registers (RX_RING1_BASE and RX_RING1_LEN) corresponding to the receive descriptor ring, as well as a receive write pointer register (RX_WR_PTR1) including an address of the next unused receive descriptor 192b in the illustrated descriptor ring, and a receive buffer length register (RX_BUF_LEN) including the length of all the buffers 194. The descriptor management unit 130 also has registers 132 (STAT_RING1_BASE and STAT_RING1_LEN) related to the location of the receive status ring having entries 199 corresponding to received data within one or more of the buffers 194. The control status block 196 in the host memory 128 also includes a register STAT_WR_PTR1 whose contents provide the address in the receive status ring of the next unused status ring location, wherein the receive status ring is considered empty if STAT_WR_PTR1 equals RX_WR_PTR1.

FIGS. 5I and 5J illustrate further details of an exemplary receive status ring 199 and an entry therefor, respectively. The exemplary receive status ring entry of FIG. 5J includes VLAN tag control information TCI[15:0] copied from the receive frame and a message count field MCNT[15:0] indicating the number of bytes received which are copied in the receive data buffer 194. A three bit IPSEC_STAT1[2:0] field indicates encoding status from the IPsec security system 124 and a TUNNEL_FOUND bit indicates that a second IP header was found in the received data frame. An AH_ERR bit indicates an authentication header (AH) failure, an ESPAH_ERR bit indicates an ESP authentication failure, and a PAD_ERR bit indicates an ESP padding error in the received frame. A CRC bit indicates an FCS or alignment error and a TRUNC bit indicates that the received frame was longer than the value of the RX_BUF_LEN register 132 (FIG. 5C above), and has been truncated. A VLAN tag type field TT[1:0] indicates whether the received frame is untagged, priority tagged, or VLAN tagged, and an RX_MATCH[2:0] field indicates a receive address match type. An IP_CK_ERR bit indicates an IPv4 header checksum error, and an IP header detection field IP_HEADER[1:0] indicates whether an IP header is detected, and if so, what type (e.g., IPv4 or IPv6). An L4_CK-ERR bit indicates a layer 4 (e.g., TCP or UDP) checksum error in the received frame and a layer 4 header detection field L4_HEADER indicates the type of layer 4 header detected, if any. In addition, a receive alignment length field RCV_ALIGN_LEN[5:0] provides the length of padding inserted before the beginning of the MAC header for alignment.

As shown in FIGS. 5H and 5I, in receive operation, the controller 102 writes receive status ring write pointers STAT_WR_PTR[3:0] (FIG. 5B) to the CSB 196. The network driver software 190 uses these write pointers to determine which receive buffers 194 in host memory 128 have been filled. The receive status rings 199 are used to transfer status information about received frames, such as the number of bytes received and error information, wherein the exemplary system provides four receive status rings 199, one for each priority. When the controller 102 receives an incoming frame from the network 108, the controller 102 uses the next receive descriptor 192 from the appropriate receive descriptor ring to determine where to store the frame in the host memory 128. Once the received frame has been copied to system memory 128, the controller 102 writes receiver status information to the corresponding receive status ring 199. Synchronization between controller 102 and the driver software 190 is provided by the receive status write pointers (STAT_WRPTR[3: 0]) in the CSB 196. These pointers STAT_WR_PTR[3:0] are offsets in QWORDs from the start of the corresponding ring.

When the controller 102 finishes receiving a frame from the network 108, it writes the status information to the next available location in the appropriate receive status ring 199, and updates the corresponding receive status write pointer STAT_WR_PTR. The value that the controller 102 writes to this location is a pointer to the status entry in the ring that it will write to next. The software driver 190 does not read this entry or any entry past this entry. The exemplary controller 102 does not have registers that point to the first unprocessed receive status entry in each ring. Rather, this information is derived indirectly from the receive descriptor pointers RX_WR_PTR. Thus, when the software driver 190 writes to one of the RX_WR_PTR registers 132 (FIG. 5C) in the controller 102, the driver 190 ensures that enough space is available in the receive status ring 199 for the entry corresponding to this buffer 104.

Transmit Data Frames

Figure 6A:
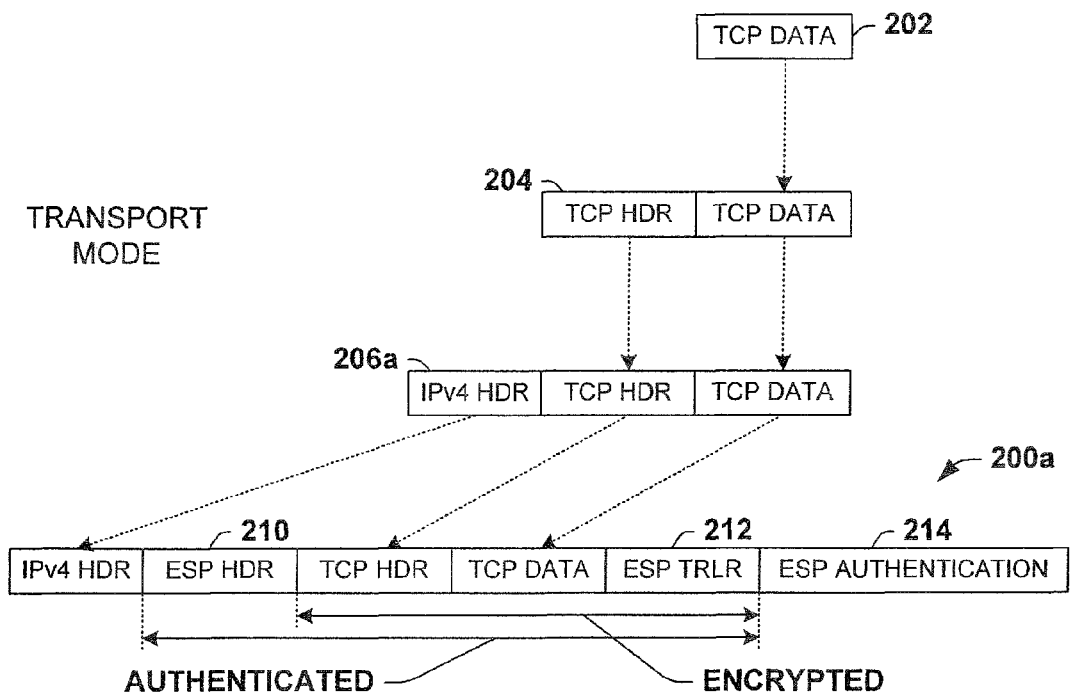
FIGS. 6A and 6B are schematic diagrams illustrating outgoing data from TCP through transport mode ESP processing for IPv4 and IPv6, respectively.
Figure 6B:
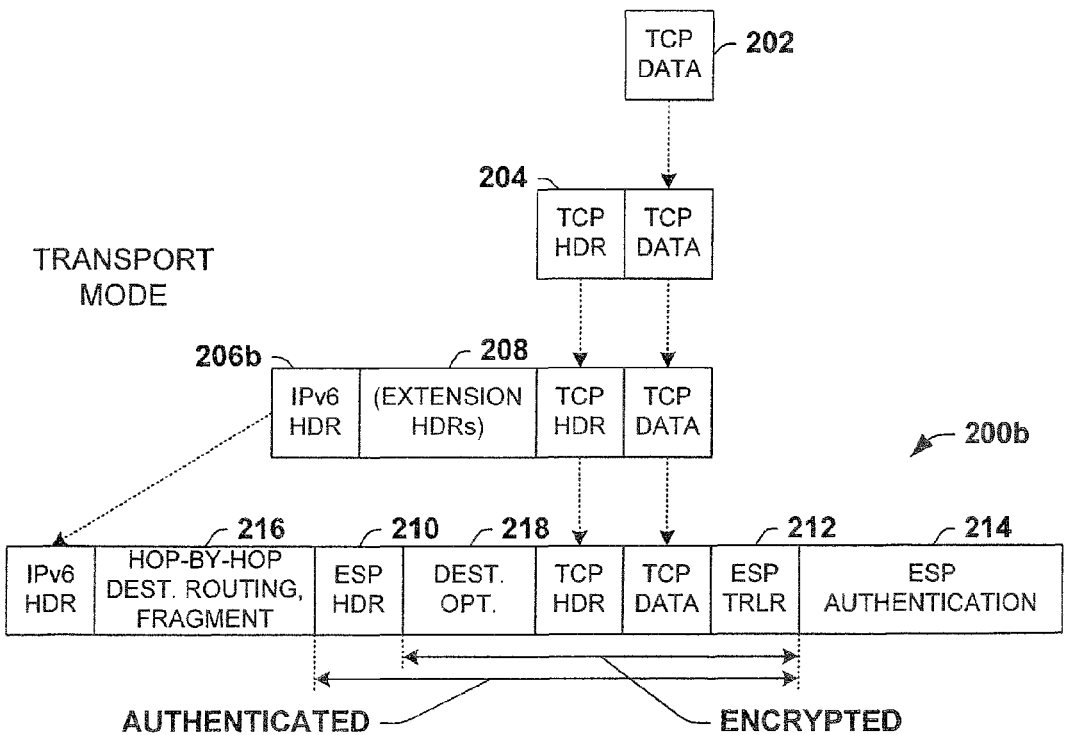
Figure 6C:
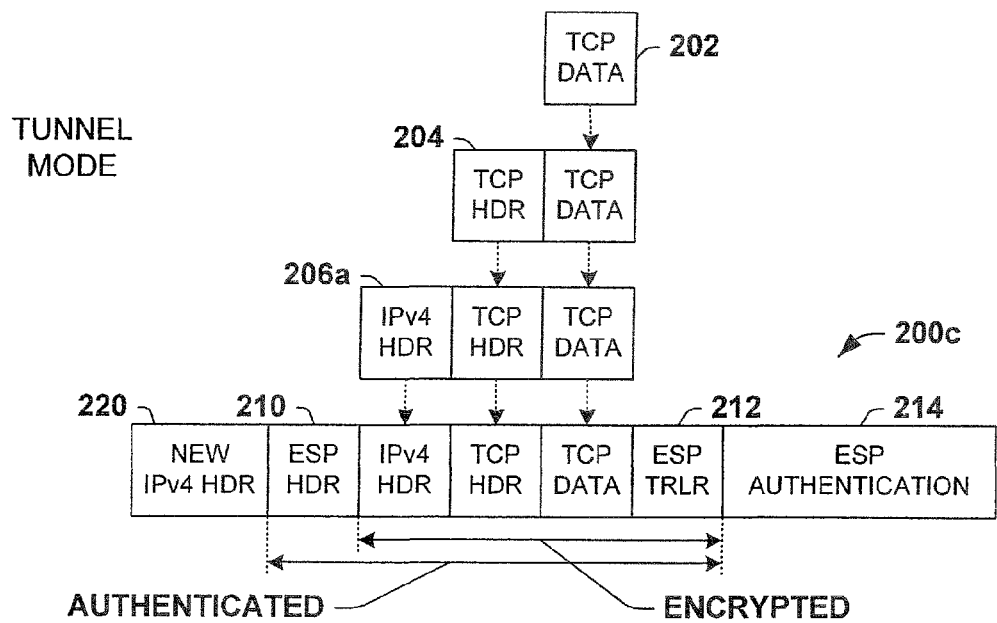
FIGS. 6C and 6D are schematic diagrams illustrating outgoing data from TCP through tunnel mode ESP processing for IPv4 and IPv6, respectively.
Figure 6D:
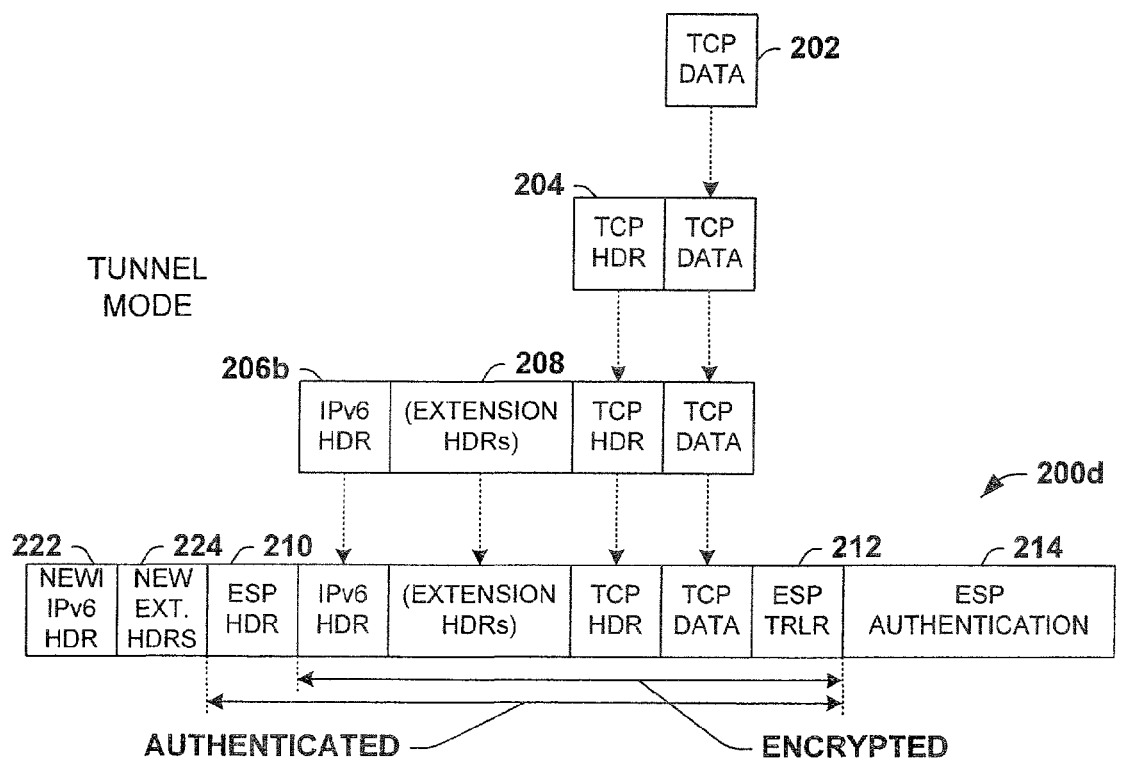

Referring now to FIGS. 2-4 and 6A-6E, the controller 102 transmits frames 200 from the data buffers 194 in host memory 128 using the transmit descriptors 192 described above. When an application software program 184 running in the host processor 112 needs to send a packet of data or information to another computer or device on the network 108, the packet is provided to the operating system layer 4 and 3 software (e.g., TCP layer software 186 and IP software 188 in FIG. 4). These software layers construct various headers and trailers to form a transmit frame 200. The network interface driver software 190 then assembles the frame 200, including one or more headers and the data packet, into the host memory data buffers 194 and updates the descriptors and descriptor management unit registers 132 in the controller 102 accordingly. The assembled frame in the data buffers 194 includes layer 3 and layer 4 headers and corresponding checksums (e.g., IP and TCP headers and checksums), as well as a MAC header, as illustrated in FIGS. 7A and 7B. FIGS. 6A and 6C schematically illustrate the formation of transmit frames 200*a* and 200*c* using layer 4 TCP and layer 3 internet protocol version 4 (IPv4) for transport and tunnel modes, respectively, and FIGS. 6B and 6D schematically illustrate the formation of transmit frames 200*b* and 200*d* using IPv6 for transport and tunnel modes, respectively. However, the invention is not limited to TCP/IP implementations, wherein other protocols may be used. For example, the exemplary controller 102 may also be used for transmission and receipt of data using user data gram protocol (UDP) layer 4 software.

In FIGS. 6A-6D, the original data packet from the application software 184 is provided to the TCP layer 186 as TCP data 202. The TCP layer 186 stores the TCP data 202 in host memory 128 and creates a TCP header 204. The TCP Exemplary TCP headers are illustrated and described below with respect to FIGS. 7A and 7B. The TCP data 202 and TCP header (e.g., or pointers thereto) are provided to the layer 3 software (e.g., IP layer 188 in this example). The IP layer 188 creates an IP header 206 (e.g., IPv4 headers 206*a* in FIGS. 6A and 6C, or IPv6 headers 206*b* in FIGS. 6B and 6D). For IPv6 (FIGS. 6B and 6D), the IP layer 188 may also create optional extension headers 208.

Where transmit security processing is to be employed, including ESP encryption and authentication, the IP layer 188 also creates an ESP header 210, and ESP trailer 212, and an ESP authentication field 214 for IPv4 (FIGS. 6A and 6C). For IPv6 in transport mode (FIG. 6B), a hop-by-hop destination routing field 216 and a destination option field 218 are created by the IP layer 188. For IPv4 in tunnel mode, the IP layer 188 also creates a new IPv4 header 220. For IPv6 in tunnel mode (FIG. 6D), the IP layer 188 further creates a new IPv6 header 222 and new extension headers 224 preceding the ESP header 210.

For the frame 200*a* of FIG. 6A, the TCP header 204, the TCP data 202, and the ESP trailer 212 are encrypted, wherein the host software may do the encryption or the exemplary network interface controller 102 may be configured to perform the encryption. Authentication is performed across the ESP header 210 and the encrypted TCP header 204, the TCP data 202, and the ESP trailer 212. For the transport mode IPv6 frame 200*b* in FIG. 6B, the destination option 218, the TCP header 204, the TCP data 202, and the ESP trailer 212 are encrypted and the ESP header 210 is authenticated together with the encrypted TCP header 204, the TCP data 202, and the ESP trailer 212. In tunnel mode IPv4 example of FIG. 6C, the TCP header 204, the TCP data 202, the original IPv4 header 206*a*, and the ESP trailer 212 are encrypted and may then be authenticated along with the ESP header 210. For the IPv6 tunnel mode example of FIG. 6D, the TCP header 204, the TCP data 202, the ESP trailer 212, the original extension headers 208, and the original IPv6 header 206*b* are encrypted, with these and the ESP header 210 being authenticated.

Figure 6E:
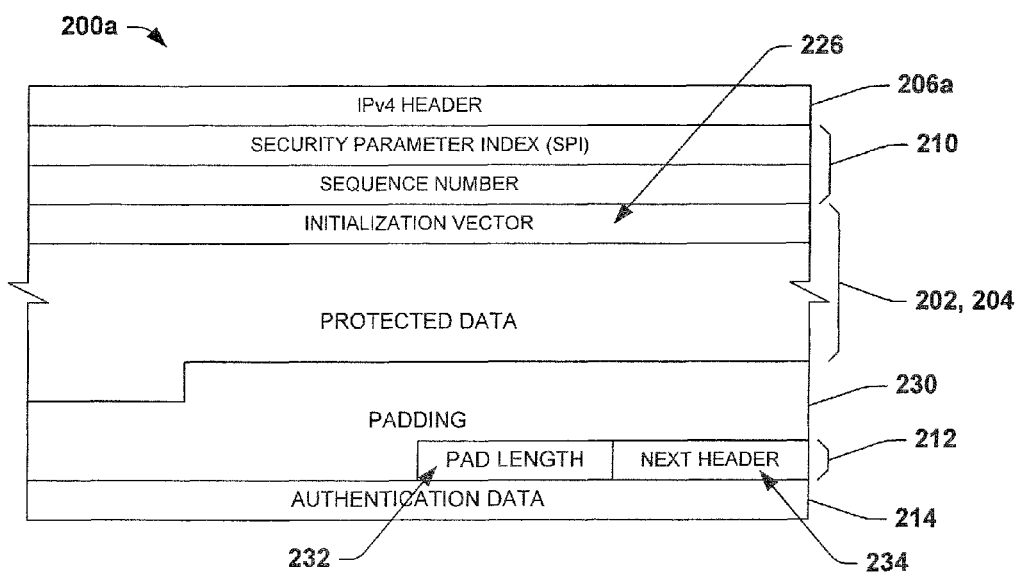
FIG. 6E is a schematic diagram illustrating exemplary ESP header, ESP trailer, authentication data, and protected data.
Figure 7A:
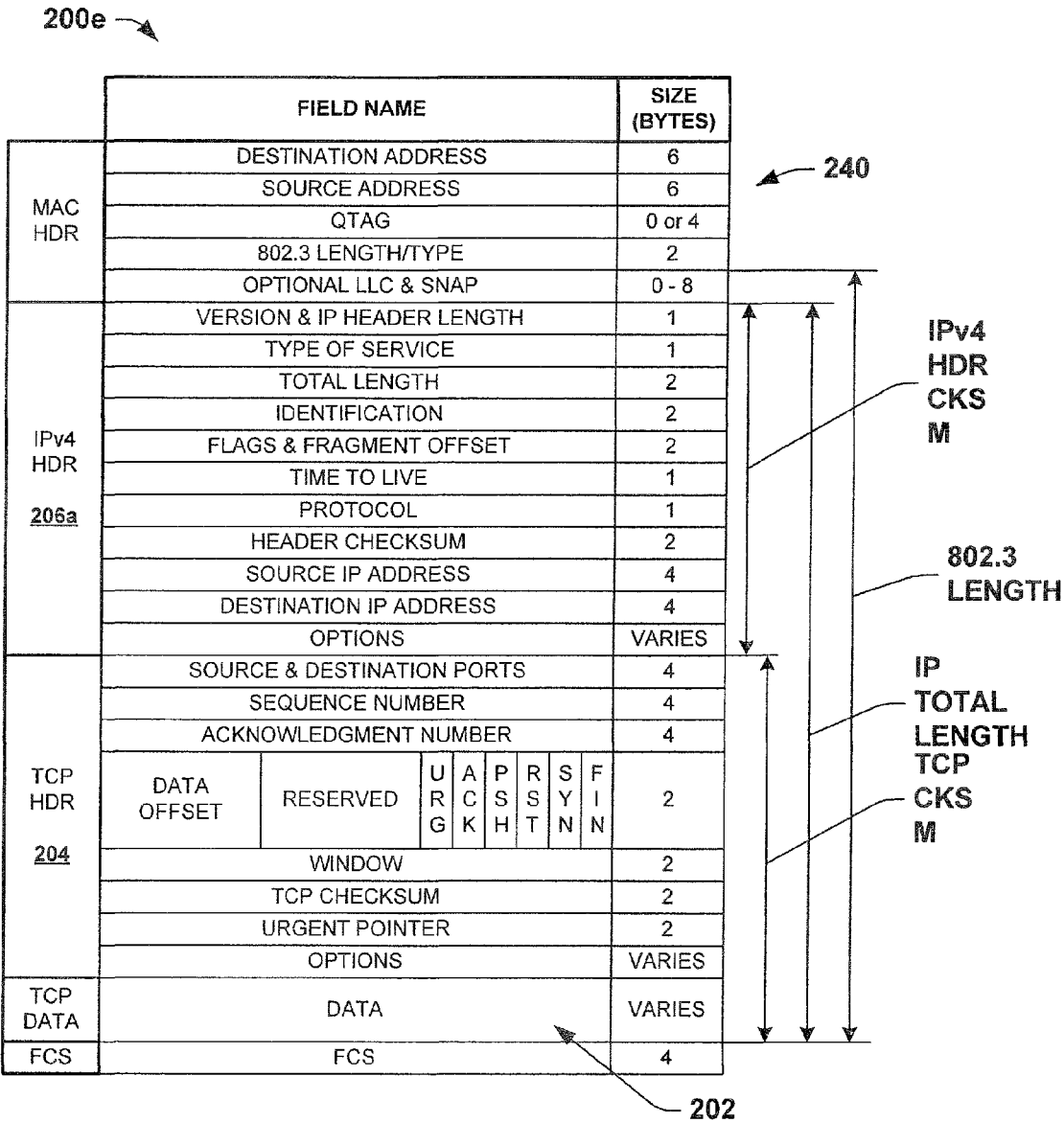
FIGS. 7A and 7B are schematic diagrams illustrating exemplary TCP frame formats for IPv4 and IPv6, respectively.
Figure 7B:
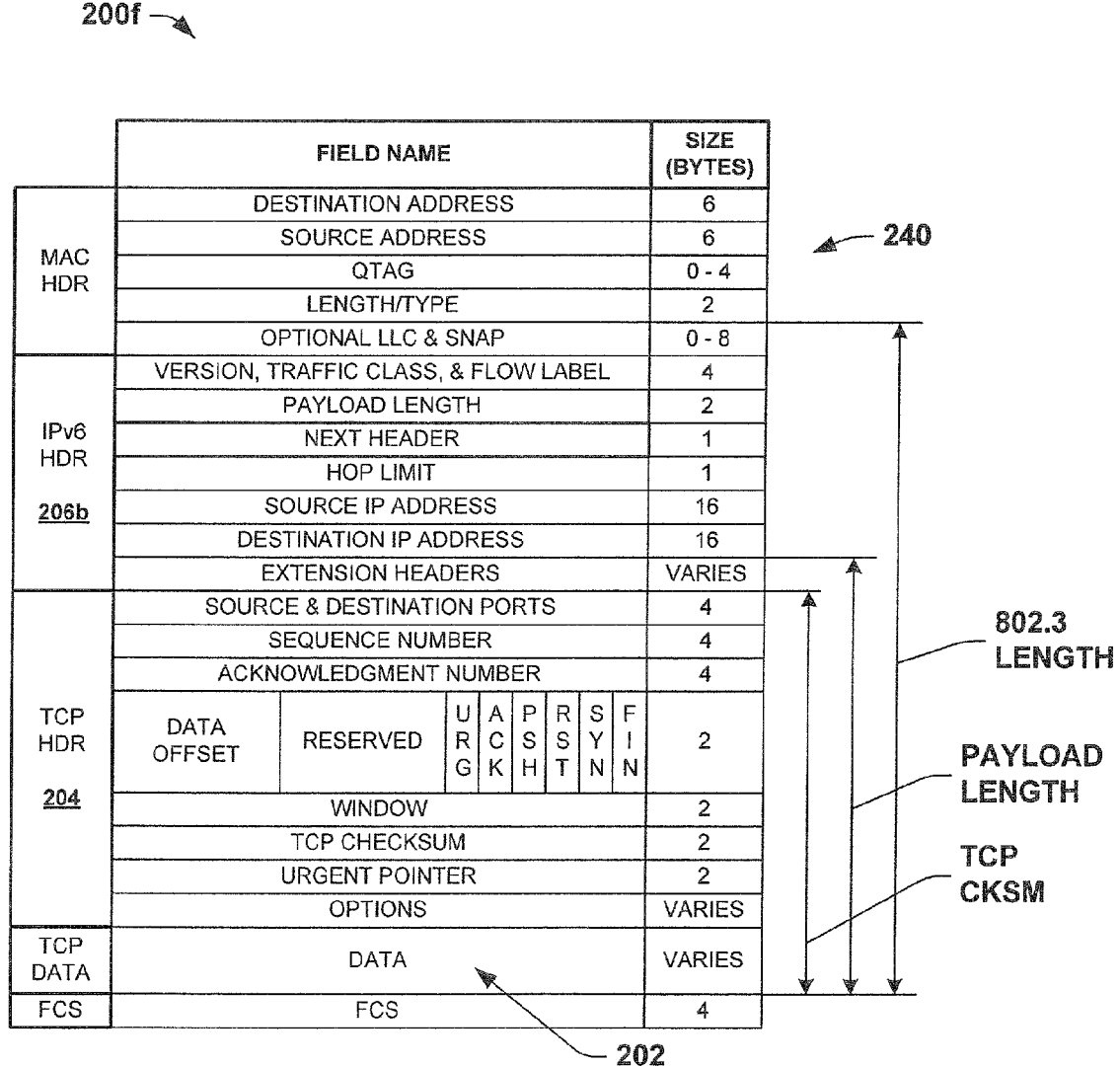

FIG. 6E illustrates an exemplary transmit frame 200*a* after creation of the ESP header 210 and trailer 212, showing further details of an exemplary ESP header 210. The ESP header 210 includes a security parameters index (SPI), which, in combination with destination IP address of the IP header 206*a* and the ESP security protocol uniquely identifies the security association (SA) for the frame 200*a*. The ESP header 210 further includes a sequence number field indicating a counter value used by the sender and receiver to identify individual frames, where the sender and receiver counter values are initialized to zero when a security association is established. The payload data of the frame 200*a* includes an initialization vector (N) 226 if the encryption algorithm requires cryptographic synchronization data, as well as the TCP data 202 and TCP or other layer 4 header 204.

Padding bytes 230 are added as needed to fill the plain text data to be a multiple of the number of bytes of a cipher block for an encryption algorithm, and/or to right-align the subsequent PAD LENGTH and NEXT HEADER fields 232 and 234, respectively, in the ESP trailer 212 within a 4-byte word, thereby ensuring that the ESP authentication data 214 following the trailer 212 is aligned to a 4-byte boundary. In the ESP trailer 212, the PAD LENGTH field 232 indicates the number of PAD bytes 230, and the NEXT HEADER field 234 identifies the type of data in the protected payload data, such as an extension header in IPv6, or an upper layer protocol identifier (e.g., TCP, UDP, etc.). Where security processing is selected for the frame 200*a*, the IP layer 188 modifies the protocol header immediately preceding the ESP header 210 (e.g., the IPv4 header 206*a* in the illustrated frame 200*a*) to have a value (e.g., '50') in the PROTOCOL field (e.g., 'NEXT HEADER' field for IPv6) indicating that the subsequent header 210 is an ESP header.

FIGS. 7A and 7B illustrate exemplary TCP frame formats 200*e* and 200*f* for IPv4 and IPv6, respectively, to show the contents of various headers. In FIG. 7A, the exemplary frame 200*e* is illustrated having a TCP data packet 202, a TCP header 204, an IPv4 header 206*a* and a MAC header 240, as well as a 4-byte FCS field for a frame check sequence. In FIG. 7B, the frame 200*f* similarly includes a TCP data packet 202, a TCP header 204, and a MAC header 240, as well as a 4-byte FCS field and an IPv6 header 206b. In both cases, the TCP checksum is computed across the TCP data 202 and the TCP header 204. In the IPv4 example 200e, the IPv4 header checksum is computed across the IPv4 header 206a (HEADER CHECKSUM field of the IPv4 header 206a), the IP total length is across the IPv4 header 206a, the TCP header 204, and the TCP data 202 (TOTAL LENGTH field in the IPv4 header 206a), and the IEEE 802.3 length is the IP total length plus 0-8 bytes in the optional LLC & SNAP field of the MAC header 240 (802.3 LENGTH/TYPE field in the MAC header). In the IPv6 example 200b of FIG. 7B, the IEEE 802.3 length is the TCP data 202 plus the TCP header 204 and any optional extension headers (illustrated as the last field in the IPv6 header in FIG. 7B), the value of which goes into the LENGTH/TYPE field of the MAC header 240, and the IP payload length is the TCP data 202 plus the TCP header 204 and any optional extension headers (PAYLOAD LENGTH field of the IPv6 header 206b).

TCP Segmentation

Referring now to FIGS. 8A-8D and 9, the controller 102 can optionally perform outgoing TCP and/or IP layer checksumming, TCP segmentation, and/or IPsec security processing. Where one or more of these functions are offloaded from the host processor 112 to the controller 102, the layer 3 software 186 may provide certain of the fields in the frame 200 (e.g., checksums, lengths, etc.) with pseudo values. With respect to TCP layer segmentation, the controller 102 can be programmed to automatically retrieve a transmit frame from the host memory 128, and where the frame is large, to break the large frame into smaller frames or frame segments which satisfy a maximum transmission unit (MTU) requirement of the network 108 using a TCP segmentation system 260. The segmentation system 260 comprises any circuitry operatively coupled with the descriptor management unit 130, which is configured to perform the segmentation tasks as described herein. The controller 102 then transmits these segments with the appropriate MAC, IP, and TCP headers. In the illustrated example, the original TCP frame 200 in the host system memory 128 is in the form of a (possibly oversized) IEEE 802.3 or Ethernet frame complete with MAC, IP, and TCP headers. In the exemplary controller 102, the IP headers 206 can be either version 4 or version 6, and the IP and TCP headers may include option fields or extension headers. The network controller 102 will use suitably modified versions of these headers in each segmented frame that it automatically generates. In the exemplary device 102, the original TCP frame can be stored in host system memory 128 in any number of the buffers 194, wherein all headers from the beginning of the frame through the TCP header 204 are stored in the first buffer 194.

Referring also to FIGS. 7A and 7B, the frame fields 802.3 LENGTH/TYPE, TOTAL LENGTH, IDENTIFICATION, HEADER CHECKSUM, SEQUENCE NUMBER, PSH, FIN, and TCP CHECKSUM fields of the IPv4 frame 200e (FIG. 7A) are modified in the controller 102 and the others are copied directly from the original frame. In FIG. 7B, the LENGTH/TYPE, PAYLOAD LENGTH, SEQUENCE NUMBER, PSH, FIN, and TCP CHECKSUM fields in the frame 200f will be modified in the controller 102 for each generated (e.g., segmented) frame. To enable automatic TCP segmentation for a frame 200 by the controller 102, the driver 190 in the host 112 sets the bits in the MORE_CTRL field (FIG. 5F) of the corresponding transmit descriptor 192, and also includes a valid value for the maximum segment size (MSS[13:0]) field of the descriptor 192. For all corresponding generated frames except for the last frame, the length will be the value of the MSS[13:0] field plus the lengths of the MAC, IP, and TCP headers 240, 206, and 204, respectively, plus four bytes for the FCS. The length of the last frame generated may be shorter, depending on the length of the original unsegmented data.

FIG. 8A illustrates a table 250 showing frame fields modified by outgoing ESP processing, and FIG. 8B shows a table 252 with the frame fields modified by authentication header (AH) processing, wherein the tables 250 and 252 further indicate which frame fields are created by the host processor software, and those added by the controller 102. Before submitting a transmit frame to the controller 102 for automatic TCP segmentation, the IP layer 188 provides an adjusted pseudo header checksum in the TCP checksum field of the TCP header 204. FIGS. 8C and 8D provide tables 254 and 256 illustrating pseudo header checksum calculations for IPv4 and IPv6, respectively, performed by the IP layer software 188 in generating the transmit frames 200. The value of this checksum is a standard TCP pseudo header checksum described in the Transmission Control Protocol Functional Specification (RFC 793), section 3.1 for IPv4 frames and in the Internet Protocol, Version 6 Specification (RFC 2460), section 8.1 for IPv6 frames, except that the value zero is used for the TCP length in the calculation. The controller 102 adds the TCP length that is appropriate for each generated segment.

For IPv4 frames, the pseudo header 254 in FIG. 8C includes the 32-bit IP source address, the 32-bit IP destination address, a 16-bit word consisting of the 8-bit Protocol Field from the IP Header padded on the left with zeros, and the TCP length (which is considered to be 0 in this case). For IPv6 frames, the pseudo header 256 in FIG. 8D includes the 128-bit IPv6 source address, the 128-bit IPv6 destination address, the 16-bit TCP length (which is considered to be zero), and a 16-bit word consisting of the 8-bit Protocol identifier padded on the left with zeros. The 8-bit protocol identifier is the contents of the Next Header field of the IPv6 Header or of the last IPv6 extension Header, if extension headers are present, with a value of 6 for TCP. If TCP or UDP checksum generation is enabled without TCP segmentation, the TCP length used in the pseudo header checksum includes the TCP header plus TCP data fields. However, when TCP segmentation is enabled, the controller 102 automatically adjusts the pseudo header checksum to include the proper length for each generated frame.

Where the controller 102 is programmed to perform TCP segmentation, the values of the various modified fields are calculated as described below. The LENGTH/TYPE field in the MAC header 240 is interpreted as either a length or an Ethernet type, depending on whether or not its value is less than 600 h. If the value of the field is 600 h or greater, the field is considered to be an Ethernet type, in which case the value is used for the LENGTH/TYPE field for all generated frames. However, if the value is less than 600 h, the field is interpreted as an IEEE 802.3 length field, in which case an appropriate length value is computed in the controller 102 for each generated frame. The value generated for the length field will indicate the length in bytes of the LLC Data portion of the transmitted frame, including all bytes after the LENGTH/TYPE field except for the FCS, and does not include any pad bytes that are added to extend the frame to the minimum frame size. The Tx parser 162 in the controller 102 parses the headers of the transmit frames 200 to determine the IP version (IPv4 or IPv6) and the location of the various headers. The IPv4 TOTAL LENGTH is the length in bytes of the IPv4 datagram, which includes the IPv4 header 206a (FIG. 7A), the TCP header 204, and the TCP data 202, not including the MAC header 240 or the FCS. If the IP version is 4, the hardware will use this information to generate the correct TOTAL LENGTH field for each generated frame. For IPv6, the PAYLOAD LENGTH field is computed as the number of bytes of the frame 200f between the first IPv6 header and the FCS, including any IPv6 extension headers. For both IPv4 and IPv6, the Tx parser 162 generates the corresponding TOTAL LENGTH or PAYLOAD LENGTH field values for each generated transmit frame where TCP segmentation is enabled.

Because each generated TCP segment is transmitted as a separate IP frame, the IDENTIFICATION field in the IPv4 header of each segment frame is unique. In the first such segment frame, the IDENTIFICATION field is copied from the input frame by the Tx parser 162 into the appropriate location in the first memory 116 in constructing the first segment frame. The parser 162 generates IDENTIFICATION fields for subsequent segment frames by incrementing by one the value used for the previous frame. For the SEQUENCE NUMBER field in the TCP header 204, the TCP protocol software 186 establishes a logical connection between two network nodes and treats all TCP user data sent through this connection in one direction as a continuous stream of bytes, wherein each such frame is assigned a sequence number. The TCP SEQUENCE NUMBER field of the first TCP packet includes the sequence number of the first byte in the TCP data field 202. The SEQUENCE NUMBER field of the next TCP packet sent over this same logical connection is the sequence number of the previous packet plus the length in bytes of the TCP data field 202 of the previous packet. When automatic TCP segmentation is enabled, the Tx parser 162 of the controller 102 uses the TCP SEQUENCE NUMBER field from the original frame for the sequence number of the first segment frame 200, and the SEQUENCE NUMBER for subsequent frames 200 is obtained by adding the length of the TCP data field 202 of the previous frame 200 to the SEQUENCE NUMBER field value of the previous segment frame 200.

The TCP push (PSH) flag is an indication to the receiver that it should process the received frame immediately without waiting for the receiver's input buffer to be filled, for instance, where the input buffer may have space for more than one received frame. When automatic TCP segmentation is requested, the parser 162 in the controller 102 sets the PSH bit to 0 for all generated frames 200 except for the last frame 200, which is set to the value of the PSH bit from the original input frame as set by the TCP layer software 186. The TCP finish (FIN) flag is an indication to the receiver that the transmitter has no more data to transmit. When automatic TCP segmentation is requested, the parser 162 sets the FIN bit to 0 for all generated segment frames 200 except for the last frame 200. The parser 162 inserts the value of the FIN bit from the original input frame (e.g., from the TCP layer software 186) for the value of the FIN bit in the last generated segment frame 200.

Checksum Generation and Verification

The exemplary controller 102 may be programmed or configured to generate layer 3 (e.g., IP) and/or layer 4 (e.g., TCP, UDP, etc.) checksums for transmitted frames 200, and to automatically verify such checksums for incoming (e.g., received) frames 200. The exemplary controller 102 accommodates IP checksums as defined in RFC 791 (Internet Protocol), TCP checksums defined in RFC 793 (Transmission Control Protocol) for IPv4 frames 200e, UDP checksums as defined in RFC 768 (User Datagram Protocol) for IPv4 frames, as well as TCP and UDP checksums for IPv6 frames 200f as set forth in RFC 2460 (Internet Protocol, Version 6 Specification). With respect to IP checksums, the value for the HEADER CHECKSUM field in the IPv4 header 206a is computed in the transmit checksum system 164 as a 16-bit one's complement of a one's complement sum of all of the data in the IP header 206a treated as a series of 16-bit words. Since the TOTAL LENGTH and IDENTIFICATION fields are different for each generated segment frame 200e, the transmit checksum system 164 calculates a HEADER CHECKSUM field value for each segment frame that the controller 102 generates.

The transmit checksum system 164 may also compute TCP layer checksums for outgoing frames 200. The value for the TCP CHECKSUM field in the TCP header 204 is computed as a 16-bit one's complement of a one's complement sum of the contents of the TCP header 204, the TCP data 202, and a pseudo header that contains information from the IP header. The headers and data field are treated as a sequence of 16-bit numbers. While computing the checksum, the checksum field itself is replaced with zeros. The checksum also covers a 96 bit pseudo header (FIG. 8C or 8D) conceptually prefixed to the TCP header. This pseudo header contains the source address, the destination address, the protocol, and TCP length. If the TCP Data Field contains an odd number of bytes, the last byte is padded on the right with zeros for the purpose of checksum calculation. (This pad byte is not transmitted.) To generate the TCP checksum for a segment frame 200, the transmit checksum system 164 updates the TCP SEQUENCE NUMBER field and the PSH and FIN bits of the TCP header 204 and sets the TCP CHECKSUM field to the value of the TCP CHECKSUM field from the original input frame 200. In addition, the transmit checksum system 164 initializes an internal 16-bit checksum accumulator with the length in bytes of the TCP header 204 plus the TCP data field 202, adds the one's complement sum of all of the 16-bit words that make up the modified TCP header 204 followed by the TCP data 202 for the segment to the accumulator, and stores the one's complement of the result in the TCP CHECKSUM field of the segment frame 200.

The IPCK and L4CK bits in the transmit descriptor 192a (FIG. 5F) control the automatic generation of checksums for transmitted frames 200 in the controller 102. Setting the IPCK bit causes the IP Header Checksum to be generated and inserted into the proper position in the IPv4 frame 200e of FIG. 7A. Similarly setting L4CK causes either a TCP CHECKSUM or a UDP checksum to be generated, depending on which type of layer 4 header is found in the outgoing frame 200. Since an IPv6 header 206b (FIG. 7B) does not have a header checksum field, the IPCK bit in the descriptor is ignored for IPv6 frames 200f. If TCP or UDP checksum generation is required for an outgoing frame 200, the layer 4 software 186 also puts the pseudo header checksum in the TCP or UDP checksum field. The controller 102 then replaces this value with the checksum that it calculates over the entire TCP or UDP segment, wherein the values of the generated TCP or UDP checksum differs when TCP segmentation is enabled. For TCP segmentation, the value 0 is used for the TCP TOTAL LENGTH in the pseudo header checksum calculation. For TCP or UDP checksum generation, the TCP TOTAL LENGTH value is the length of the TCP header 204 plus the length of the TCP data 202 as described in the RFCs referenced above.

The controller 102 can also be configured or programmed by the host 112 to verify checksums for received frames via the checksum and pad check system 156. When so enabled or when security (e.g., IPsec) processing is required, the controller 102 examines incoming (e.g., received) frames to identify IPv4, IPv6, TCP and UDP headers, and writes the corresponding codes to the IP_HEADER and L4_LEADER fields of the receive status ring 199 (FIG. 5J) entry to indicate which layer 3 and/or layer 4 headers it has recognized. When the device recognizes a header having a checksum, the receive checksum and pad check system 156 calculates the appropriate checksum as described in RFC 791, RFC 793, RFC 768, or RFC 2460 and compares the result with the checksum found in the received frame. If the checksums do not agree, the device sets the IP_CK_ERR and/or L4_CK_ERR bit in the corresponding receive status ring entry 199.

Figure 12:
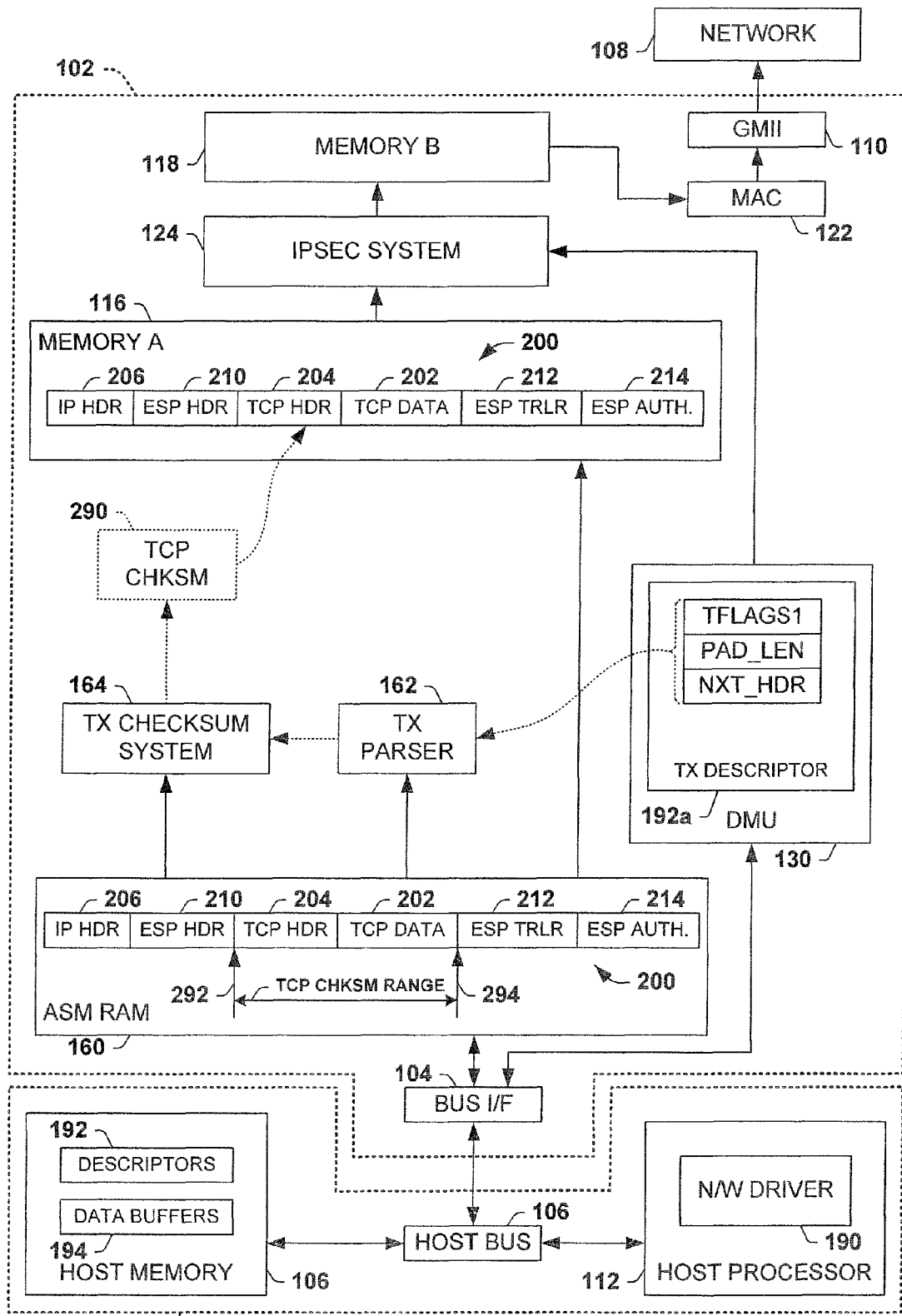
FIG. 12 is a schematic diagram illustrating further details of layer four checksum computation for an outgoing transmit frame in the network interface system of FIG. 3.
Figure 13A:
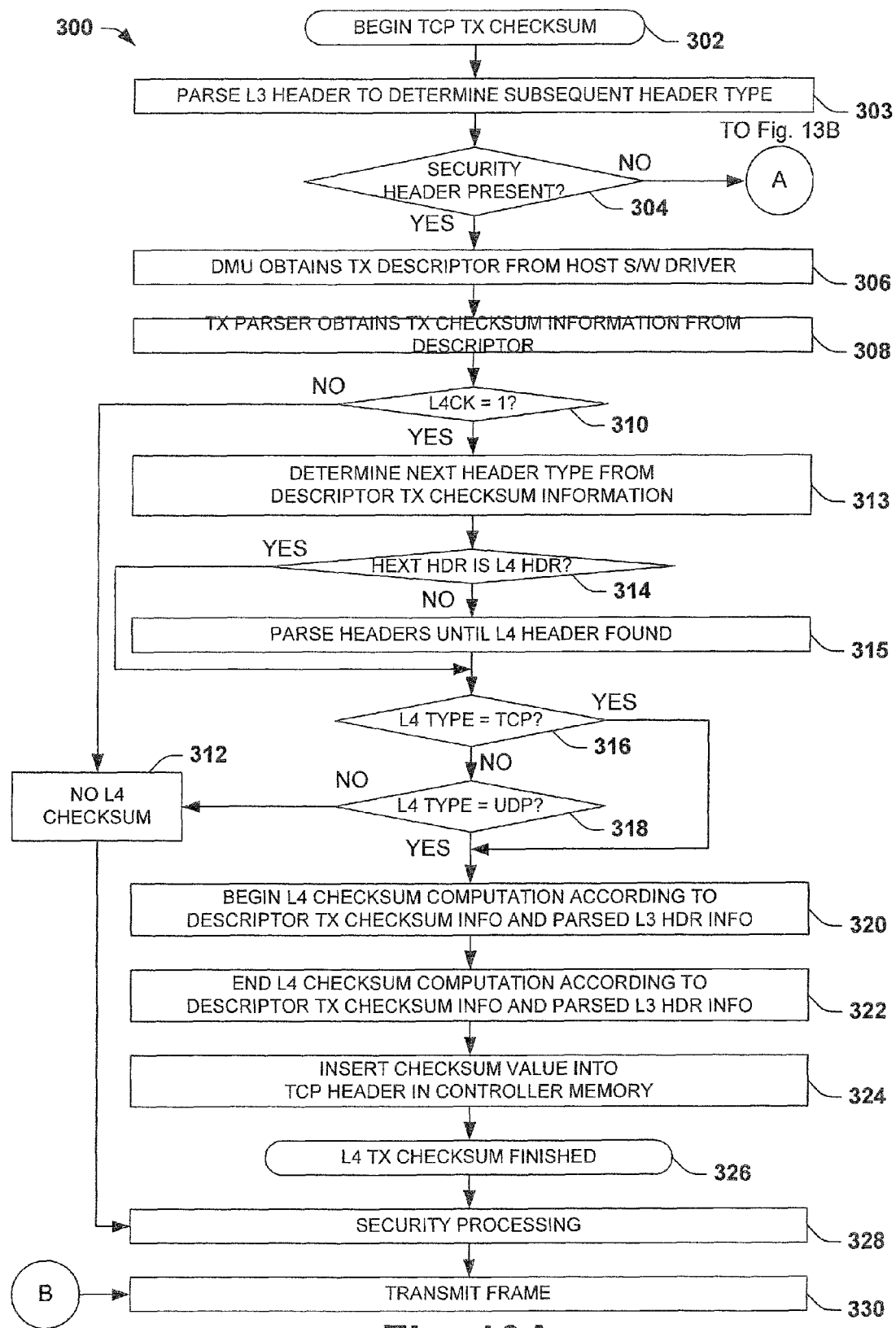
FIGS. 13A and 13B provide a flow diagram illustrating layer 4 checksumming in the network interface system of FIG. 3 in accordance with another aspect of the invention.
Figure 13B:
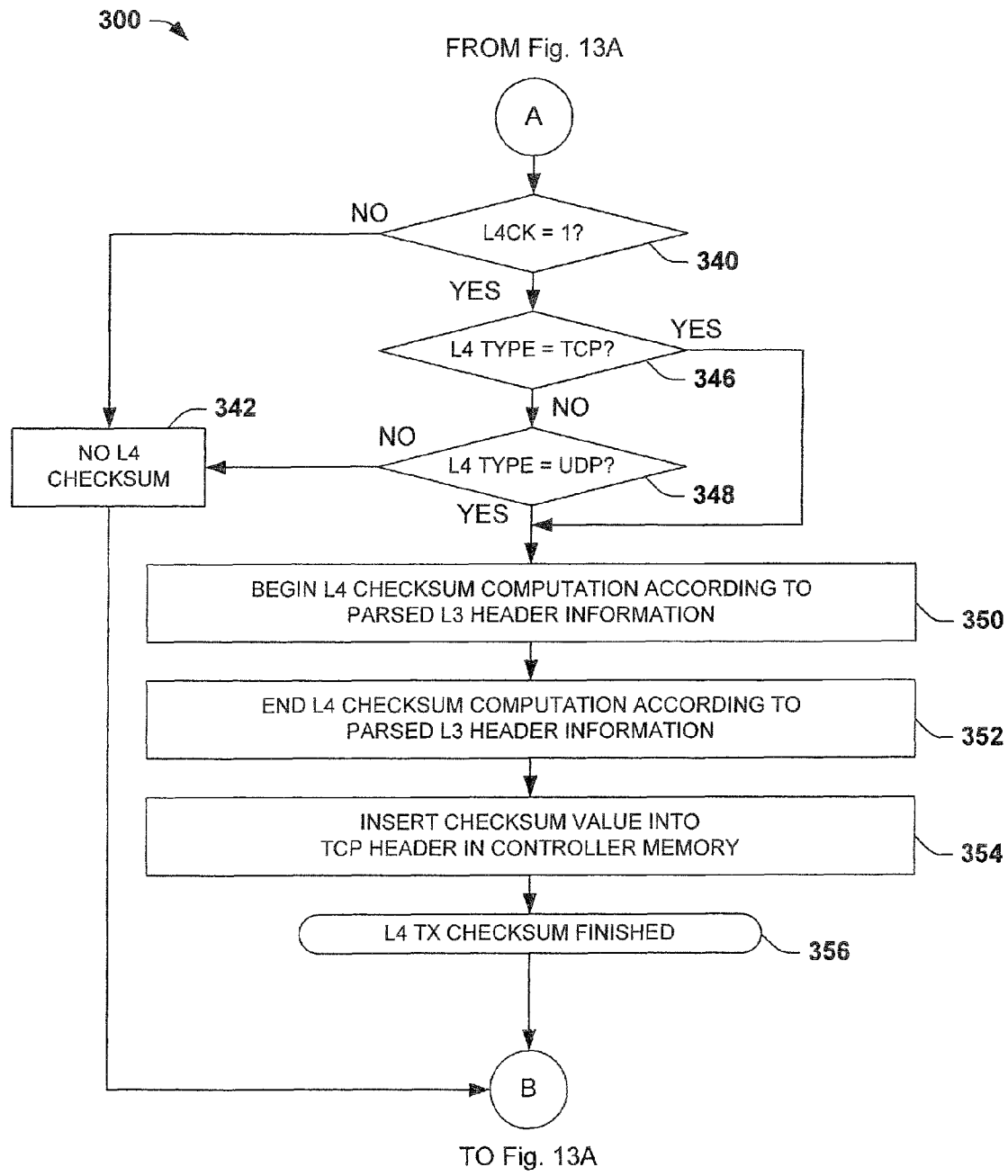

Referring now to FIGS. 12, 13A, and 13B, further details of transmit checksum generation are illustrated and described. In FIG. 12, a portion of the controller 102 is illustrated with respect to generation of a TCP checksum value 290 for an outgoing data frame 200 having an ESP security header 210. FIGS. 13A and 13B illustrate an exemplary transmit checksum processing method 300 which may be implemented in the network interface controller 102. TCP checksum processing for outgoing data begins at 302 in FIG. 13A, wherein the layer 3 header (e.g., IP header) is parsed at 303 to determine the subsequent header type and a determination is made at 304 as to whether a security header is present in the outgoing data frame. As seen in FIG. 12, the exemplary frame 200 in the assembly RAM 160 includes an IP header 206 followed by an ESP security header 210. In this situation, the IP header 206 will have a value of 50 in its PROTOCOL (IPv4) or NEXT HEADER (IPv6) field, indicating that the subsequent header 210 is an ESP security header. In the controller 102, the transmit checksum parser 162 parses the IP header 206 as it is concurrently provided to the TX checksum system 164 and the first memory 216, to ascertain the value of this field. If the IP header PROTOCOL/NEXT HEADER field has a value of 50, the frame 200 includes a security header (YES at 304), and the method 300 proceeds to 306. Otherwise, the method proceeds to 340 in FIG. 13B, as discussed below.

At 306, the descriptor management unit 130 obtains a transmit descriptor 192a from the host driver 190 (e.g., via the host memory 106) and obtains transmit checksum information from the descriptor at 308. In order to compute a TCP checksum value 290 across the TCP checksum range in the frame 200, the transmit parser 162 needs to determine beginning and end points 292 and 294, respectively, for the TCP checksum range (e.g., including the TCP header 204 and the TCP data packet 202). This can be done using the checksum information provided in the transmit descriptor 192a, which includes the TFLAGS1, PAD_LEN, and NXT_HDR fields (FIGS. 5E and 5F). At 310, the L4CK bit of the TFLAGS1 field is checked. If the value is 0 (NO at 310), the method 300 proceeds to 312, as this value indicates that TCP checksumming is not requested for this frame 200. For example, the host system 180 may be responsible for computing layer 4 checksums, in which case, the TCP header 214 includes a proper checksum value prior to the frame 200 being sent to the controller 102 for transmission.

If the L4CK bit equals 1 (YES at 310), the method 300 proceeds to 313, where the transmit parser 162 determines the header type of the header following the security header by parsing. A determination is then made at 314 as to whether the header following the security header is a layer 4 header (e.g., TCP in this example). If not (NO at 314), the transmit parser 162 continues parsing through any intervening headers (e.g., extension headers, such as shown in FIG. 6D) until a layer 4 header is found. Once the layer 4 header is found, determinations are made at 316 and 318 as to whether the layer 4 header type information from the descriptor 192a is TCP or UDP. In the illustrated example, if the next header information from the descriptor 192a is neither TCP nor UDP (NO at both 316 and 318), the controller 102 assumes a discrepancy exists, and the method 300 proceeds to 312 (no layer four checksum value is computed). If the next header information from the descriptor 192a indicates a UDP or TCP header follows the security header (YES at 316 or 318), the method 300 proceeds to 320 and 322, where the layer 4 checksum computation begins and ends, respectively, according to the transmit checksum information and the parsed layer 3 header information.

In particular, the next header information NXT_HDR from the transmit descriptor 192a is employed at 320 to determine the start point for the layer 4 checksum computation, and the padlength PAD_LEN and the IV length information from the descriptor 192a are used at 322. The parser 162 ascertains the location of the end of the TCP data field 202 by taking the IP total length or payload length information from the parsed layer 3 header (IPv4 or IPv6 in FIGS. 7A and 7B) and subtracting the sum of the lengths of the security header (parsed at 303) and any other intervening headers (parsed at 315), and also subtracting the lengths of the ESP trailer 212 and the ESP authentication field 214. The ESP trailer 212 includes the padding bytes 230 (FIG. 6E), the length of which is known from the PAD_LEN information in the transmit descriptor 192a, and the length of the ESP authentication field 214 is known from the IVLEN1 and IVLEN0 bits in the TFLAGS1 portion 193 of the transmit descriptor 192a. The resulting value of this computation is the length of the TCP header 204 and the TCP data 202, which is used at 322 to end the TCP checksum computation.

The transmit parser 162 controls the transmit checksum system 162 to begin checksum computation according to the start and end points 292 and 294, and the system 164 generates the checksum value 290 (e.g., a TCP checksum value in this example) accordingly. Once the checksum value computation is finished, the method 300 proceeds to 324, where the transmit checksum system 164 inserts the checksum value 290 into the appropriate location in the first memory 116 (e.g., within the TCP header 204), after which the layer 4 checksum operation ends at 326. Thereafter, any selected security processing is performed at 328 (e.g., using the IPsec system 124), and the outgoing frame is transmitted to the network 108 at 330. If no layer 4 checksum is performed, the method 300 proceeds directly from 312 to 328 for any required security processing before the frame is transmitted at 330.

Referring also to FIG. 13B, if no security header is present in the outgoing data frame 200 (NO at 304), the method 300 proceeds to 340 in FIG. 13B, where a determination is made as to whether the L4CK bit from the transmit descriptor 192a equals 1. If not (NO at 340), the method 300 proceeds to 342 and no layer 4 checksum computation is undertaken for the frame 200. If the L4CK bit equals 1 (YES at 340), determinations are made at 346 and 348 as to whether the layer 4 header type is TCP or UDP. If the next header information from the IP header 206 is neither TCP nor UDP (NO at both 346 and 348), the controller 102 assumes a discrepancy exists, and the method 300 proceeds to 342 (no layer four checksum value is computed). If the next header information indicates a TCP or UDP header follows the IP header 206, (YES at 346 or 348), the checksum value computation begins and ends at 350 and 352, respectively, according to the parsed information. Once the layer 4 checksum computation is finished at 352, the checksum value 290 is inserted into the frame 200 in the memory 116, the transmit checksum operations are finished at 356, and the IPsec system 124 passes the frame 200 to the second memory 118 (e.g., no security processing in this case). The method 300 then returns to 330 (FIG. 13A), and the frame 200 is transmitted to the network 108.

Security Processing

Referring now to FIGS. 2-4, 9, 10, and 11A-11E, the exemplary IPsec security system 124 is configurable to provide internet protocol security (IPsec) authentication and/or encryption/decryption services for transmitted and received frames 200 in accordance with RFC 2401. For authentication header (AH) processing the module implements the HMAC-MD5-96 algorithm defined in RFC 2404 and the HMAC-SHA-1-96 defined in RFC 2404. The HMAC-MD5-96 implementation provides a 128-bit key, a 512-bit block size, and a 128-bit message authentication code (MAC), truncated to 96 bits. The implementation of the HMAC-SHA-1-96 algorithm provides an 160-bit key, a 512-bit block size, and a 160-bit message authentication code (MAC), truncated to 96 bits. For encapsulating security payload (ESP) processing, the IPsec module 124 also implements the HMAC-MD5-96 and HMAC-SHA-1-96 algorithms for authentication and the ESP DES-CBC (RFC 2406), the 3DES-CBC, and the AES-CBC (draft-ietf-ipsec-ciph-aes-cbc-01) encryption algorithms. The DES-CBC algorithm in the IPsec module 124 provides a 64-bit key (including 8 parity bits), a 64-bit block size, and cipher block chaining (CBC) with explicit initialization vector (IV). The 3DES-CBC algorithm provides a 192-bit key (including 24 parity bits), a 64-bit block size, and CBC with explicit IV. The AES-CBC algorithm provides a 128-, 192-, or 256-bit key; 10, 12, or 14 rounds, depending on key size; a 128-bit block size, and CBC with explicit IV.

The exemplary security system 124 provides cryptographically-based IPsec security services for IPv4 and IPv6, including access control, connectionless integrity, data origin authentication, protection against replays (a form of partial sequence integrity), confidentiality (encryption), and limited traffic flow confidentiality. These services are provided at layer 3 (IP layer), thereby offering protection for IP and/or upper layer protocols through the use of two traffic security protocols, the authentication header (AH) and the encapsulating security payload (ESP), and through the use of cryptographic key management procedures and protocols. The IP authentication header (AH) provides connectionless integrity, data origin authentication, and an optional anti-replay service, and the ESP protocol provides confidentiality (encryption), and limited traffic flow confidentiality, and may provide connectionless integrity, data origin authentication, and an anti-replay service. The AH and ESP security features may be applied alone or in combination to provide a desired set of security services in IPv4 and IPv6, wherein both protocols support transport mode and tunnel mode. In transport mode, the protocols provide protection primarily for upper layer protocols and in tunnel mode, the protocols are applied to tunneled IP packets.

For outgoing frames 200, the controller 102 selectively provides IPsec authentication and/or encryption processing according to security associations (SAs) stored in the SA memory 140. If an outgoing frame 200 requires IPsec authentication, the IPsec unit 124 calculates an integrity check value (ICV) and inserts the ICV into the AH header or ESP trailer 212 (FIGS. 6A-6D). If the frame 200 requires encryption, the unit 124 replaces the plaintext payload with an encrypted version. For incoming (e.g., received) frames, the IPsec unit 124 parses IPsec headers to determine what processing needs to be done. If an IPsec header is found, the IPsec system 124 uses the security parameters index (SPI) from the header plus the IPsec protocol type and IP destination address to search the SA memory 140 to retrieve a security association corresponding to the received frame. Acceptable combinations of IPsec headers for the exemplary controller 102 include an AH header, an ESP header, and an AH header followed by an ESP header.

For IPsec key exchange, the host 112 negotiates SAs with remote stations and writes SA data to the SA memory 140. In addition, the host 112 maintains an IPsec security policy database (SPD) in the system memory 128. For each transmitted frame 200 the host processor 112 checks the SPD to determine what security processing is needed, and passes this information to the controller 102 in the transmit descriptor 192*a* (FIG. 5E) as a pointer SA_PTR[14:0] to the appropriate SA in the SA memory 140. For incoming received frames 200 the controller 102 reports what security processing it has done in the receive status ring entry 199 (FIG. 5J), and the host processor 112 checks the SPD to verify that the frame 200 conforms with the negotiated policy. The SAs include information describing the type of security processing that must be done and the encryption keys to be used. Individual security associations describe a one-way connection between two network entities, wherein a bi-directional connection requires two SAs for incoming and outgoing traffic. SAs for incoming traffic are stored partly in an internal SPI table or memory 270 (FIG. 10) and partly in the external SA memory 140. These SA tables are maintained by the host processor 112, which writes indirectly to the SPI table 270 and the SA memory 140 by first writing to an SA data buffer in host memory 128 and then writing a command to the SA address register. This causes the controller 102 to copy the data to the external SA memory 140 and to the internal SPI table memory 270.

One of the fields in an SPI table entry is a hash code calculated by the host 112 according to the IP destination address. In addition, the host 112 calculates a hash code based on the SPI to determine where to write an SPI table. If an incoming or outgoing SA requires authentication, the host CPU calculates the values H(K XOR ipad) and H(K XOR opad) as defined in RFC 2104, HMAC: Keyed-Hashing for Message Authentication, where the host 112 stores the two resulting 128 or 160-bit values in the SA memory 140. If necessary, at initialization time the host CPU can indirectly initialize the Initialization Vector (IV) registers used for Cipher Block Chaining in each of four encryption engines in the IPsec system 124.

Figure 9:
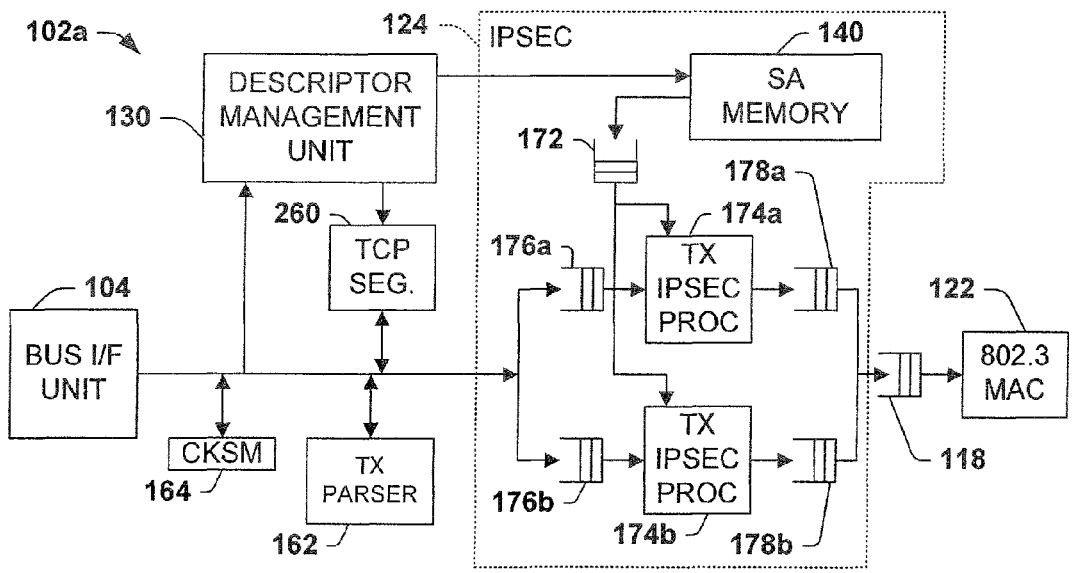
FIG. 9 is a schematic diagram illustrating security processing of outgoing data in the network interface system of FIG. 3.

Referring to FIGS. 2 and 9, to begin a transmission process, the host processor 112 prepares a transmit frame 200 in one or more data buffers 194 in the host memory 128, writes a transmit descriptor 192*a* (e.g., FIG. 5E) in one of the transmit descriptor rings, and updates the corresponding transmit descriptor write pointer (TX_WR_PTR[x]). The frame data in the data buffers 194 includes space in the IPsec headers for authentication data 214, for an initialization vector (IV) 226, and for an ESP trailer 212 if appropriate (e.g., FIG. 6E). The contents of these fields will be generated by the IPsec system 124 in the controller 102. Similarly, if padding is required (e.g., for alignment or to make the ESP payload an integer multiple of encryption blocks), the padding is included in the host memory buffers 194, and sequence numbers for the AH and ESP SEQUENCE NUMBER fields are provided in the data buffers 194 by the host 112. The IPsec system 124 does not modify these fields unless automatic TCP segmentation is also selected, in which case the IPsec system 124 uses the sequence numbers from the buffers 194 for the first generated frame 200 and then increments these numbers appropriately for the rest of the generated segment frames. If IPsec processing is required for a particular outgoing frame 200, the corresponding transmit descriptor 192*a* includes a pointer in the SA_PTR field to the appropriate SA entry in the external SA memory 140, and the IPsec system 124 uses information from the SA to determine how to process the frame 200. The transmit parser 162 examines the frame 200 to determine the starting and ending points for authentication and/or encryption and where to insert the authentication data 214, if necessary.

If ESP encryption is required, the IPsec system 124 encrypts the payload data using the algorithm and key specified in the SA. If ESP authentication is required, the system 124 uses the authentication algorithm and IPAD/OPAD information specified in the SA to calculate the authentication data integrity check value (ICV), and stores the results in the authentication data field 214. If both ESP encryption and authentication are required, the encryption is done first, and the encrypted payload data is then used in the authentication calculations. The encryption and authentication processes are pipelined so that the encryption engine within one of the IPsec processors 174 is processing one block of data while the authentication engine is processing the previous block. The IPsec system 124 does not append padding to the payload data field, unless automatic TCP segmentation is also enabled. The host processor 112 provides the ESP trailer 212 with appropriate padding in the frame data buffers 194 in the system memory 128, and also provides the proper value for the ESP SEQUENCE NUMBER field in the ESP header 210 (FIG. 6E).

If ESP processing is combined with automatic TCP segmentation, the IPsec system 124 adds any necessary pad bytes to make the encrypted data length a multiple of the block length specified for the selected encryption algorithm. If ESP processing is combined with TCP or UDP checksum generation, the host 112 provides correct NEXT HEADER and PAD LENGTH values for the ESP trailer 212 and the Transmit Descriptor 192a (FIG. 5E). If ESP processing is combined with automatic TCP segmentation, the host 112 provides values for the NEXT HEADER and PAD LENGTH fields of the transmit descriptor 192a that are consistent with the corresponding frame data buffers 194. In this combination, the controller 102 copies the NEXT HEADER field from the transmit descriptor 192a into the ESP trailer 212 of each generated frame 200, and uses the PAD LENGTH field of the descriptor 192a to find the end of the TCP data field 202 in the frame data buffer 194. In addition, the maximum segment size field MSS[13:0] of the transmit descriptor 192a is decreased to compensate for the IPsec header(s), the ESP padding, and the ICV.

Where ESP processing is combined with TCP segmentation or with TCP or UDP checksum generation, the software driver 190 sets the ESP AH, IVLEN0, and IVLEN1 bits of the transmit descriptor 192a accordingly. The transmit parser 162 uses this information to locate the TCP or UDP header 204, and if no TCP or UDP processing is required, these bits are ignored. For frames 200 requiring ESP processing, FIG. 8A illustrates which fields are created by the host 112 and included in the buffers 194 and those fields that are modified by the ESP processing hardware in the security system 124.

The encryption algorithms supported by the IPsec system 124 employ cipher block chaining (CBC) mode with explicit initialization vectors (IVs 226, FIG. 6E). To allow a certain amount of parallel processing the IPsec system 124 includes two TX IPSEC processor systems 174a and 174b, each of which comprises a DES/3DES (data encryption standard) encryption system and an advanced encryption standard (AES) encryption engine. Each of the four encryption engines in the TX IPSEC processors 174 includes an IV register, which are cleared to zero on reset. When the controller 102 is enabled, the contents of the IV register associated with an encryption engine are used as the initialization vector 226 for the first transmit frame 200 encrypted by that engine. Thereafter the last encrypted data block from one frame 200 is used as the IV 226 for the following frame 200. The host processor 112 can initialize the IV registers in the IPsec system 124 with random data, for example, by transmitting frames 200 with random data in the payload fields. In one example, the host 112 can put the external PHY device into an isolate mode to prevent these random data frames 200 from reaching the network 108. The IPsec system 124 inserts the IV value 226 at the beginning of the payload field. The host 112 provides space in the frame data buffer 194 for this field 226. The length of the IV 226 is the same as the encryption block size employed in the TX IPSEC processors 174, for example, 64 bits for the DES and 3DES algorithms, and 128 bits for the AES algorithm.

Where authentication header (AH) processing is selected, the security system 124 employs authentication algorithm and authentication ipad and opad data specified in the SA to calculate the authentication data integrity check value (Icy), and it stores the results in the authentication data field 214. The transmit IPsec parser 170 detects mutable fields (as defined by the AH specification, RFC 2402) and insures that the contents of these fields and the authentication data field 214 are treated as zero for the purpose of calculating the ICV. In the ICV calculation the IPsec system 124 employs the destination address from the SA rather than the destination address from the packet's IP header 206, to ensure that if source routing options or extensions are present, the address of the final destination is used in the calculation. For transmit frames 200 that require AH processing, FIG. 8B illustrates the fields created by the host 112 and included in the buffers 194, as well as those fields modified by the AH processing hardware in the IPsec system 124.

Figure 10:
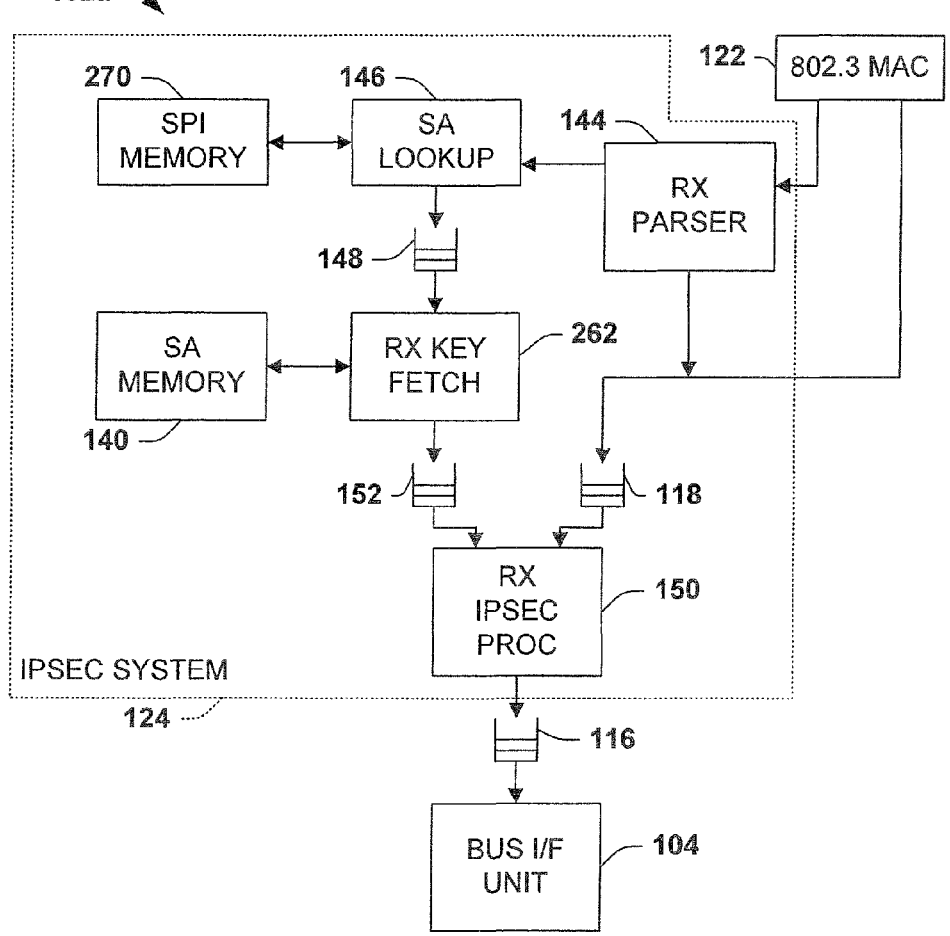
FIG. 10 is a schematic diagram illustrating security processing of incoming network data in the network interface system of FIG. 3.

Referring now to FIGS. 2 and 10, the IPsec system 124 provides security processing for incoming (e.g., received) frames 200 from the network 108. The RX parser 144 examines incoming frames 200 to find IPsec headers, and looks up the corresponding SA in the SA memory 140. The RX IPSEC processor 150 then performs the required IPsec authentication and/or decryption according to the SA. If decryption is required, the processor 150 replaces the original ciphertext in the frame 200 with plaintext in the memory 116. The descriptor management unit 130 sets status bits in the corresponding receive status ring entry 199 (FIG. 5J) to indicate what processing was done and any errors that were encountered.

FIG. 10 illustrates the flow of incoming data through the IPsec system 124. The receive parser 144 examines the headers of incoming frames 200 from the MAC engine 122 while the incoming frame 200 is being received from the network 108. The parser 144 passes the results of its analysis to the SA lookup logic 146. This information is also provided to the memory 118 in the form of a control block that is inserted between frames 200. The control block includes information about the types and locations of headers in the incoming frame 200. If the parser 144 finds that a frame 200 includes an IP packet fragment, IPsec processing is bypassed, and the frame 200 is passed on to the host memory 128 with the IP Fragment bit being set in the IPSEC_STAT1 field in the corresponding receive status ring entry 199. For IPv4 frames, a fragment is identified by a non-zero fragment offset field or a non-zero more fragments bit in the IPv4 header. For IPv6 packets, a fragment is indicated by the presence of a fragment extension header.

If the parser 144 finds an IPsec header or an acceptable combination of headers, it passes the SPI, the IP destination address, and a bit indicating the IPsec protocol (AH or ESP) to the SA lookup engine 146. The SA lookup engine 146 uses the SPI, protocol bit, and a hash of the destination address to search an internal SPI memory 270 (FIG. 10). The results of this search are written to the SA pointer FIFO 148, including a pointer to an entry in the external SA memory 140, a bit that indicates whether IPsec processing is required, and two bits that indicate the success or failure of the SA lookup. The SA pointer FIFO 148 includes an entry corresponding to each incoming frame 200 in the memory 118. If the SA pointer FIFO 148 does not have room for a new entry at the time that an incoming frame 200 arrives from the network 108 or if the received frame 200 would cause the receive portion of the memory 118 to overflow, the frame 200 is dropped, and a receive missed packets counter (not shown) is incremented.

An RX KEY FETCH state machine 262 (FIG. 10) retrieves the corresponding entry from the SA pointer FIFO 148 and determines what, if any, processing is required. If the control bits indicate that processing is required, the state machine 262 uses the contents of the pointer field to fetch the SA information from the external SA memory 140. If a DA field of the SA does not match the DA field of the IP header in the frame 200, the IPsec processor 150 causes an error code to be written to the receive status ring 199 and passes the frame 200 to the memory 118 unmodified. If the DA field of the SA matches the DA field of the IP header, the processor 150 decrypts the payload portion of the received frame 200 and/or checks the authentication data as required by the SA.

Figure 11A:
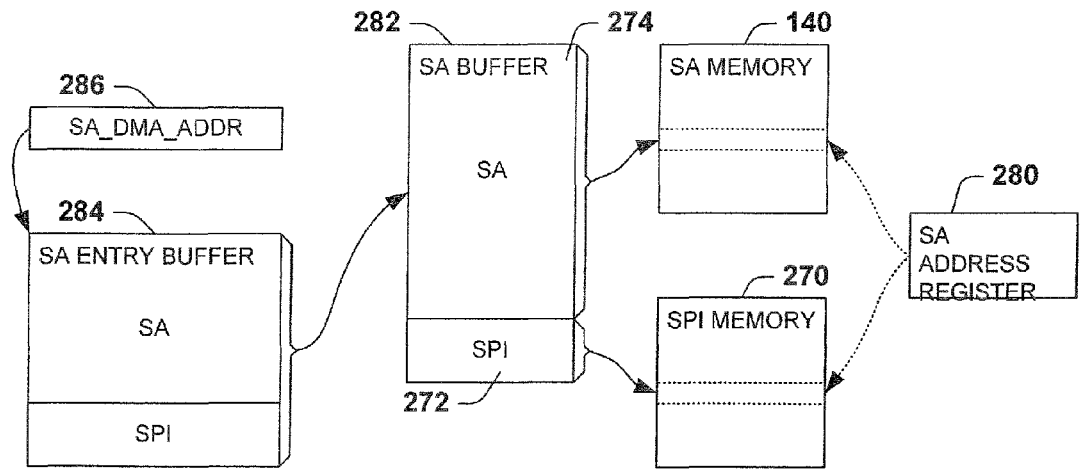
FIG. 11A is a schematic diagram illustrating an exemplary security association table write access in the network interface system of FIG. 3.
Figure 11B:
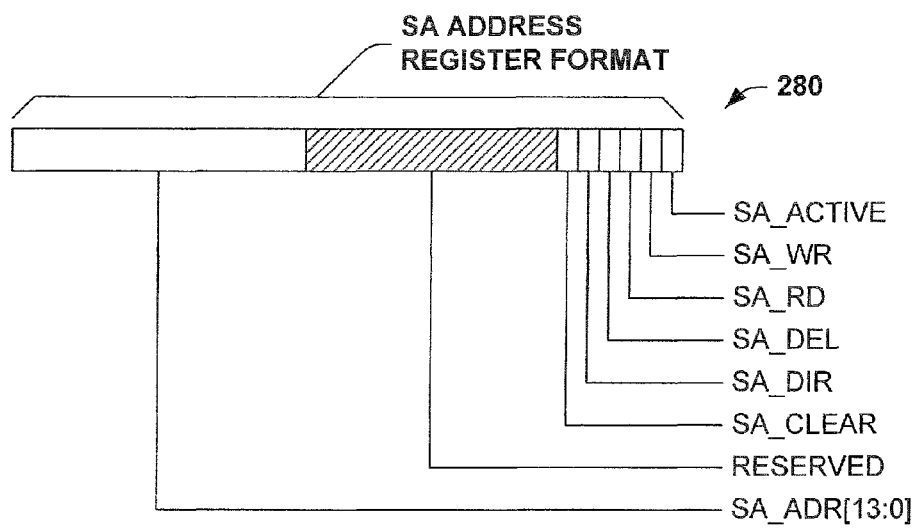
FIG. 11B is a schematic diagram illustrating an exemplary SA address register format in the network interface system of FIG. 3.
Figure 11C:
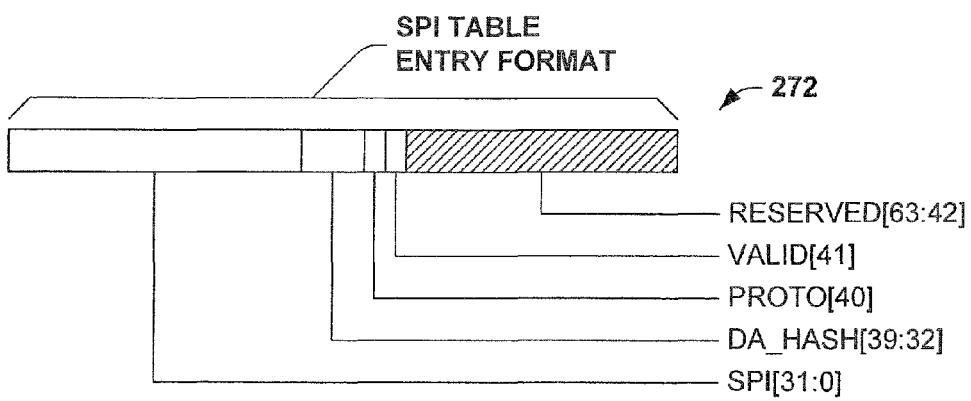
FIG. 11C is a schematic diagram illustrating an exemplary SPI table entry format in the network interface system of FIG. 3.
Figure 11D:
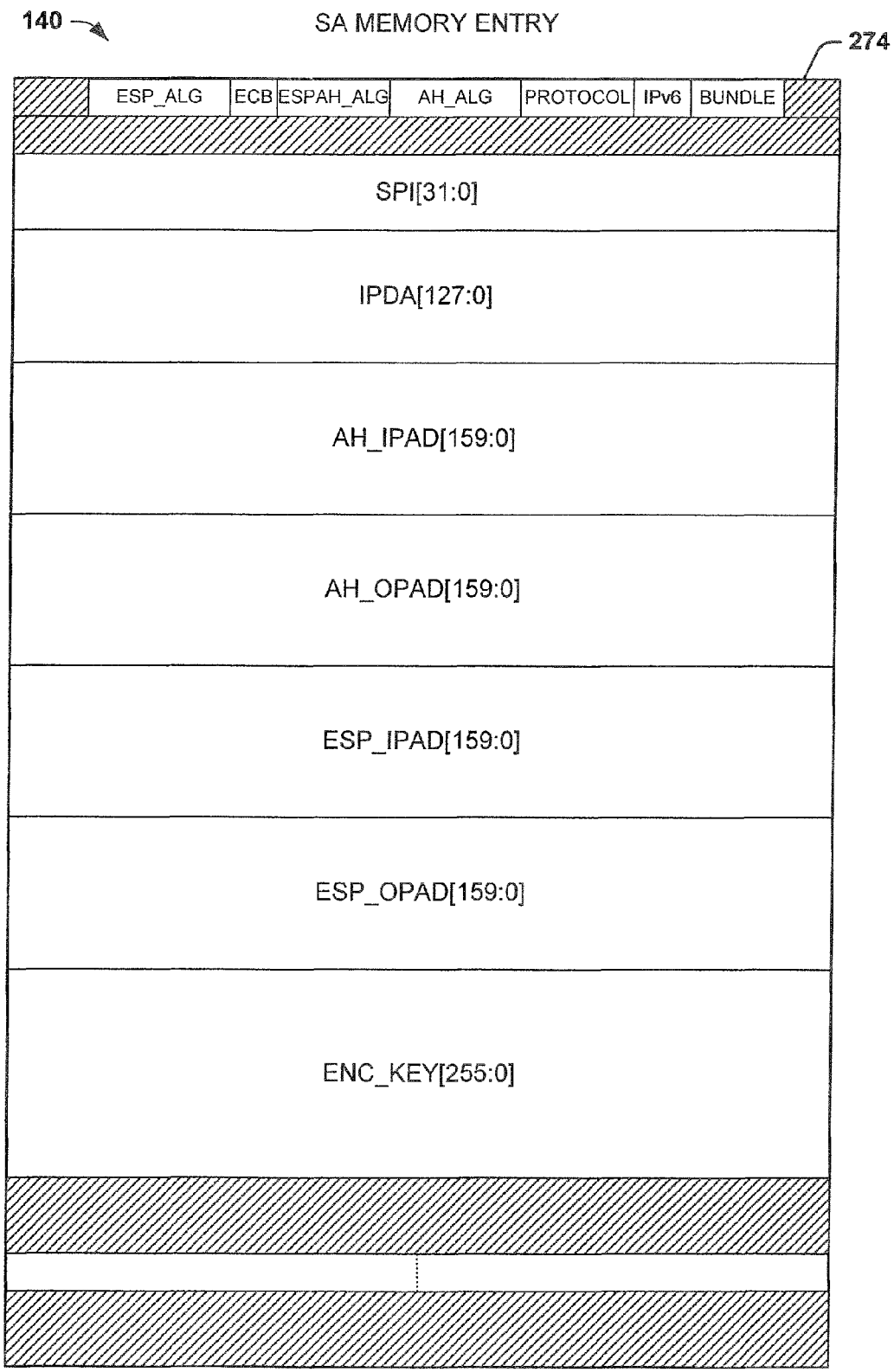
FIG. 11D is a schematic diagram illustrating an exemplary SA memory entry format in the network interface system of FIG. 3.

Referring also to FIGS. 11A-11D, the security association system used in outgoing IPsec processing in the exemplary controller 102 is hereinafter described. FIG. 11A illustrates an exemplary security association table write access, FIG. 11B illustrates an exemplary SA address register format, FIG. 11C illustrates an exemplary SPI table entry in the SPI memory 270, and FIG. 11D illustrates an exemplary SA memory entry in the SA memory 140. The SA lookup engine 146 uses the SPI memory 270 and the external SA memory 140, both of which are maintained by the host processor 112, where the exemplary SPI memory 270 is organized as a collection of 4096 bins, each bin having up to 4 entries. The address of an entry in the SPI memory 270 is 14 bits long, with the 12 high order bits thereof indicating a bin number. As illustrated in FIG. 11C, each SPI table entry 272 in the SPI memory 270 includes a 32-bit security parameters index SPI [31:0], a hash of the destination address DA_HASH[39:32], a protocol bit PROTO indicating the security protocol (e.g., AH or ESP), and a VALID bit indicating whether the entry is valid or unused.

FIG. 11D illustrates an exemplary entry 274 in the SA memory 140, wherein the SA memory 140 includes an entry corresponding to each entry 272 in the SPI memory 270, with entries 274 and 272 in the two memories 140 and 270 being in the same order. The entry 274 includes a three bit ESP encryption algorithm field ESP_ALG indicating whether ESP encryption is required, and if so, which algorithm is to be employed (e.g., DES; 3DES; AES-128, 10 rounds; AES-192, 12 rounds; AES-256, 14 rounds; etc.). An electronic codebook bit ECB indicates whether ECB mode is used for encryption, and a two bit ESP authentication field ESPAH_ALG indicates whether ESP authentication is required, and if so, which algorithm is to be employed (e.g., MD5, SHA-1, etc.). A two bit AH field AH_ALG indicates whether AH processing is required, and if so which algorithm is to be employed (e.g., MD5, SHA-1, etc.). A protocol bit PROTOCOL indicates whether the first IPsec header is an ESP header or an AH header, and an IPv6 bit indicates whether the SA is defined for IPv4 or IPv6 frames.

A BUNDLE bit indicates a bundle of two SAs specifying AH followed by ESP, and a 32 bit SPI field specifies an SPI associated with the second SA (e.g., ESP) in a bundle of 2 SAs, which is ignored for SAs that are not part of bundles. An IP destination address field IPDA[127:0] indicates the address to which the SA is applicable, wherein the SA applies only to packets that contain this destination address. An AH_IPAD field includes a value obtained by applying the appropriate authentication hash function (e.g., MD5 or SHA-1) to the exclusive OR of the AH authentication key and the HMAC ipad string as described in RFC 2104. If the authentication function is MD5, the result is 16 bytes, which are stored in consecutive bytes starting at offset 24. If the authentication function is SHA-1, the result is 20 bytes, which occupies the entire AH_PAD field. An AH_OPAD field includes a value obtained by applying the appropriate authentication hash function (e.g., MD5 or SHA-1) to the exclusive OR of the AH authentication key and the HMAC opad string as described in RFC 2104. If the authentication function is MD5, the result is 16 bytes, which are stored in consecutive bytes starting at offset 44. If the authentication function is SHA-1, the result is 20 bytes, which occupies the entire AH_OPAD field. The SA memory entry 274 also includes an ESP_IPAD field having a value obtained by applying the authentication hash function (MD5 or SHA-1) to the exclusive OR of the ESP authentication key and the HMAC ipad string as described in RFC 2104, as well as an ESP_OPAD field including a value obtained by applying the authentication hash function (MD5 or SHA-1) to the exclusive OR of the ESP authentication key and the HMAC opad string as described in RFC 2104. An encryption key field ENC_KEY includes an encryption/decryption key used for ESP processing.

The IPsec system 124 reads from the SA and SPI memories 140 and 270, respectively, but does not write to them. To minimize the lookup time the SPI memory 270 is organized as a hash table in which the bin number of an entry 272 is determined by a hash function of the SPI. The lookup logic 146 uses the SPI and the IPsec protocol (AH or ESP) to search the SPI memory 270, by computing a hash value based on the SPI and using the result to address a bin in the SPI memory 270. A second hash value is computed for the IP destination address, and the lookup logic 146 compares the SPI, protocol, and destination address hash with entries in the selected bin until it either finds a match or runs out of bin entries. The lookup logic 146 then writes an entry into the SA pointer FIFO 148, including the address of the matching entry in the SPI memory 270 and an internal status code that indicates whether or not IPsec processing is required and whether or not the SA lookup was successful. The Rx key fetch logic 262 fetches the DA from the SA memory 140 to compare with the DA in the IP packet header. If the DA from the SA memory 140 does not match the DA from the received frame 200, the frame 200 is passed on to host memory 128 via the memory 116 and the bus interface 106 without IPsec processing, and the corresponding receive status ring entry 199 indicates that no IPsec processing was done.

Referring also to FIG. 11A, the SA memory 140 and the SPI memory 270 are maintained by the host processor 112. During normal operation, the host 112 uses write and delete accesses to add and remove table entries 274, 272. The exemplary SA memory 140 is divided into two regions, one for incoming SAs and one for outgoing SAs, wherein each region provides space for 16K entries. Access to the SA and SPI memories 140 and 270 by the host 112 is performed using an SA address register SA_ADDR 280 and a 144-byte SA buffer 282. The SA buffer 282 holds one 136-byte SA memory entry 274 followed by a corresponding 8-byte SPI table entry 272. For outgoing SAs, the SPI table entry section 272 of the buffer 282 is not used. To write an SA table entry, the host 112 creates a 136 or 144 byte entry in the host memory 128 and writes the target address in the SA memory 140 to the SA_ADDR register 280. The controller 102 uses DMA to copy the SA information first to the internal SA Buffer 282 and then to the appropriate locations in the SA memory 140 and the SPI memory 270. The host 112 writes the physical address of an SA entry buffer 284 in the host memory 128 to an SA_DMA_ADDR register 286. If the software driver 190 uses the same buffer 284 in host memory 128 for loading all SA table entries, it only has to write to the SA_DMA_ADDR register 286 once.

Incoming security associations are stored in locations determined by the hash algorithm. For outgoing (transmit) frames 200 the driver software 190 includes a pointer to the appropriate SA in the transmit descriptor 192a (e.g., SA_PTR field in FIG. 5E). This makes it unnecessary for the controller 102 to search the SA memory 140 for outgoing SAs, and transmit SAs can be stored in any order. No outgoing SA is stored at offset 0, since the value 0 in the SA_PTR field of the descriptor 192a is used to indicate that no IPsec processing is required.

Referring also to FIG. 11B, the SA address register 280 includes the address of the SA table entries 274 to be accessed plus six SA access command bits. These command bits include SA read, write, delete, and clear bits (SA_RD, SA_WR, SA_DEL, and SA_CLEAR), an SA direction bit SA_DIR, and a command active bit SA_ACTIVE. The read-only SA_ACTIVE bit is 1 while the internal state machine 262 is copying data to or from the SA buffer 282, during which time the host 112 refrains from accessing the SA buffer 282. Selection between the incoming and outgoing regions of the external SA memory 140 is controlled by the SA_DIR bit, which acts as a high-order address bit. This bit is set to 1 for an incoming SA or to 0 for an outgoing SA. If this bit is set to 1, data is transferred to or from the internal SPI memory 270 as well as to or from the external SA memory 140. Outgoing SA table accesses affect only the external SA memory 140. When the host 112 sets the SA_RD in the SA address register 280, a state machine copies data from the external SA memory 140 to the SA buffer 282. If the direction bit SA_DIR is 1, the corresponding entry 272 from the internal SPI memory 270 is also copied to the SA buffer 282. An SA address field SA_ADR[13:0] of the SA address register 280 points to the entries 272 and/or 274 to be copied.

When the host 112 sets the SA_WR bit in the SA_ADDR register 280, the resulting action depends on the value of the SA_DIR bit. If this bit is 1 (e.g., indicating an incoming SA), the state machine copies data first from the buffer 284 in host memory 128 into the internal SA buffer 282, and them from the SA buffer 282 into the external SA memory 140 and also into the corresponding internal SPI memory 270. If the SA_DIR bit is 0 (e.g., indicating a transmit SA), when the access command is 'write', only the SA field of the SA buffer 282 is copied to the SA memory 140 entry selected by the SA address register 280, and the SPI field is not copied. For bundle processing, a BUNDLE bit is set in the SA corresponding to the first IPsec header in the frame 200, indicating that the frame 200 is expected to include an AH header followed by an ESP header. The corresponding entry in the external SA memory 140 includes information for both these headers, including the expected SPI of the second IPsec header.

For receive AH processing, the value of the AH_ALG field in the SA memory entry 274 is non-zero, indicating that AH processing is required for the received frame 200. The Rx parser 144 scans the frame IP header (e.g., and IPv6 extension headers if present) to determine the locations of mutable fields, as set forth in RFC 2402). The parser 144 inserts a list of these mutable field locations into the control block in the memory 118. If AH processing is enabled, the IPsec processor 150 replaces the mutable fields and the ICV field of the AH header with zeros for the purpose of calculating the expected ICV (the frame data that is copied to the host memory 128 is not altered). The destination address field of the IP header is considered to be mutable but predictable, because intermediate routers may change this field if source routing is used. However, since the originating node uses the final destination address for the ICV calculation, the receiver treats this field as immutable for its ICV check.

The control block in the memory 118 includes pointers to the starting and ending points of the portion of the received frame 200 that is covered by AH authentication. The IPsec processor 150 uses this control block information to determine where to start and stop its authentication calculations. The AH_ALG field in the SA memory entry 274v indicates which authentication algorithm is to be used. The exemplary IPsec system 124 provides HMAC-SHA-1-96 as defined in RFC 2404 and HMAC-MD5-96 as defined in RFC 2403 for AH processing. In either case the Rx IPsec processor 150 uses preprocessed data from the AH_IPAD and AH_OPAD fields of the SA entry 274 along with the frame data to execute the HMAC keyed hashing algorithm as described in RFC 2104. If the results of this calculation do not match the contents of the authentication data field of the AH header, the AH_ERR bit is set in the corresponding receive status ring entry 199 (FIG. 5J).

For receive ESP processing, the ESPAH_ALG field of the SA memory entry 274 is non-zero, indicating that ESP authentication is required, and the non-zero value indicates which authentication algorithm will be employed (e.g., MD5, SHA-1, etc.). The Rx IPsec processor 150 uses the preprocessed ipad and opad data from the ESP_IPAD and ESP_OPAD fields of the SA entry 274 along with frame data to execute the HMAC keyed hashing algorithm as described in RFC 2104. It uses pointers extracted from the control block of the memory 118 to determine what part of the frame to use in the ICV calculation. The data used in the calculation start at the beginning of the ESP header and ends just before the authentication data field of the ESP trailer, wherein none of the fields in this range are mutable. If the results of this ICV calculation do not match the contents of the authentication data field in the ESP trailer, the ESP_ICV_ERR bit is set in the corresponding receive status ring entry 199.

If the ESP_ALG field of the SA memory entry 274 is non-zero, ESP decryption is required, and the receive IPsec processor 150 uses the ESP_ALG and ECB fields of the entry 274 to determine which decryption algorithm and mode to use (e.g., DES; 3DES; AES-128, 10 rounds; AES-192, 12 rounds; AES-256, 14 rounds; etc.). The Rx IPsec processor 150 retrieves the decryption key from the ENC_KEY field of the entry 274, and uses information from the control block in the memory 118 to determine which part of the frame is encrypted (e.g., the portion starting just after the ESP header and ending just before the authentication data field of the ESP trailer). If the SA indicates that no ESP authentication is to be performed, the length of the authentication data field is zero and the encrypted data ends just before the FCS field.

Once the payload has been decrypted, the IPsec processor 150 checks the pad length field of the ESP trailer to see if pad bytes are present. If the pad length field is non-zero, the processor 150 examines the pad bytes and sets the PAD_ERR bit in the receive status ring entry 199 if the pad bytes do not consist of an incrementing series of integers starting with 1

(e.g., 1, 2, 3, . . . ). The IPsec processor 150 replaces the encrypted frame data with (decrypted) plaintext in the memory 118. The exemplary processor 150 does not reconstruct the original FP packet (e.g., the processor 150 does not remove the ESP header and trailer and replace the Next Header field of the previous unencrypted header). If the encryption uses CBC mode, the first 8 or 16 bytes of the ESP payload field contain the unencrypted IV, which the IPsec processor 150 does not change. The encrypted data following the IV is replaced by its decrypted counterpart.

In the exemplary IPsec system 124, the SPI table bin number and the IP destination address hash codes are both calculated using a single 12-bit hash algorithm. The bin number is calculated by shifting the SPI through hash logic in the IPsec processor 150. For the destination address (DA) hash, the 32-bit IPv4 destination address or the 128-bit IPv6 destination address is shifted through the hashing logic, which provides 12 output bits used for the bin number, where only the 8 least significant bits are used for the DA hash. The hash function is defined by a programmable 12-bit polynomial in a configuration register of the controller 102, wherein each bit in the polynomial defines an AND/XOR tap in the hash logic of the processor 150. The incoming bit stream is exclusive-ORed with the output of the last flip-flop in the hash function. The result is ANDed bitwise with the polynomial, exclusive-ORed with the output of the previous register, and then shifted. The hash function bits are initialized with zeros. The search key is then passed through the hash function. After the input bit stream has been shifted into the hash function logic, the 12-bit output is the hash key.

Although the invention has been illustrated and described with respect to one or more implementations, alterations and/or modifications may be made to the illustrated examples without departing from the spirit and scope of the appended claims. In particular regard to the various functions performed by the above described components or structures (blocks, units, engines, assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising."

What is claimed is:

1. A single integrated circuit, comprising:
   a memory system configured to store incoming and outgoing data packets being transferred between a network and a host system;
   a security system adapted to perform transmit IPsec processing on data packets for transmission to a network, wherein the security system comprises two processors in parallel for performing the transmit IPsec processing to generate encrypted data packets;
   two output buffers, each output buffer being coupled to one of the processors, the processors being configured to write the encrypted data packets to the output buffers;
   a transmit output data flow controller configured to control the flow of encrypted data packets from the two output buffers to the memory system in the same order in which the data packets are read from the memory system.

2. The single integrated circuit of claim 1, wherein the two processors are functionally identical.

3. The single integrated circuit of claim 1, wherein the security system further comprises two input buffers each being coupled to one of the processors, and the security system is adapted to direct outgoing data packets alternatively to one or the other input buffer.

4. The single integrated circuit of claim 1, wherein the processors each comprise pipelines for ESP encryption, ESP authentication, and AH authentication.

5. The single integrated circuit of claim 1, wherein the processors comprise pipelines implementing an algorithm selected from the group consisting of the HMAC-MD5-96 algorithm and the HMAC-SHA-1-96 algorithm.

6. The single integrated circuit of claim 1, wherein the processors comprise pipelines implementing an algorithm selected from the group consisting of the DES-CBC, the 3DES-CBC, and the AES-CBC encryption algorithm.

7. The single integrated circuit of claim 1, wherein the security system further comprises a processor to selectively decrypt incoming data packets, wherein the security system comprises more processors for encrypting and authenticating outgoing data packets than for decrypting incoming data packets.

* * * * *